United States Patent [19]

Wilks et al.

[11] 4,349,112

[45] Sep. 14, 1982

[54] PELLET INSPECTION APPARATUS

[75] Inventors: Robert S. Wilks, Plum Borough; Alexander Taleff, Churchill Borough; Robert H. Sturges, Jr., Plum Borough, all of Pa.

[73] Assignee: The United States of America as represented by the United States Department of Energy, Washington, D.C.

[21] Appl. No.: 136,122

[22] Filed: Mar. 31, 1980

[51] Int. Cl.$^3$ .............................................. B07C 5/02
[52] U.S. Cl. .................................. 209/538; 209/555; 209/579; 209/585; 209/586; 209/587; 209/592; 209/617; 209/903; 209/914; 250/223 R; 364/558; 364/562; 198/343; 198/486; 198/610
[58] Field of Search ............... 209/555, 558, 579, 585, 209/586, 587, 592, 593, 594, 595, 617, 903, 538, 914, 920; 364/552, 558, 562, 563; 250/223 R, 224, 199; 198/339, 486, 610, 343, 469, 470

[56] References Cited

U.S. PATENT DOCUMENTS

| | | | |
|---|---|---|---|
| 3,221,152 | 11/1965 | Jones | 235/151.13 |
| 3,259,820 | 7/1966 | Jones | 318/28 |
| 3,324,961 | 6/1967 | Jones | 177/185 |
| 3,500,986 | 3/1970 | Schutt | 198/486 X |
| 3,708,065 | 1/1972 | Aull | 209/579 |
| 3,716,134 | 2/1973 | Campbell | 209/920 X |
| 3,799,682 | 3/1974 | Colestock | 209/579 X |
| 3,980,553 | 9/1976 | Quinn | 209/920 X |
| 4,103,776 | 8/1978 | Taniguchi et al. | 209/538 |
| 4,117,935 | 10/1978 | Richardson et al. | 209/586 |
| 4,131,192 | 12/1978 | Cipolla | 198/469 |

OTHER PUBLICATIONS

Dahl et al-Remote Fabrication of Pellet Fuels for U.S. Breeder Reactors-(Hanford Engineering Development Laboratory)-HEDL-SA-1727-S, American Nuclear Society, Jun. 1978.
Fritz et al-Fuel Fabrication Instrumentation and Control System for Remote Operation-HEDL-SA-1706, American Nuclear Society, Jun. 1979.
Nyman et al-U.S. Technology for Mechanized-/Automated Fabrication of Fast Reactor Fuel-HEDL-SA-141 OFP-NUCLEX 78-Meeting.
McLemore-A Fuel Pellet Inspection System for Remote Operation and Maintenance-HEDL-SA-1550-14 S.
McLemore et al-Automatic Surface Flaw Inspection of Nuclear Fuel Pellets-Society of Photo-Optical Instrumentation, Engineers Symposium, Mar. 28-31, 1971.
McLemore-High Speed Inspection of Ceramic Fuels-HEDL-SA-1699, American Ceramic Society, Apr.-May 1979.
Powers et al-Inspection Techniques and Processes for Controlling FFT Fuel Quality-HEDL-SA-1953 FP--Reactor Assembly-ANS Winter Meeting, Nov. 1978.
Powers et al-Inspection Technology and Processes for Controlling FFTF Fuel Quality-HEDL-SA-1593-S.
McLemore et al-Automated Inspection of Nuclear Fuel Pellets-HEDL-SA-1723-S, American Nuclear Society, Jun. 1979.
Nyman et al-A Handling System for Nuclear Fuel Pellet Inspection-HEDL-LA-1417, American Nuclear Society Annual Meeting, Jun. 18-23, 1978.
Nyman et al-Remote Fabrication of Nuclear Fuel Pellets-HEDL-SA-1592 FP and HEDL-SA-1592-S, American Nuclear Society, Nov. 12-17, 1978.

*Primary Examiner*—Allen N. Knowles

[57] ABSTRACT

Apparatus for inspecting nuclear fuel pellets in a sealed container for diameter, flaws, length and weight. The apparatus includes, in an array, a pellet pick-up station, four pellet inspection stations and a pellet sorting station. The pellets are delivered one at a time to the pick-up station by a vibrating bowl through a vibrating linear conveyor. Grippers each associated with a successive pair of the stations are reciprocable together to pick up a pellet at the upstream station of each pair and to deposit the pellet at the corresponding downstream station. The gripper jaws are opened selectively depending on the state of the pellets at the stations and the particular cycle in which the apparatus is operating. Inspection for diameter, flaws and length is effected in each case by a laser beam projected on the pellets by a precise optical system while each pellet is rotated by rollers. Each laser and its optical system are mounted in a container which is free standing on a precise surface and is provided with locating buttons which engage locating holes in the surface so that each laser and its optical system is precisely set. The roller stands are likewise free standing and are similarly precisely positioned. The diameter optical system projects a thin beam of light which scans across the top of each pellet and is projected on a diode array. The flaw optical system projects a thin beam of light which scans across the pellet. Unflawed areas of the surface reflects the light to a photodiode; flawed areas diffuse the light and reflect the image of the light spot in the flaw away from the photodiode. The scanning of each pellet is coordinated by a grating and photodiode which produces pulses corresponding to the scanning. The length optical system projects a sheet of light across the length of the pellet producing a shadow which is projected on a diode array.

39 Claims, 78 Drawing Figures

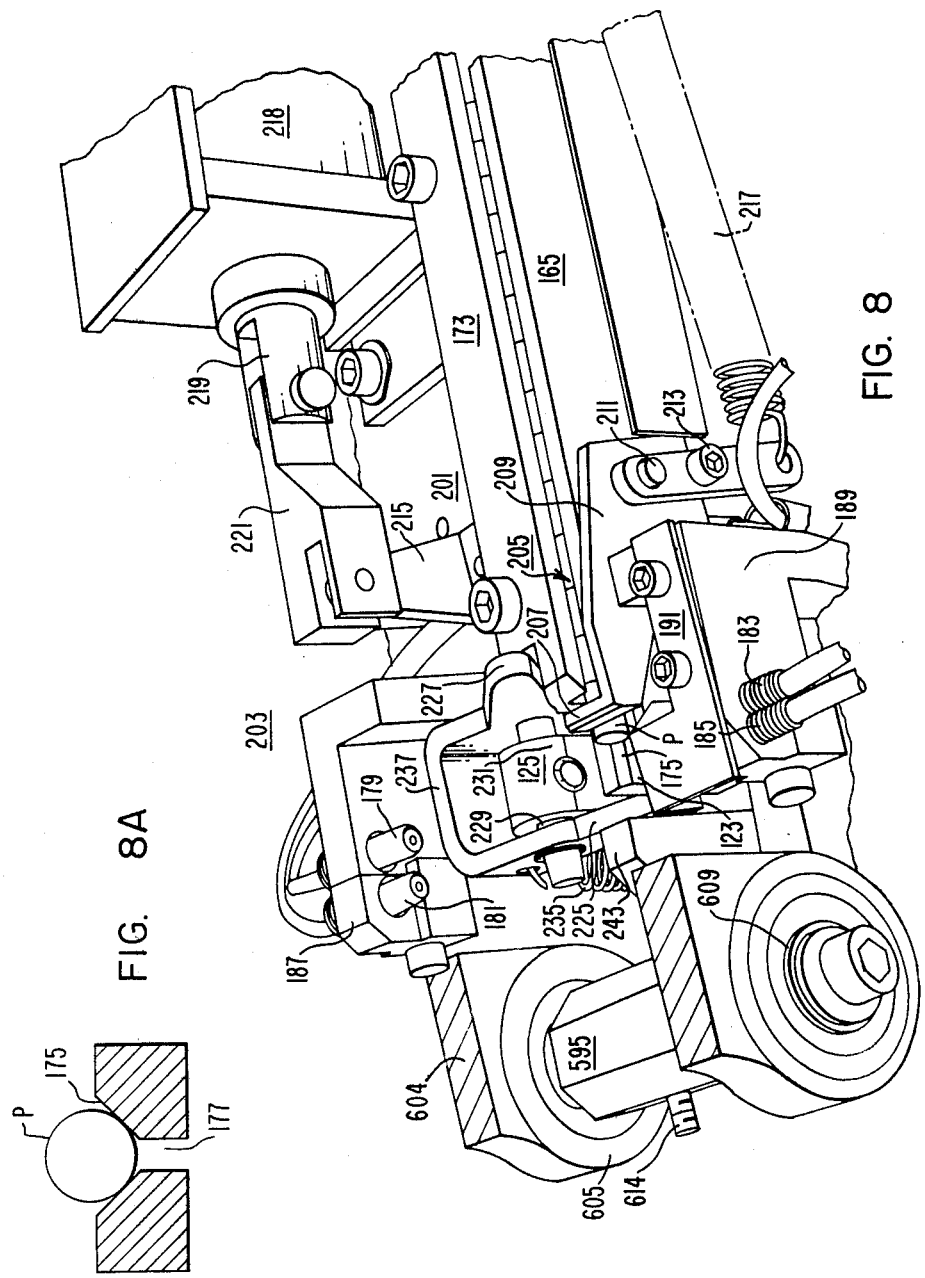

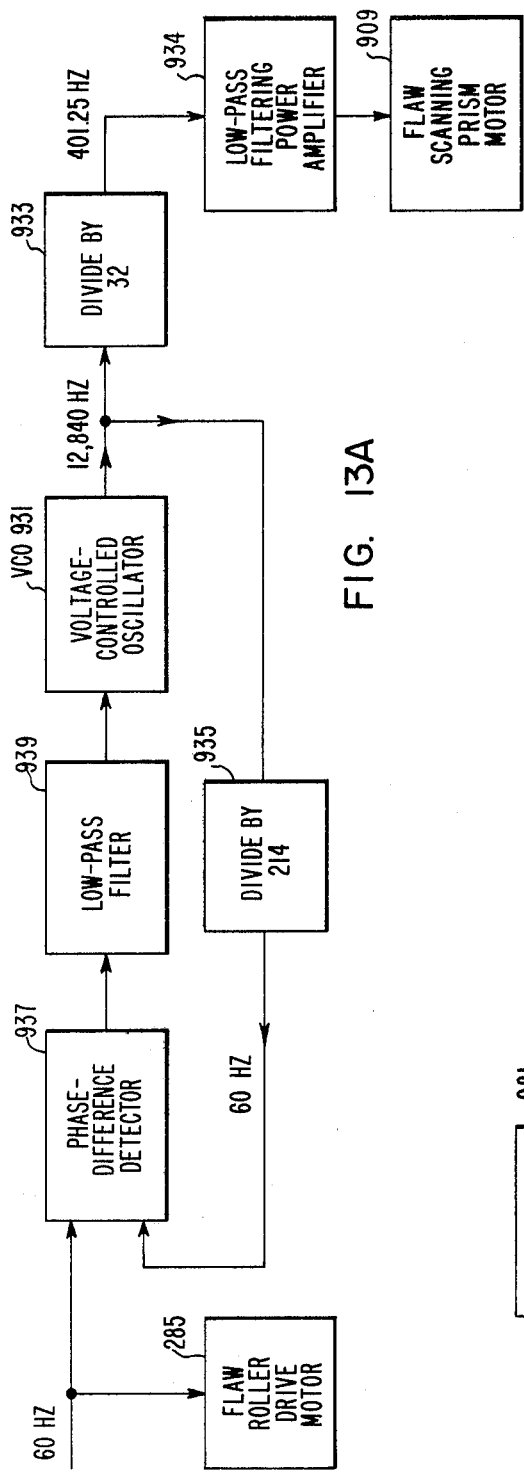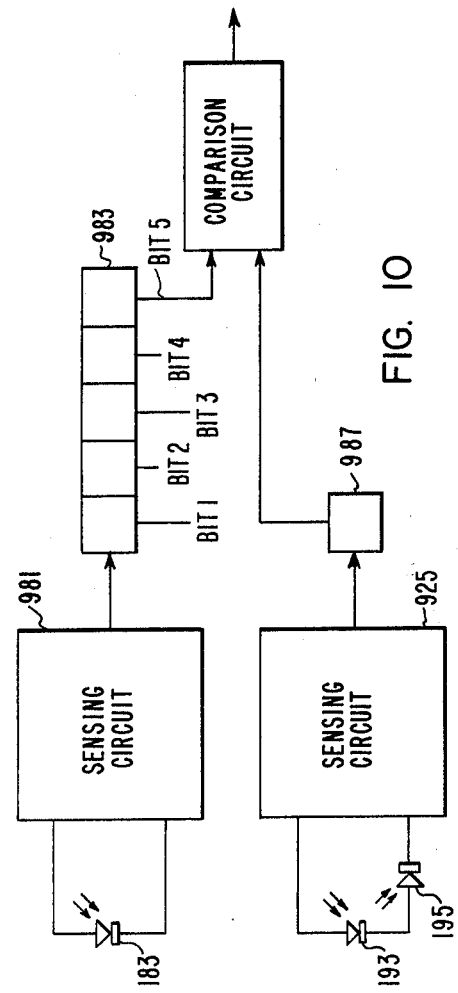
FIG. 13A
FIG. 10

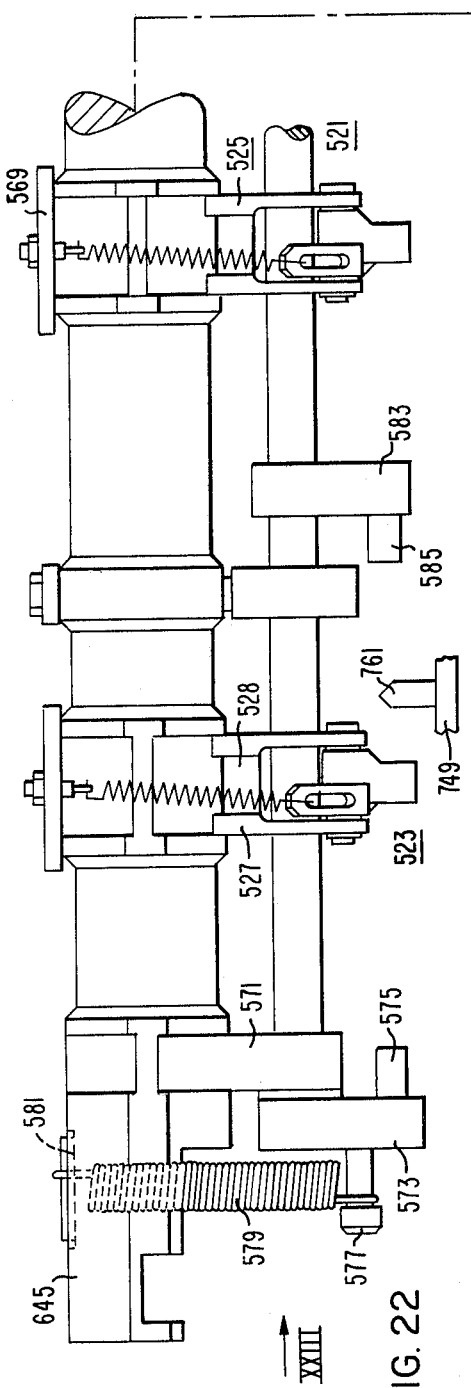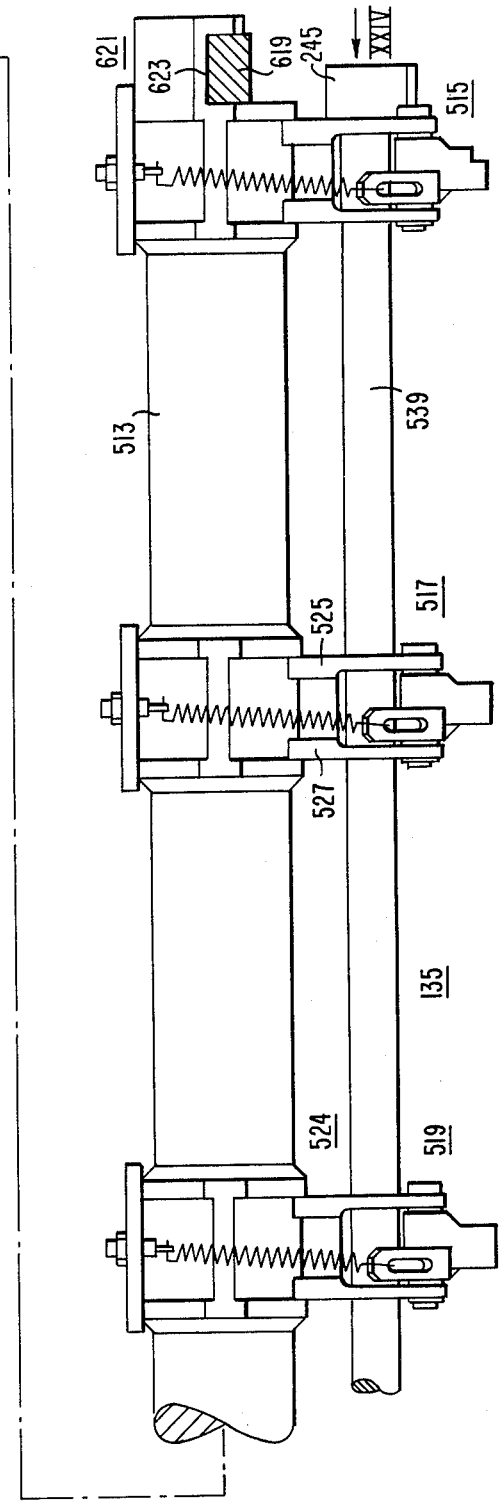
FIG. 22

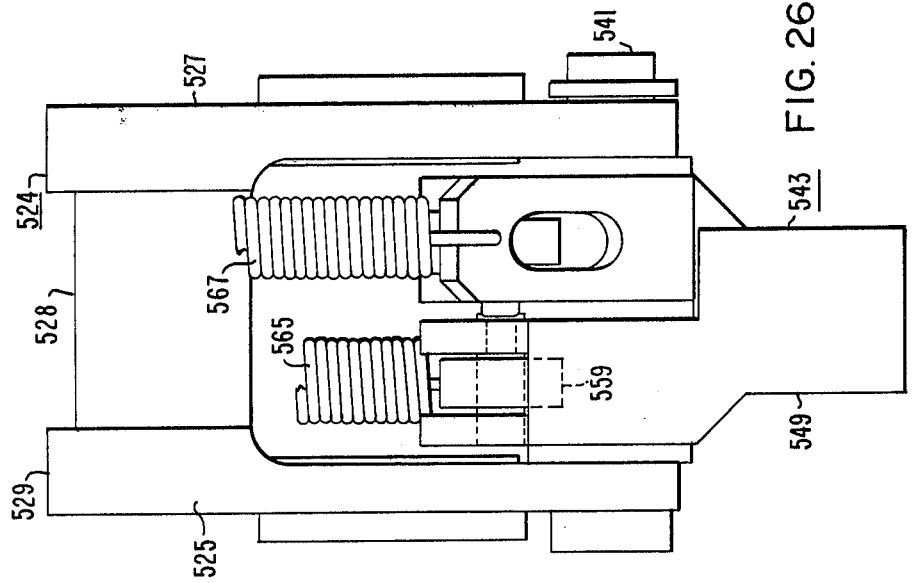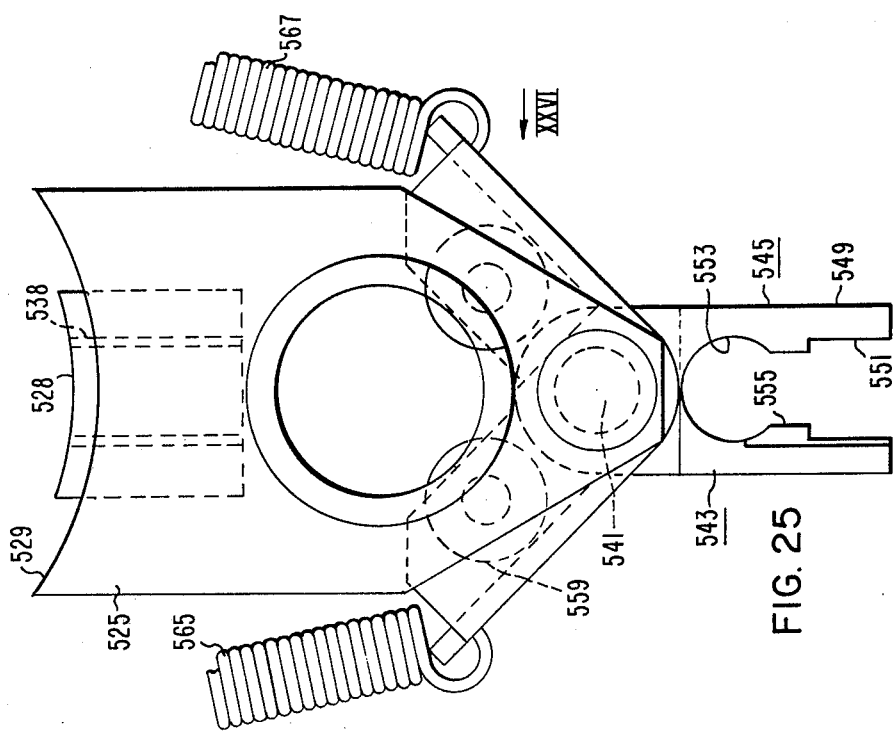

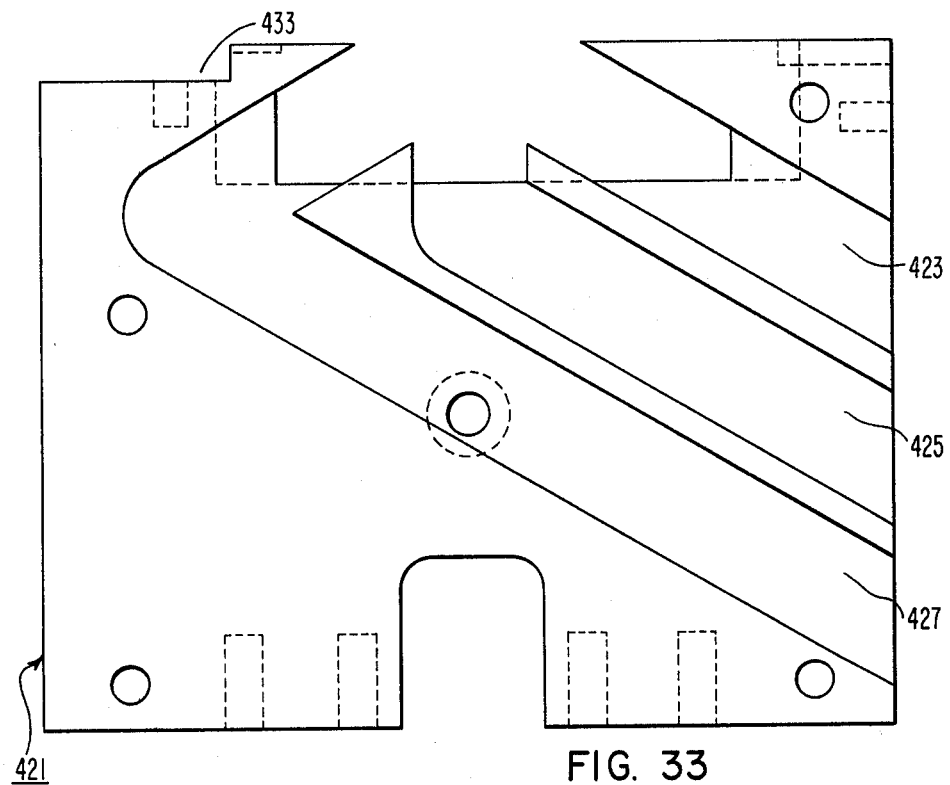
FIG. 33
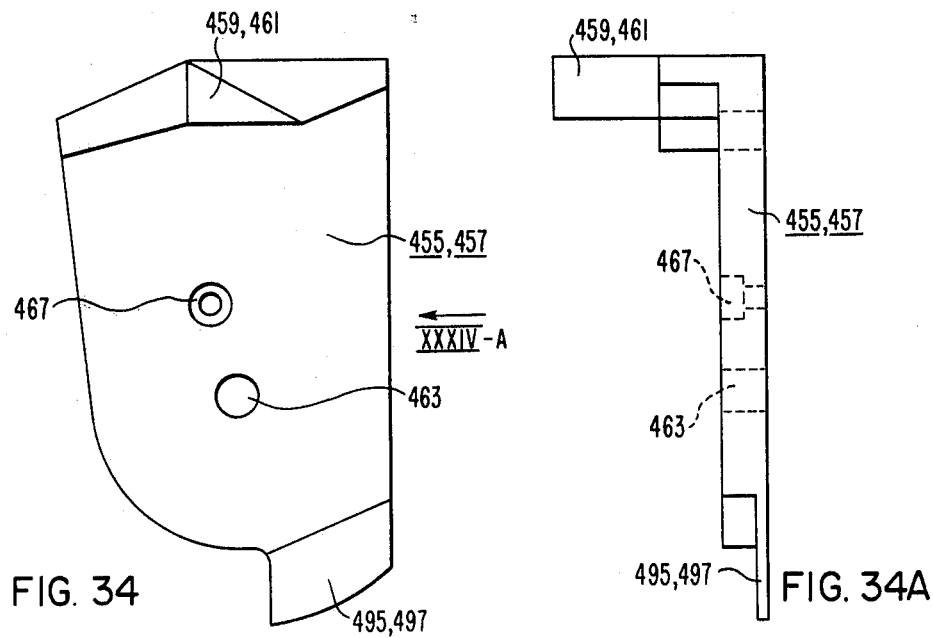
FIG. 34
FIG. 34A

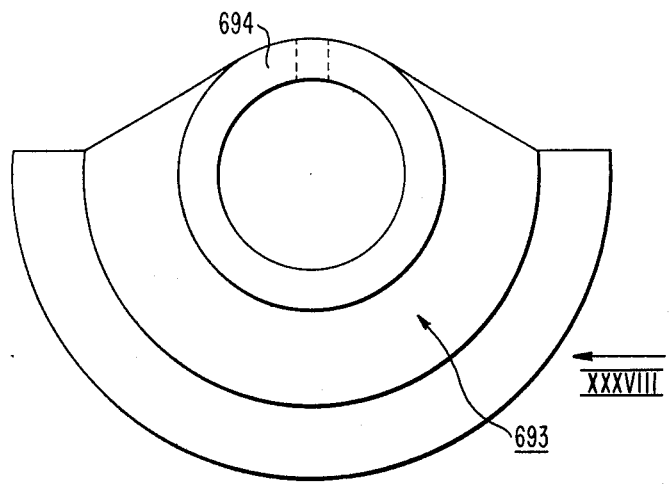
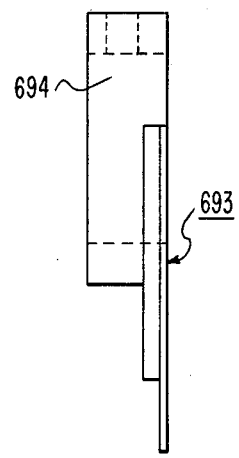
FIG. 37　　　　　　　　　FIG. 38
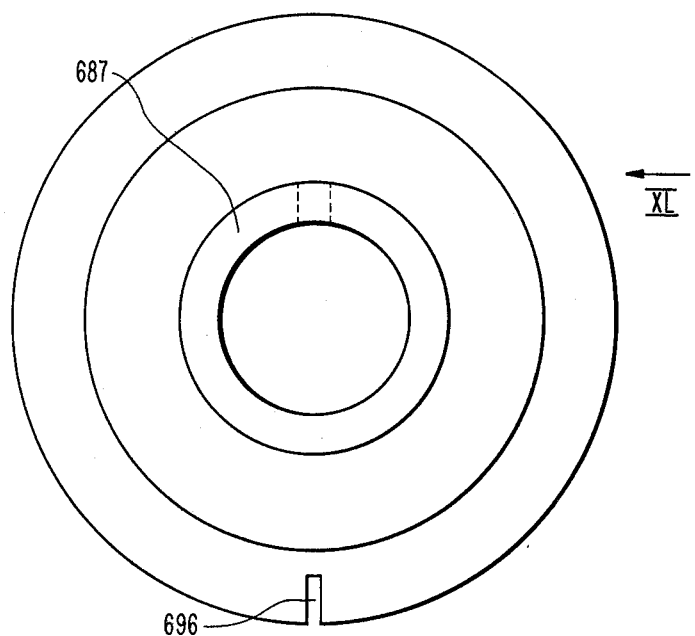
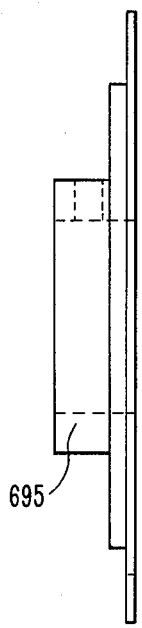
FIG. 39　　　　　　　　　FIG. 40

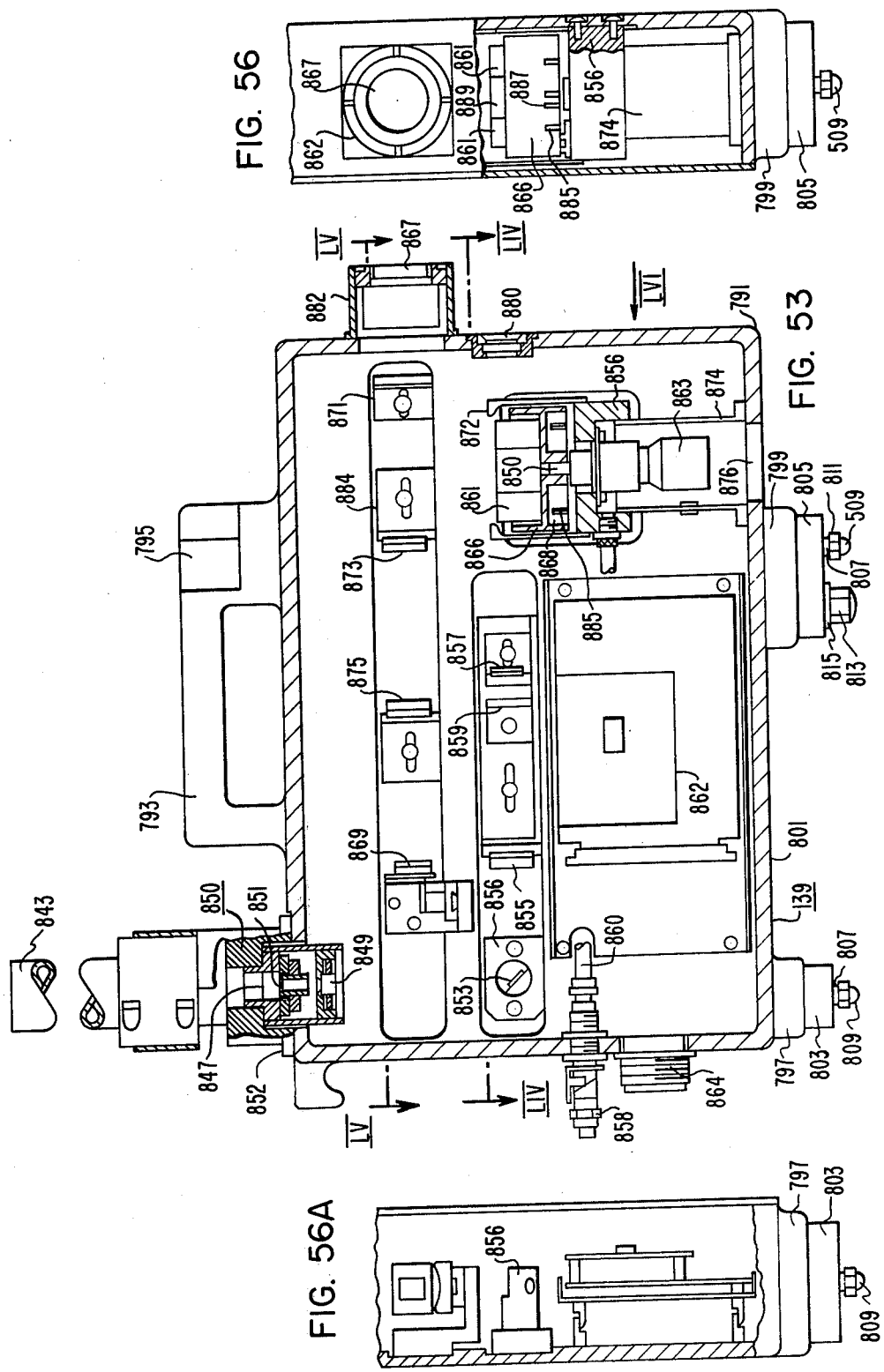

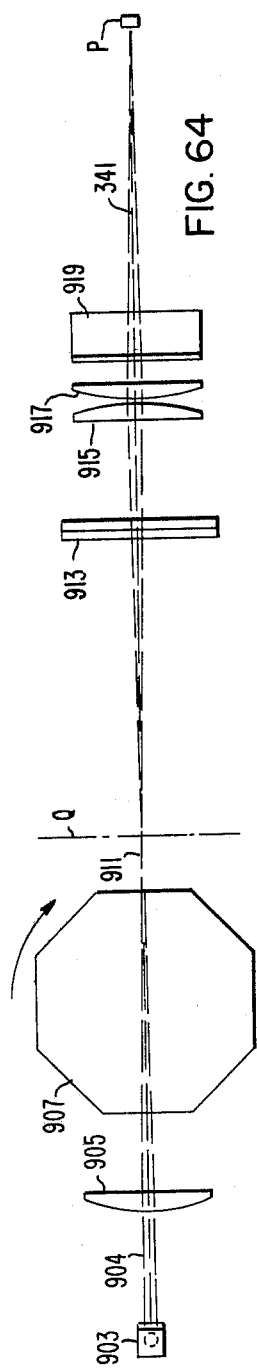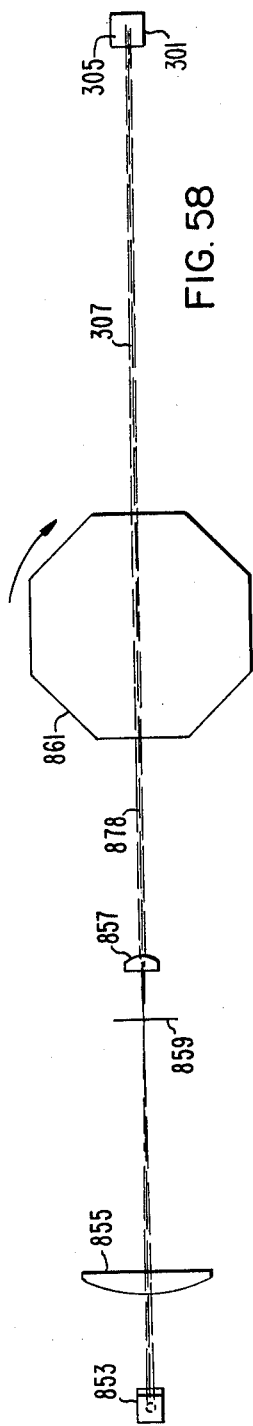

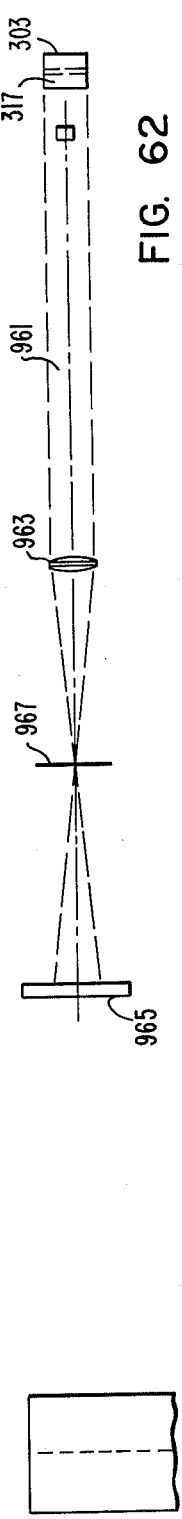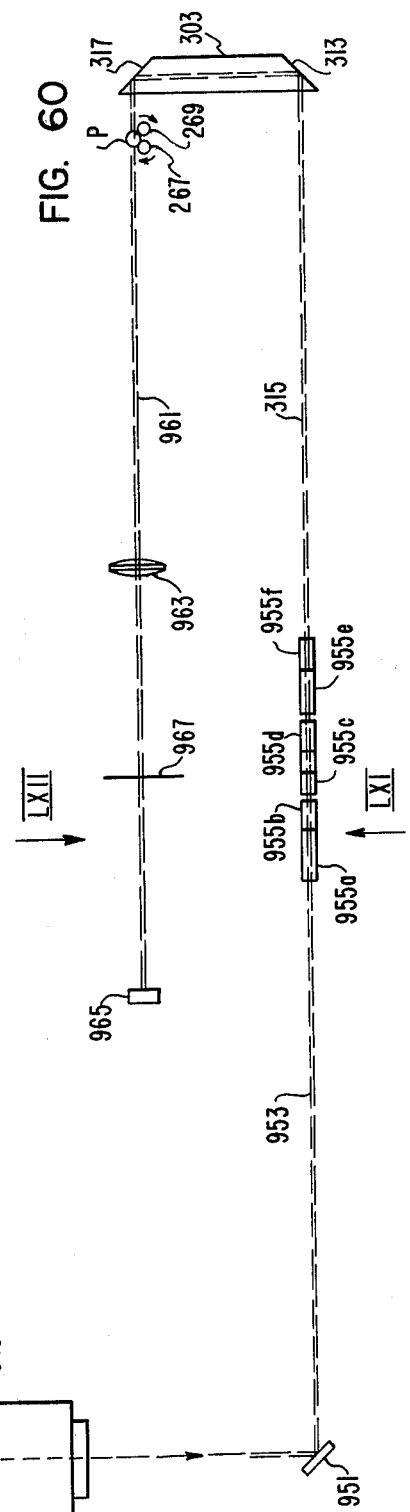
FIG. 62
FIG. 60
FIG. 61

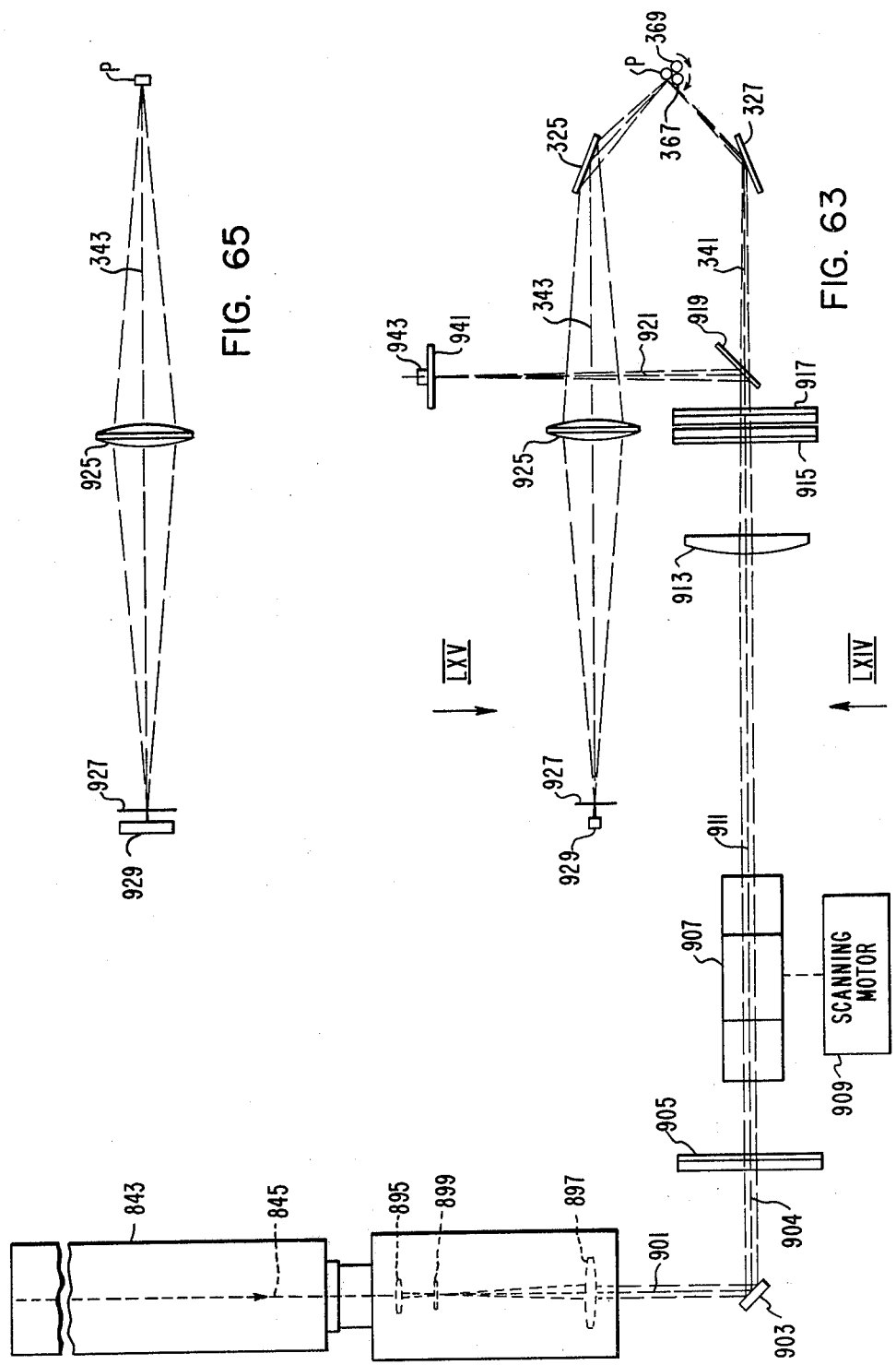

PELLET INSPECTION APPARATUS

GOVERNMENT CONTRACT CLAUSE

The invention herein described was made in the course of or under a contract or subcontract thereunder with the Department of Energy bearing No. EY-67-14-C-2170.

BACKGROUND OF THE INVENTION

This invention relates to the art of inspection and sorting or classifying of articles and has particular relationship to inspection and sorting or classifying of fuel pellets for nuclear reactors. While this application and it claims confine themselves to the inspection and sorting or classifying of fuel pellets, it is to be understood that to the extent that this invention is applicable to the processing of other articles than fuel pellets, such processing is within the scope of this invention. Of particular interest in this invention is the processing of plutonium-containing fuel pellets. Plutonium is a hazardous element to which people cannot safely be directly exposed. Plutonium-containing fuel pellets must be processed completely automatically in a sealed containment. It is also possible to process plutonium pellets manually in a glove box but this has proven unsatisfactory because of low production rate and excessive radiation exposure. It is an object of this invention to provide apparatus for effectively processing plutonium pellets automatically.

Typical required dimensions of a pellet in inches are: diameter 0.1945±0.0002, length 0.2425±0.0020, mass 1 gram, and specific gravity 10.22. It is necessary that the fuel pellets be inspected for diameter, length, flaws, and mass. In the use of the fuel pellets in a nuclear reactor, the pellets are stacked in cladding in the form of a tube which, like the pellets, is usually of circular cross-section. For effective heat transfer the pellets must be packed so that the distance between the outer surface of each pellet and the surface of the cladding is small. It is necessary that the diameter of the pellets be monitored closely to assure that the diameter of each pellet is not so large that it cannot be inserted in a tube or so small as to militate against effective heat transfer. It is necessary that the length of the pellets be monitored closely to determine the ratio of mass to length to assure proper density for adequate fissile distribution. If the pellets are properly stacked uniform fissile distribution along the length of the reactor in which the pellets are burned is achievable. It is necessary that the mass be measured to assure that the density is of the appropriate magnitude. Low density reduces heat generation; variation in density results in non-uniform fissile distribution. A measure of quality is the so-called "smear density" which is the mass divided by the length. Mass is measured to ±5 milligrams. Flaws in the surface of a pellet affect its heat transfer properties. Because the transfer of heat to the cladding from a flaw is impeded, hot spots are produced at flaws. In addition there is a tendency for the pellet to produce scratches in the cladding at the boundary flaws. Flaws may be classified as fissures or cracks and chips. Chips may be generally circular or generally rectangular or other shapes. In the evaluation of flaws, a flaw-quality index is assigned to each flaw. These indexes for each pellet are summed to form a surface-flaw-quality index. If this index exceeds a predetermined magnitude, the pellet is not acceptable.

As a practical matter the inspection and sorting must take place at a high rate. A test reactor having an output of 400 megawatts thermal energy requires about 2,357,000 pellets. A power station requires a reactor having an output of 1200 megawatts thermal energy. Such a reactor demands about 10,000,000 pellets. It is an object of this invention is to provide fully automatic apparatus for monitoring fuel pellets at a high rate to assure that their dimensions are within the above-stated or equivalent limits and that their surface flaws have dimensions within permissible limits and for sorting or classifying the pellets in accordance with the results of this monitoring.

Typical of the prior art are Jones' U.S. Pat. Nos. 3,221,152; 3,259,820; and 3,324,961. These patents disclose apparatus for inspecting fuel pellets for diameter, length and weight but not for flaws. The monitoring is not within the tolerance limits described above. The length and diameter are gauged mechanically by contact of the pellet by plates as in the use of calipers. The gauging cannot take place at high speed.

It is an object of this invention to overcome the drawbacks and disadvantages of the prior art and to provide apparatus for monitoring or inspecting fuel pellets for a nuclear reactor for flaws as well as dimensions and weight at a high rate and with the accuracy described above.

SUMMARY OF THE INVENTION

In accordance with this invention the pellets are inspected for diameter, flaws and length optically at a plurality of inspecting stations. The optical inspection lends itself to the processing of pellets at a high rate and with the accuracy demanded. These stations constitute part of an array of stations including a pellet pick-up station, a pellet weighing station, and a pellet sorting station. The pellets are transferred one-by-one from station to station by grippers. A gripper is associated with each pair of stations of the array. Each gripper, while in a pick-up position at an upstream or a back station of a pair of stations, picks up a pellet in this station and moves to a deposit position at a downstream or forward station of the pair. The words "upstream" and "downstream" refer to the flow of pellets in the system. While the pellets are actually being picked up or deposited, the velocity of each gripper is zero to preclude damage to the pellet. The closing or opening of the jaws of each gripper only takes place when the gripper has come to rest in position to pick up or deposit a pellet. The movement of the jaws in gripping the pellet is such as to preclude damage to the pellet.

The grippers move continuously together between their pick-up and deposit positions. The opening and closing of the jaws is selectively controlled to avoid maloperation. Specifically when a pellet is not properly positioned in the pick-up station to be picked up, the jaws do not close. The pellets are processed typically at the rate of three per second at the diameter, flaw and length stations. The weighing scale cannot operate at this high rate. At this station a pellet is typically processed once every two seconds and only one pellet of every six is weighed. While the one pellet in six is being weighed, the grippers reciprocate between their respective stations at the rate of three reciprocations per second, but their jaws remain open. When a pellet at the weighing station manifests a defect in weight, the apparatus is converted to a mode in which each pellet is inspected for weight. In this case the grippers are reciprocated at the rate such as to advance three pellets per second but the jaws of the grippers are closed only once every two seconds so that one pellet is advanced every two seconds. This operation continues until the controller reverts the apparatus to the normal mode. At the sorting station the pellets are classified in three categories: acceptable pellets, rejectable pellets, and pellets which can be reworked.

The diameter inspection station, the flaw inspection station and the length inspection station are disposed in succession in the array. The pellets are transferred from the pellet pick-up station to the diameter inspection station and thence in succession to the other stations. The diameter inspection, the flaw inspection and the length inspection are each carried out with a separate light source and a separate optical system. Since it is desirable that instantaneously small element areas of the surface of each pellet be subjected to inspection, the source in each case is a laser.

At the diameter, flaw and length inspection stations, each pellet is deposited on a seat formed between rotating rollers. The pellet is exposed to the inspecting light beam while it is rotated through 360° by the rollers. For diameter inspection a beam in the form of a vertical ribbon scans across the top of the pellet and then impinges on a vertical diode array. The top of the ribbon above the pellet remains fixed. The bottom of the ribbon varies in accordance with the diameter of the pellet, i.e. the length of the shadow cast by the pellet transversely to its length. The scanning is typically at the rate of about 2 scans across the length of the pellet per revolution, during each scan about 40 diameters are measured.

For flaw detection the pellet is scanned at a high rate by a spot of light along a horizontal line, i.e. a line parallel to the axis of the pellet. A beam splitter produces a like spot which scans a grating at the same optical distance from the source (or from the point of reflection at the beam splitter) as the pellet. The surface of the pellet is substantially specular except where it is flawed. The unflawed surface reflects the impinging beam at an angle to the perpendicular to the pellet at the point of impingement which is equal to the angle of incidence. A photo-diode is positioned to receive the specularly reflected beam. Beams from flaws are diffused and reflected at a different angle than the specularly reflected beam. They do not impinge on the photo-diode. There is also a photo-diode behind the grating, which produces series of pulses with which the position of the scanning spot along the pellet may be coordinated.

For length measurement a beam in the form of a horizontal ribbon is projected diametrically across the length of the pellet. The resulting beam impinges as a thin beam on a photo-diode array. The length of the shadow cast by the pellet determines the length of the pellet.

Both the containers including the optical systems and the roller stands which provide the seats for the pellets are free standing. Each container is provided with locating buttons in its base. These buttons engage locating conical and V-shaped seats which assure precise settings of the optical axes and the pellets when seated on the rollers.

Among the unique features of this apparatus are the following:

1. The mechanical handling and gauging system as a whole.
2. The overall concept of pellet transferring.
3. The gripper actuation system including the external cam operation of a series of independent grippers; each gripper being independent of the others to the extent that it is free to close upon and hold each pellet regardless of its diameter and without interference from pellets at other grippers.
4. A provision in the gripper-jaw structure which renders a gripper incapable of picking up a second pellet when a first gripper is trapped in the gripper throat.
5. The actuation of the forward feeder gate by a linkage on the gripper transfer beam assembly.
6. The capabilty of each gripper to open and close once every cycle or to remain open while the transfer bar continues to cycle, depending on the status of the pellets and the mode of operation of the apparatus.
7. The pellet sorter system with a means for detecting when a pellet has been released through it and its destination.
8. A precision roller structure for providing seats for the pellets during inspection, which structure is capable of manufacture and simple assembly so that it can run true to a combined eccentricity and non-parallism of less than 0.000,050 inch.
9. An ultra-precise super-repeatable means for mounting and locating the precision rollers of the pellet seats, the source and optical containers, and the weigh scale that requires no fastening and is therefore entirely free of the stresses that can easily distort precision alignments. The method leaves the units free for instant, toolless removal, but provides a means for performing a positional adjustment of the unit.
10. A means for guiding the installation and withdrawal of the source and optical containers.
11. A means for steering unintentionally dropped pellets to a common catch tray.
12. A means for synchronizing the mechanical system function with those of the control system by means of three electro-optically sensed cams.

BRIEF DESCRIPTION OF THE DRAWINGS

For a better understanding of this invention, both as to its organization and as to its method of operation, together with additional objects and advantages thereof reference is made to the following description taken in connection with the accompanying drawings, in which:

FIG. 8 is a copy of a photograph of a fragmental part of the system shown in FIG. 2, enlarged, showing predominately the pellet pick-up station and the escapement controlling the flow of pellets to the station;

FIG. 8A is a fragmental view in longitudinal section showing the seat for the pellets at the pellet pick-up station;

FIG. 10 is a block diagram showing the manner in which the relationship between a pellet at the pick-up station and its subsequent appearance at the sorting station is coordinated;

FIG. 13A is a schematic presented as a block diagram showing the manner in which a pellet spin rate on the roller stand is synchronized with the rotational speed of the scanning prism in flaw inspection;

FIG. 15B is a copy of the same photograph with the push rod and mechanism in non-actuating setting;

FIG. 22 is a view in side elevation of the gripper assembly of the handling and gauging system;

FIG. 25 is a view in side elevation of a gripper of the gripper assembly;

FIG. 26 is a view in end elevation in the direction of the arrow XXVI of FIG. 25;

FIG. 33 is a view in side elevation of the block or body of the sorting unit;

FIG. 34 is a view in side elevation of a gate of the sorting unit;

FIG. 34A is a view in end elevation of the gate in the direction of the arrow XXXIV-A of FIG. 34;

FIG. 37 is a view in side elevation of a cam disc used in combination with another disc to form a cam for the starting cam unit;

FIG. 38 is a view in end elevation in the direction of the arrow XXXVIII of FIG. 37;

FIG. 39 is a view in side elevation of another cam of the starting cam unit;

FIG. 40 is a view in end elevation in the direction of the arrow XL of FIG. 39;

FIG. 53 is a view in side elevation, partly in section, showing the source and optical system, for measuring diameter of the pellets;

FIG. 56 is a view in end elevation in the direction of arrow LVI of FIG. 53;

FIG. 56A is a view in end elevation in the direction of the arrow LVI-A of FIG. 53;

FIG. 58 is a diagrammatic bottom view in the direction of arrow LVIII of FIG. 57;

FIG. 60 is a diagrammatic view in side elevation of the optical system for measuring length of the pellets;

FIG. 61 is a diagrammatic bottom view in the direction of the arrow LXI of FIG. 60;

FIG. 62 is a diagrammatic top view in the direction of the arrow LXII of FIG. 60;

FIG. 63 is a diagrammatic view in side elevation of the optical system for detection of flaws;

FIG. 64 is a diagrammatic bottom view in the direction of arrow LXIV of FIG. 63;

FIG. 65 is a diagrammatic top view in the direction of arrow LXV of FIG. 63.

DESCRIPTION OF THE PREFERRED EMBODIMENT

Figure 1:
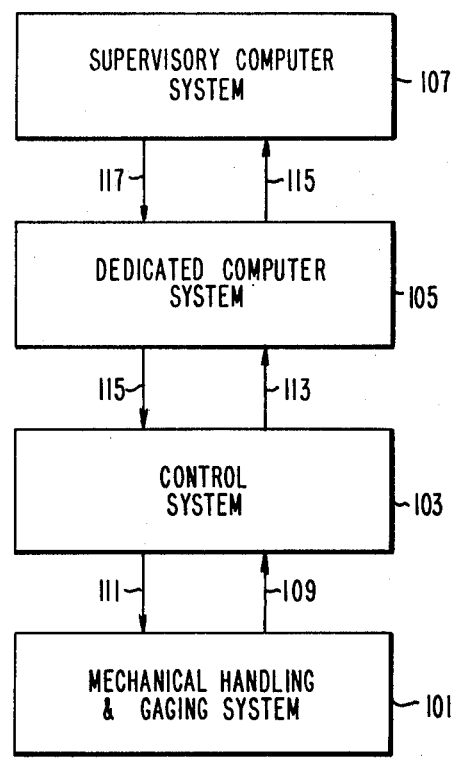
FIG. 1 is a block diagram showing the major components which cooperate in the practice of the invention and their relationship.

The apparatus represented by the blocks in FIG. 1 includes a mechanical handling and gauging system 101, which will be herein referred to as the mechanical system or mechanical apparatus, a control system 103, a dedicated computer 105 and a supervisory computer 107. As indicated by the arrows 109 and 111 the control system 103 controls the operation of the mechanical system 101, transmitting commands for operation of the mechanical system 101 and receiving signals of the states of operation of the system 101. The dedicated computer 105 is dedicated to the operation of the mechanical system. As indicated by the arrows 113 and 115, the computer 105 receives data as to the operation of the mechanical system 101 from the control system. The computer 105 carries out computations with this data and stores components of the data until it is to be used and then transfers this data to the control system 103 for use in the operation of the mechanical system. The supervisory computer 107 provides additional storage facilities for data receiving data from computer 105 as indicated by arrow 115 and sends data back to computer 105 as indicated by arrow 117.

Figure 2:
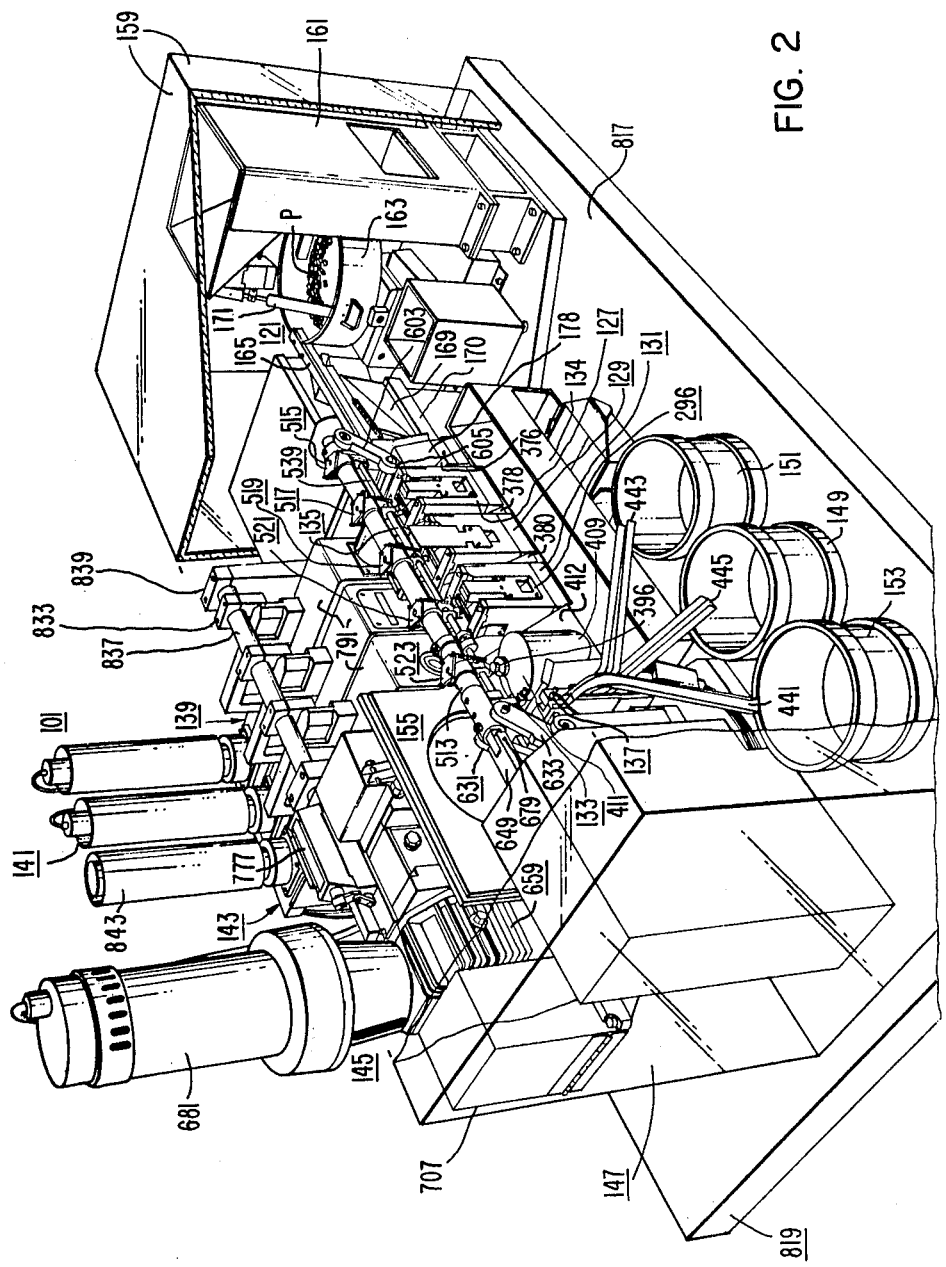
FIG. 2 is a copy of a photograph of the mechanical handling and gauging system of this invention which was built and found to be satisfactorily operative.
Figure 19:
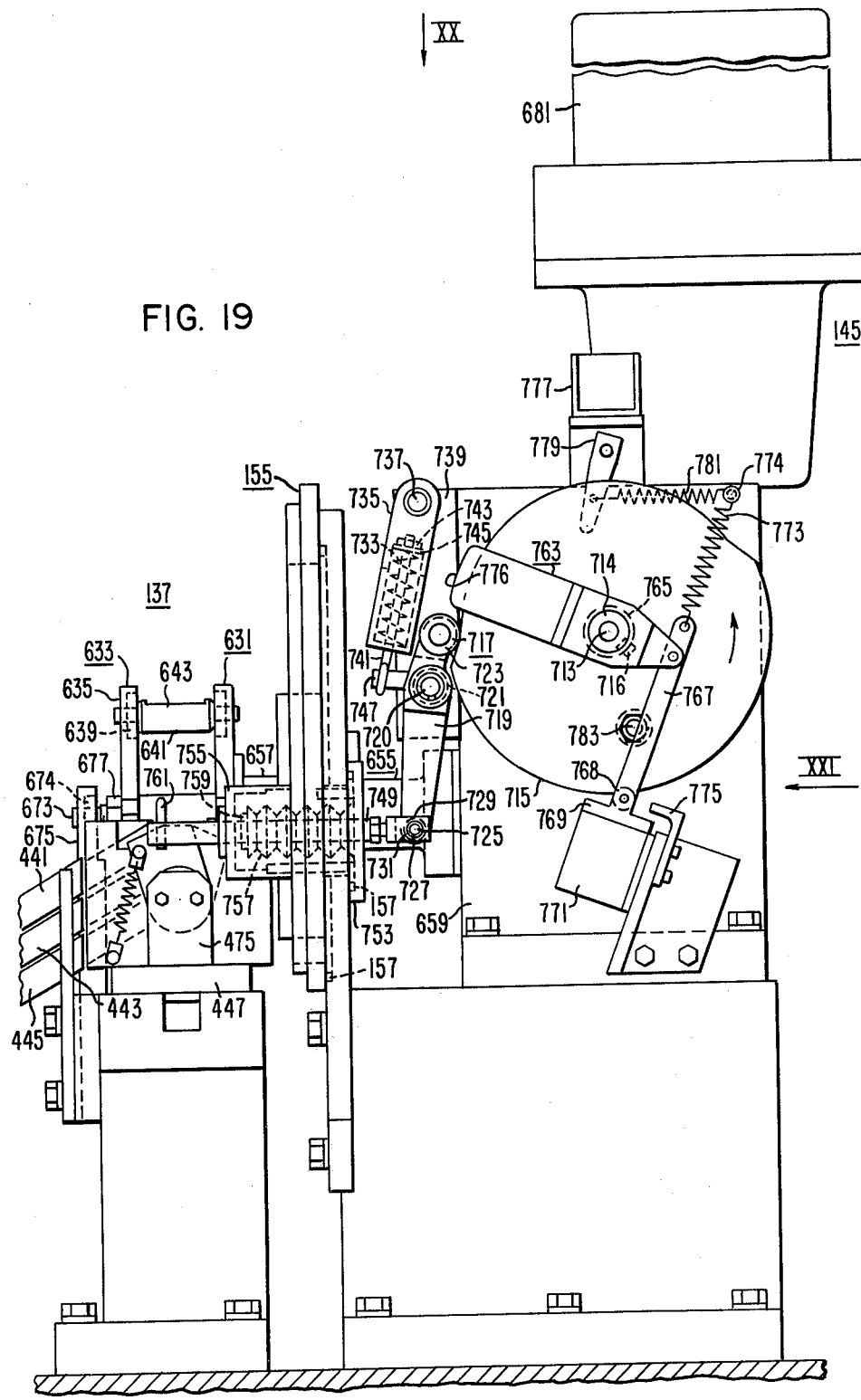
FIG. 19 is a view in side elevation of the drive assembly of the system.
Figure 20:
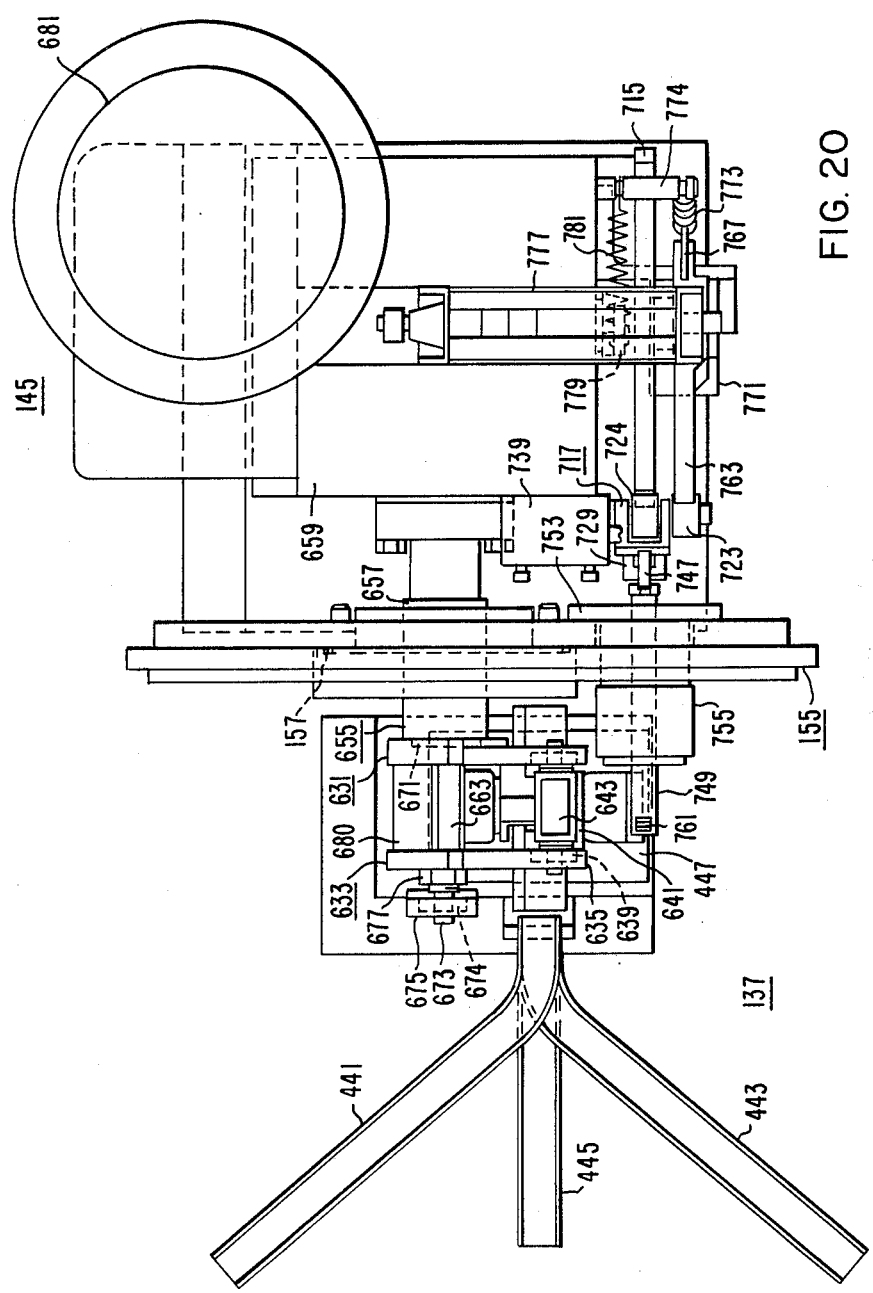
FIG. 20 is a plan view of the assembly in the direction of the arrow XX of FIG. 19.

The pellets P are processed and sorted by the mechanical system 101 (FIG. 2). This system includes a pellet feeding mechanism 121, a pellet pick-up station or location 123 (FIG. 3), a pellet escapement mechanism 125 (FIG. 8), a plurality of pellet inspecting stations 127, 129, 131, and 133, a catch tray 134 for stray pellets, a pellet transfer mechanism 135, a pellet sorting station including a sorting mechanism 137, light source and optical systems 139, 141, 143, and a drive 145. For convenience in describing the position and cooperation of the components of the mechanical system 101, the parts are referred to herein with reference to the stream of pellets. A component more remote from the pellet feeding mechanism 121 than another part is referred to as downstream with respect to the other part; the other component is also referred to as upstream with respect to the more remote component. At times the more remote component may also be referred to as a forward component and the other component as a back component. A containment 147 encloses the parts in which the pellets are exposed for processing; namely, the pellet feeding mechanism 121, the pellet stations 123, and 125 through 133, the escapement mechanism 121, the catch tray 134, the pellet transfer mechanism 135 and the sorting mechanism 137, and its boats 149, 151, 153. The rear of the support 152 (FIG. 2) on which boats 149–153 are disposed include position switches (not shown) which are actuated by the boats when they are properly positioned and permit the mechanical system 101 to operate. The source and optical systems 139, 141, 143 are outside of the containment 145 and communicate optically through appropriate windows (not shown) with the stations 127, 129 and 131 within the containment 147. The drive 145 is outside of the containment and its shafts are converted to the driven parts within the containment 147 through plates 155. The drive shafts pass through passages in plate 155 which are sealed against penetration of radioactive material from the containment by O-ring seals 157 (FIGS. 19, 20). The walls 159 of the containment 147 are welded to the plate 155. The containment 147 is provided with conventional sealed-in gloves (not shown) for manipulating the parts of the mechanical system and the pellets. In FIG. 2 the containment 147 is shown as transparent except for the plate 155 only for the purpose of showing the apparatus within it. However, parts of the walls around the gloves are transparent or there are adequate windows (not shown) so that the manipulation can be observed.

Figure 17:
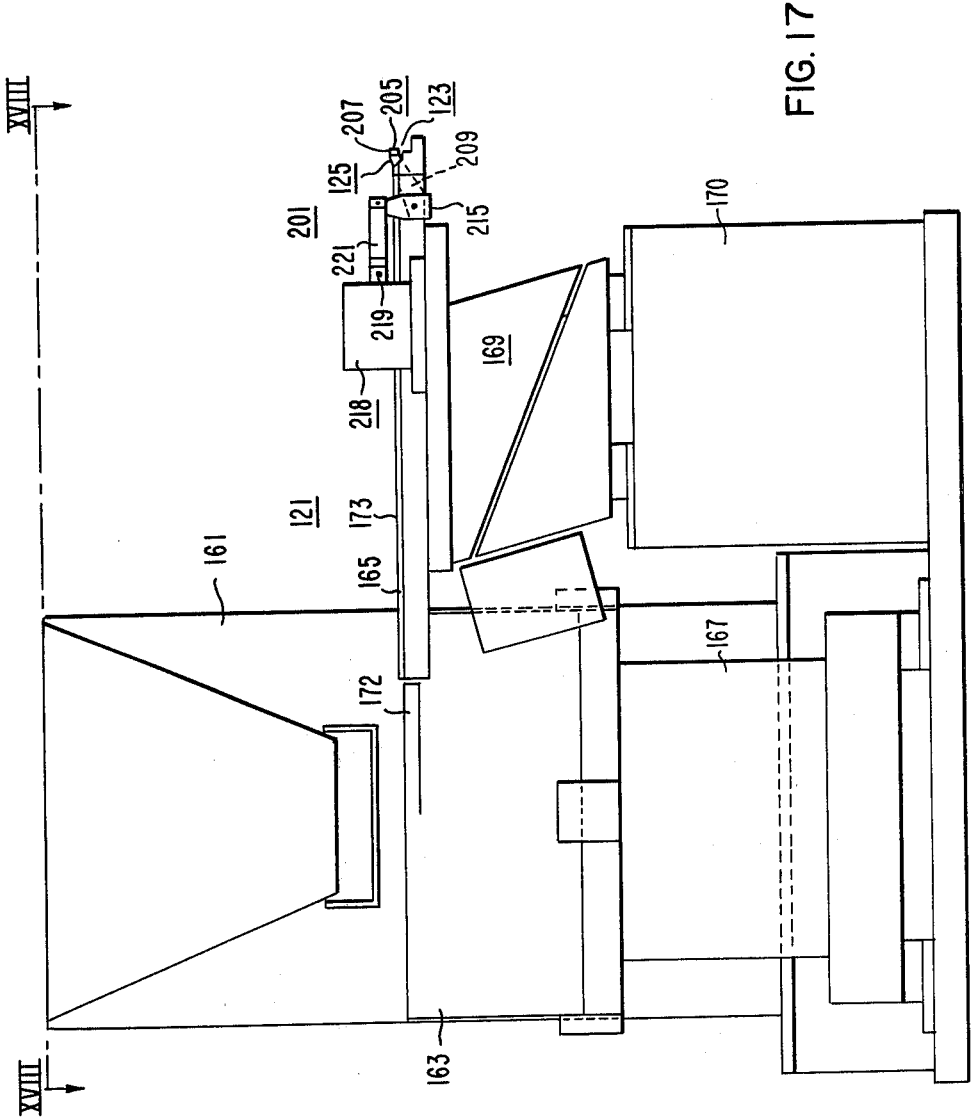
FIG. 17 is a view in side elevation of the pellet feeder assembly of the handling and gauging system of the invention.
Figure 18:
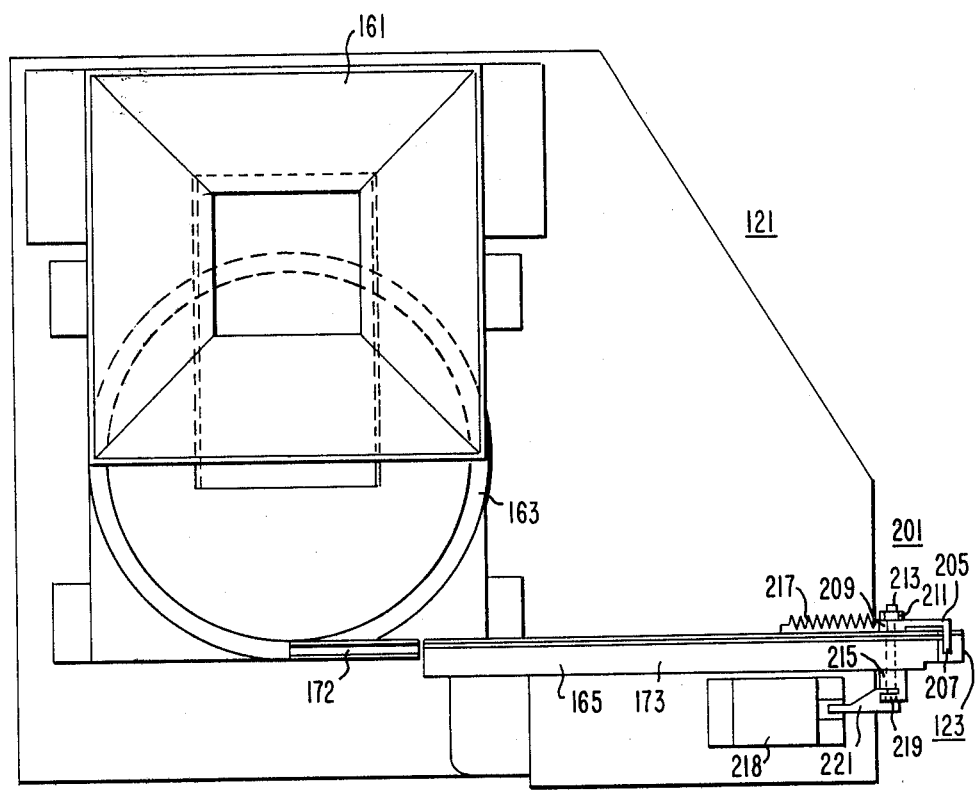
FIG. 18 is a plan view of the assembly taken in the direction of the arrow XVIII of FIG. 17.

The feeding mechanism 121 (FIGS. 2, 17, 18) for the pellets P includes a hopper 161, a bowl feeder 163, and a linear conveyor 165. The bowl feeder 163 has a drive 167 which oscillates it back and forth circumferentially and the conveyor has a drive 169 which moves it backward and forward horizontally. The linear conveyor 165 and its drive 169 are mounted on a riser 170 so that the conveyor is lined up with the outlet 172 of the bowl 163. The hopper 161, the bowl feeder 163, and the linear conveyor 165 and their drives 167 and 168, respectively, are bought from Morefeed Corporation as a unit. The drives 167 and 169 are in part spring actuated. They operate so that the bowl 163 and conveyor 165 return backwardly at a higher speed than they move forwardly. The springs (not shown) are so positioned that the pellets P are raised during the forward motion so that they are not fully in contact with the bowl 163 or conveyor 165 during the return motion; in addition the inertia of the pellets P precludes return movement. The drives 167 and 169 should be so set that the bowl feeder 163 and the linear conveyor do not vibrate against each other. The pellets P are manually poured into the hopper. The bowl 165 is provided with a paddle switch 171 which is adapted to engage the pellets P at the periphery of the bowl where the pellets are urged under centrifugal force. When the switch rests on the bottom of the bowl, it is on. When the paddle switch 171 senses a single pellet P of at least minimum diameter under it, it turns off the vibratory feeding of the hopper 161. The feeder bowl 163 is provided in its base with fixtures (not shown) which sort out and direct misoriented pellets back to the bottom of the bowl. The linear conveyor has a cover 173. The purpose of this cover is to suppress any tendency of the pellet to assume vertical or other positions out of the horizontal with the axis aligned in the direction of movement.

The pellet pick-up station 123 (FIGS. 3, 8 8A) is in an extension of the linear conveyor 165. This extension has a seat 175 in which each pellet P which is to be picked up is seated. This seat 175 is a groove in the extension which tapers outwardly or upwardly from an opening 177. Powder from the pellets flows through the opening 177 to downwardly sloping surfaces 178 and 180 (FIGS. 3, 41, 42) where it flows into tray 134. Surface 178 has a guard plate 182 to prevent the powder from falling laterally. In its length dimension, the seat 175 extends along the conveyor 165 so that each leading pellet P is appropriately seated. A pair of photosensors sense the position of a pellet P in the seat 175. Each sensor includes a light source 179 and 181 and a cooperative photodiodes 183 (FIG. 10) and 185. In FIG. 8 these reference numerals are applied to the conductors from these photodiodes. The sources 179 and 181 are supported on a bracket 187 (FIGS. 8, 27, 29) on one side of the seat 175 and the photodiodes are disposed in a bracket 189 on the opposite side of the seat 175. This bracket 189 has a cover 191 for shielding the photodiodes (183, 185) from stray light.

The upstream sensor 179-183 and the downstream sensor 181-185 cooperate with the control system 103 to condition the mechanical system 101 for appropriate operation in dependence upon the presence and position of a pellet P in the seat 175. If both the downstream sensor 181-185 and the upstream sensor 179-183 detect a pellet P in the seat 175, the pellet is positioned to be picked up. The sensor 181-185 also cooperates with a sensor at the sorting station 137 (FIGS. 10, 30, 31, 32) to coordinate the pick-up of a pellet P at the pick-up station 123 and the deposit of the same pellet at the sorting station 37. The sensor at the sorting station includes photodiodes 193 and 195 and a light source 197. The photodiodes 195 and 197 are connected in series to assure detection of a deposited pellet since the pellet is dropped into the sorting mechanism and may assume different positions. If neither the downstream sensor 181-185 nor the upstream sensor 179-183 detects a pellet P, there is no pellet in the pick-up station 123. Under these circumstances the gripper jaws are closed to pick up and transfer pellets in stations downstream from the pick-up station. If only the upstream sensor 179-183 detects a pellet, the pellet is partly in the pick-up station and the gripper jaws are prevented from closing. The detection of a pellet P only by the downstream sensor 181-185 may indicate that there is a broken pellet in the pick-up station 123; closing the gripper jaws is prevented.

The escapement 125 (FIG. 8) includes a back or upstream gate 201 and a forward or downstream gate 203. The upstream gate 201 (FIGS. 8, 17, 18) has a stop lever 205 in the form of an angle bracket with one side 207 extending across the linear conveyor 165 at its entrance to the pick-up station 123. When this side 207 is in the down position, it is capable of clamping a pellet P and preventing its movement into station 123. A clamped pellet P is shown in FIG. 8. The other side 209 of this lever 205 is pivotally connected to an arm 211. A pin 213 extends centrally through the arm 211 and through to an upwardly extending linkage 215. A spring 217 is connected to this arm 211 near its lower end. The spring 217 urges the lever downwardly with its arm 207 in pellet-clamping position. The force of the spring 215 is counteracted by a solenoid 218 when the solenoid is energized. The plunger 219 of the solenoid is connected pivotally to a linkage 221 whose fork-shaped end is pivotally connected to the upper end of linkage 215. When the solenoid 218 is energized, the linkage 215 is pivoted towards the upstream direction pivoting the lever upwardly and permitting the pellet P to flow into the pick-up station 123.

Figure 27:
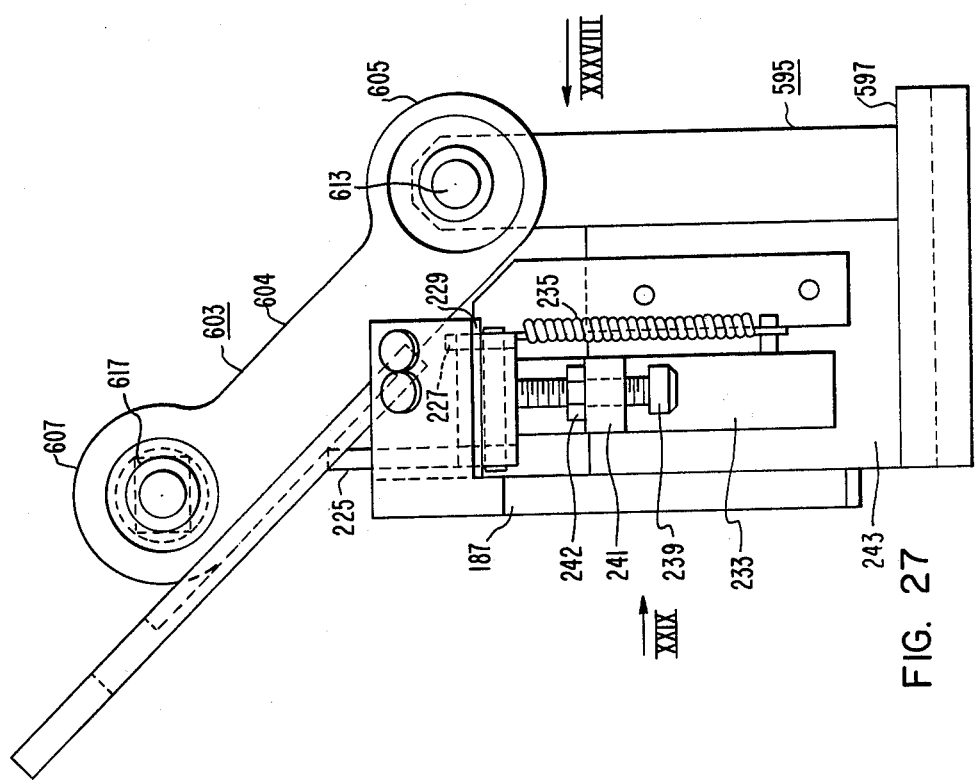
FIG. 27 is a view in side elevation of the support for the gripper assembly.
Figure 29:
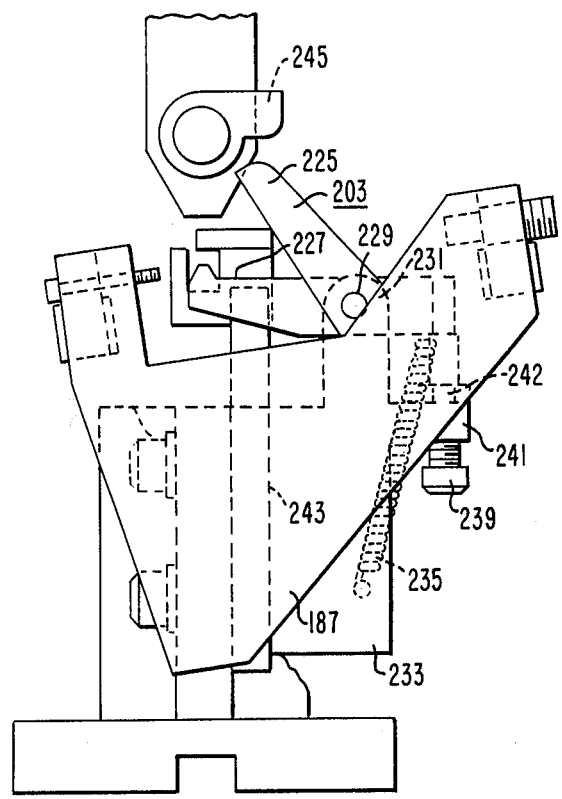
FIG. 29 is a view in end elevation in the direction of the arrow XXIX of FIG. 27.
Figure 30:
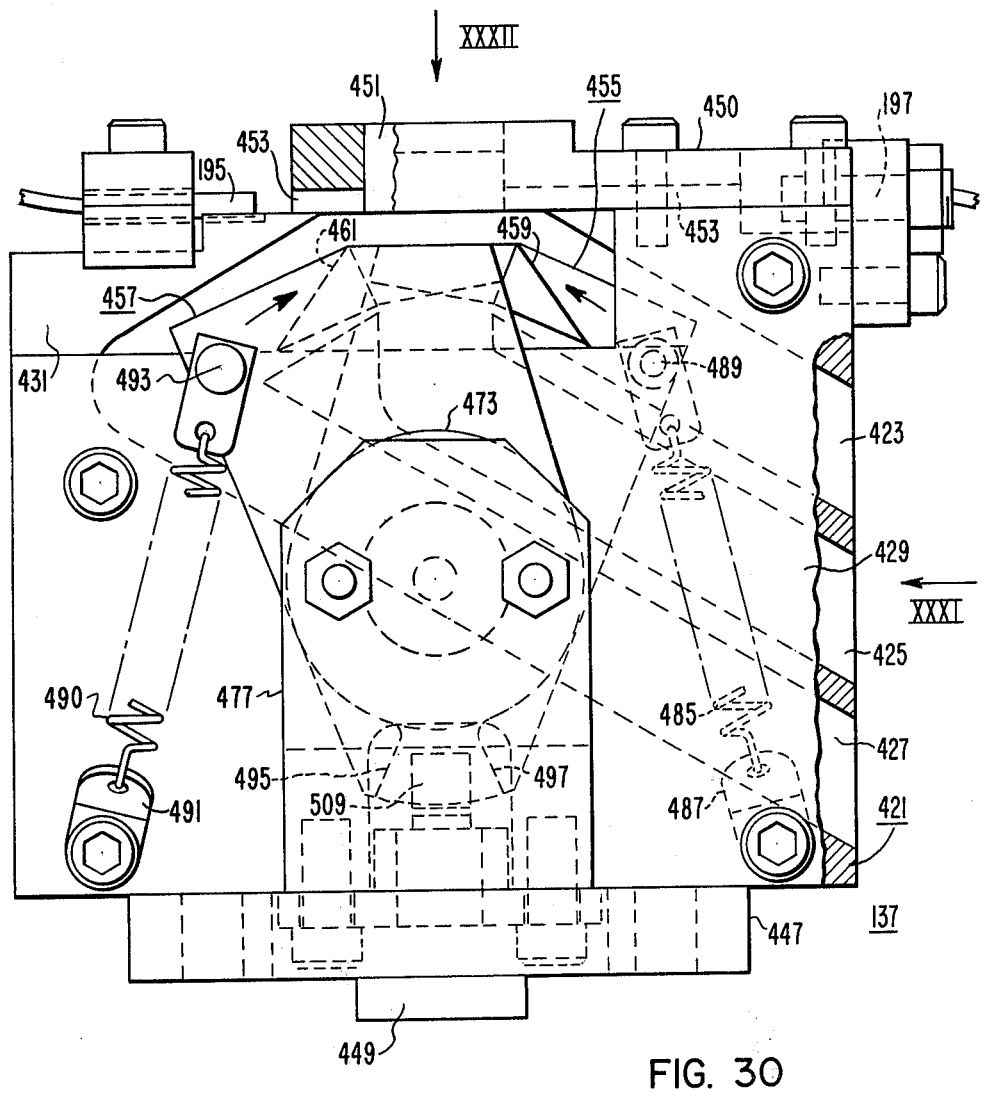
FIG. 30 is a view in side elevation of the sorting unit.

The downstream gate 203 is generally U-shaped and functions as a lever. The gate has arms 225 and 227. The arm 225 projects upwardly at an angle from the plane of the cross member 237 and other arm 227 (FIGS. 27, 29). The gate 203 is pivotal on a dowel pin 229 which is secured in the head 231 of an upright supporting plate 233. The pin 229 extends through both arms 225 and 227. A spring 235, which engages the longer arm 225 of the gate 203 near or at the cross member 237 of the U, pivots the outer end of the arm 225 upwardly. The displacement of the gate 203 is limited by a stop 239 (FIGS. 27, 29). This stop is a screw 239 which is screwed into a projection 241 extending laterally from the upright support 233. The upper end of this screw 239 engages the cross member 237. The position of the screw 239 is adjustable and it can be locked in any set position by nut 242. When the stop 238 is properly set, the outer end of the arm 225 extends across the downstream end of the pick-up station 123 preventing pellets P from being ejected from this end. The pellets are projected at a high speed by the feeding mechanism 121 and exerts substantial pressure. To prevent deformation of the arm 225 by this pressure a back-up bar 243 (FIG. 8) is provided behind the arm 225. The force of the spring 235 is counteracted by a cam 245 (FIG. 22) on the end of cam shaft 53 which, when actuated by the cam shaft, presses downwardly on the tip of the shorter arm 227. This action causes the end of arm 225 to move downwardly so as to permit a gripper, without interference, to pick up a pellet P in seat 175.

Figure 44:
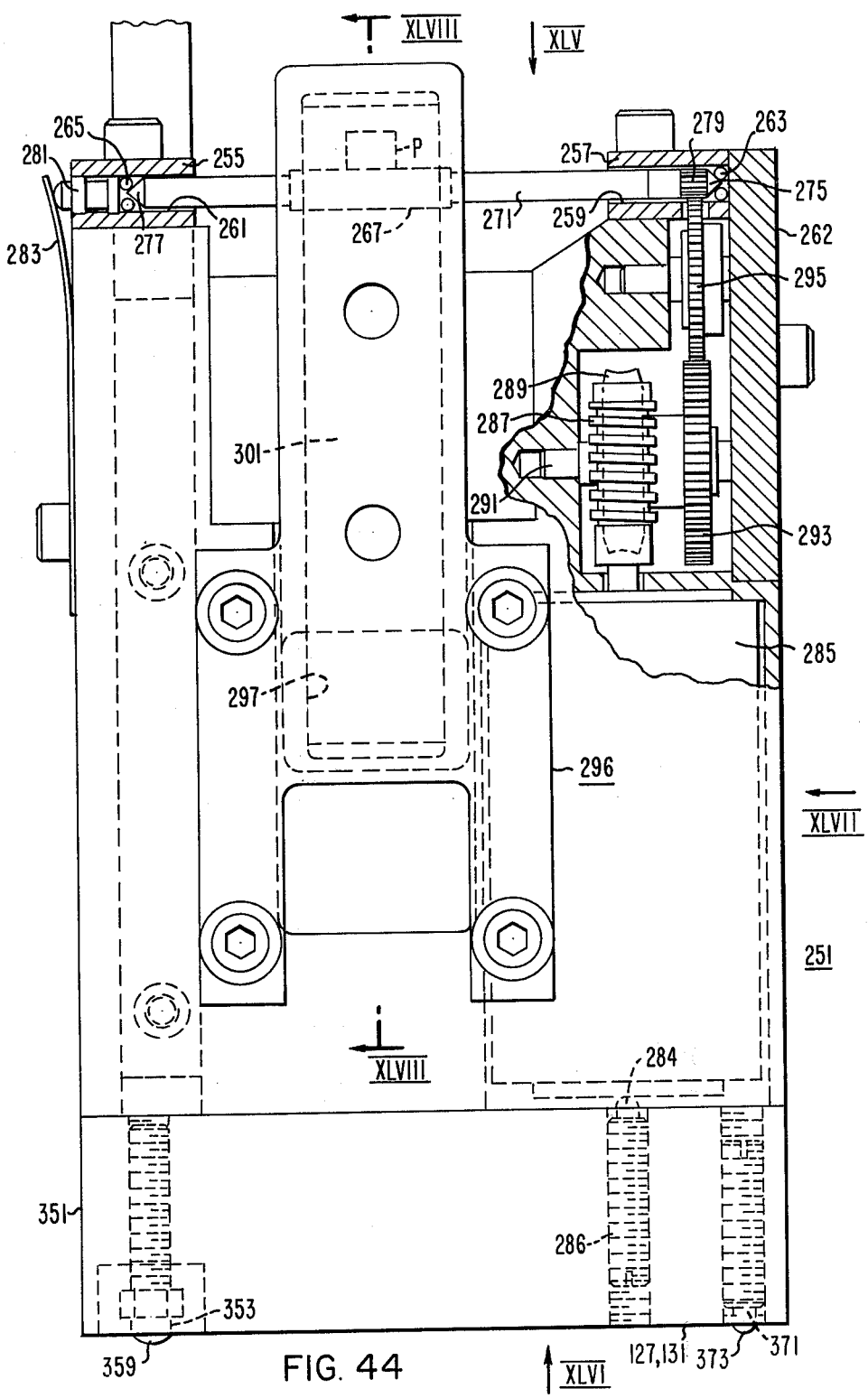
FIG. 44 is a view in side elevation and partly in section of a roller stand wherein pellets are seated for inspection for diameter or length.
Figure 45:
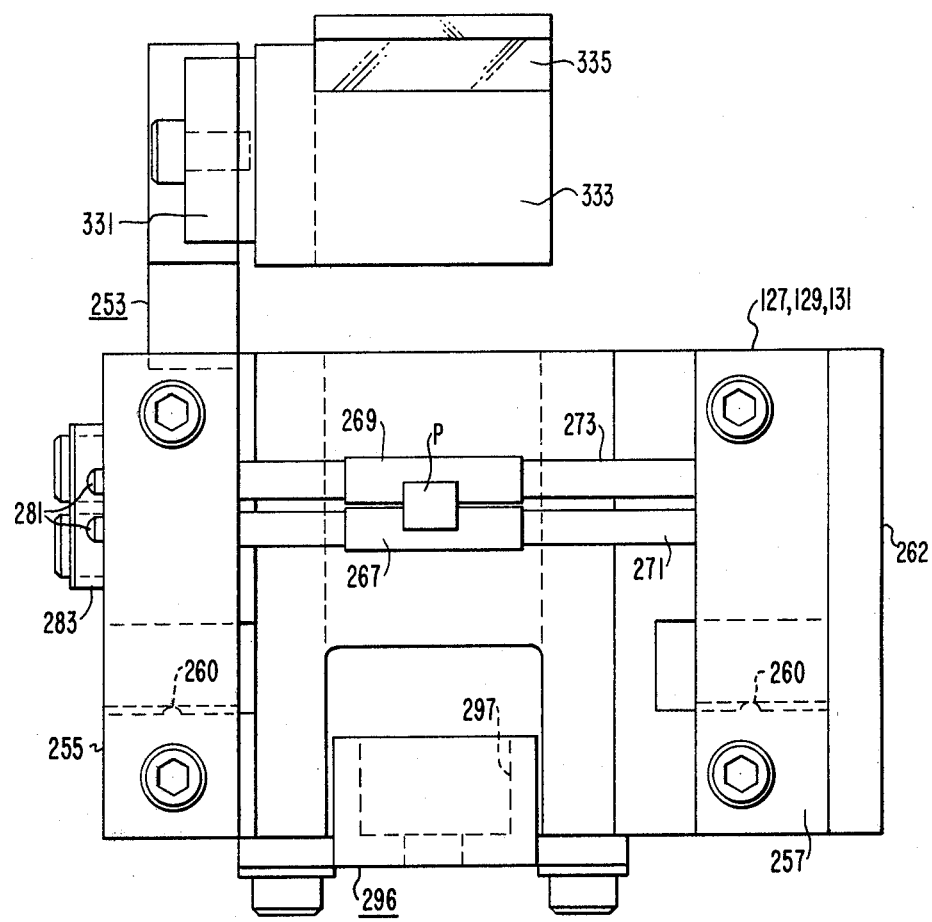
FIG. 45 is a top plan view in the direction of arrow XLV of FIG. 44 but also showing the facilities for flaw detection.
Figure 46:
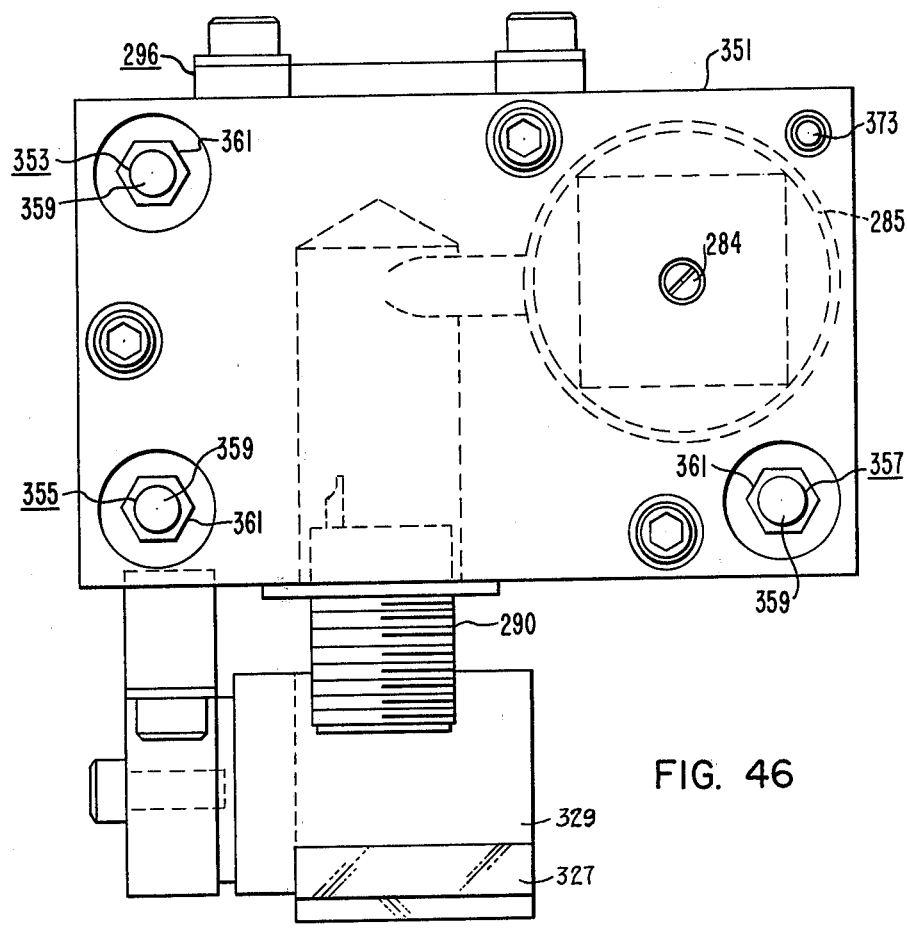
FIG. 46 is a bottom plan view in the direction of arrow XLVI of FIG. 44.
Figure 47:
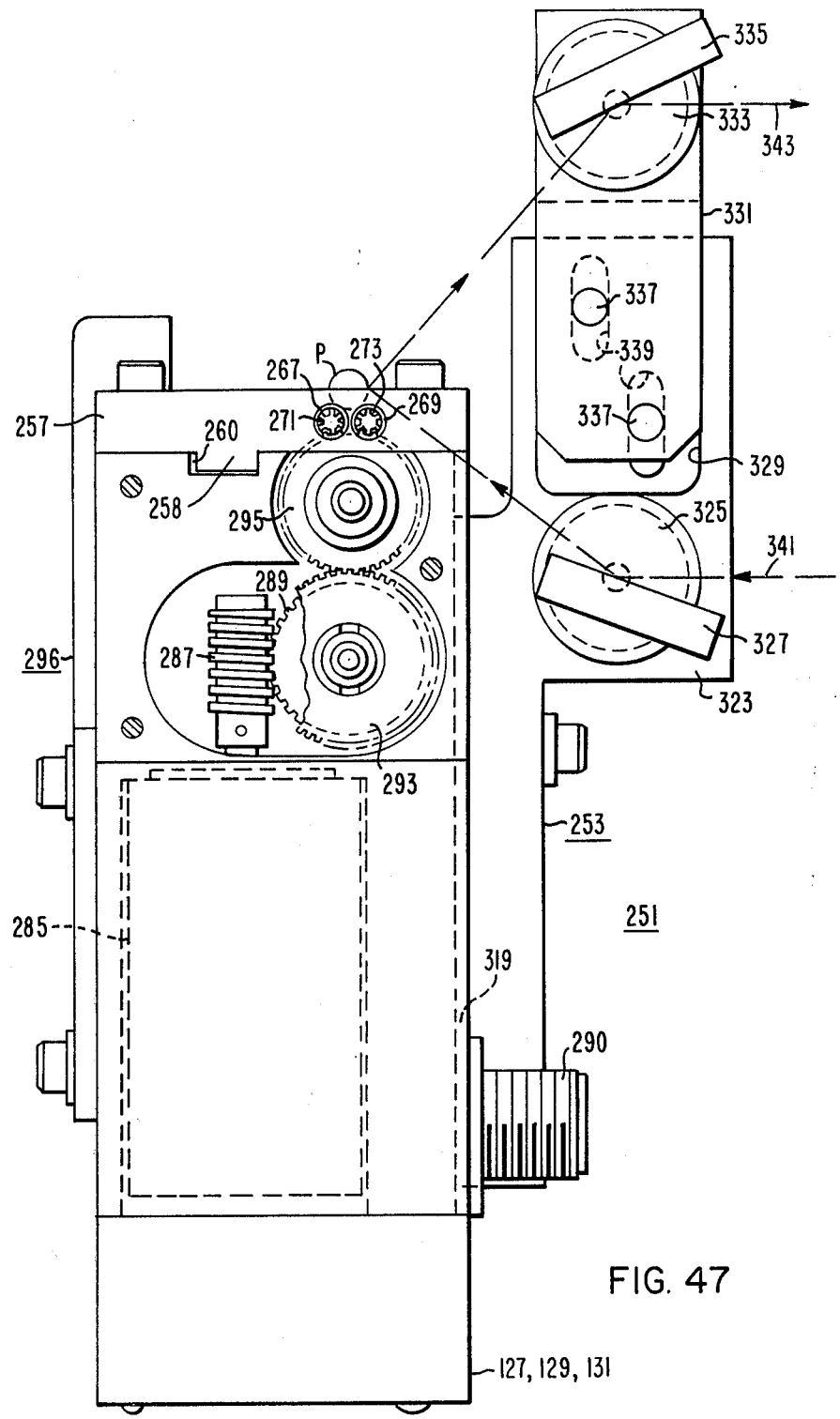
FIG. 47 is an end view in the direction of arrow XLVII of FIG. 44, with the cover removed, but also showing the facilities for flaw detection.

The diameter inspection station 127, the flaw inspection 129 and the length inspection station 131 each include a roller stand. The roller stands for the diameter and length stations 127 and 131 are alike. The roller stand for the flaw station 129 differs from the stands 127 and 131 only in that it requires an additional mounting instead of the mounted dove prism. A basic interchangeable roller stand box 251 is provided for all three stations. This box includes facilities for the additional mounting 253 for the flaw station 129, and lends itself to modification for use for diameter and length measurement and flaw detection. This basic box 251 is shown in FIGS. 12, 13 and 44 through 48. FIGS. 45 and 47 show the additional mounting 253. FIGS. 44, 45 and 47 show the mounting for diameter and flaw inspection.

Figure 12:
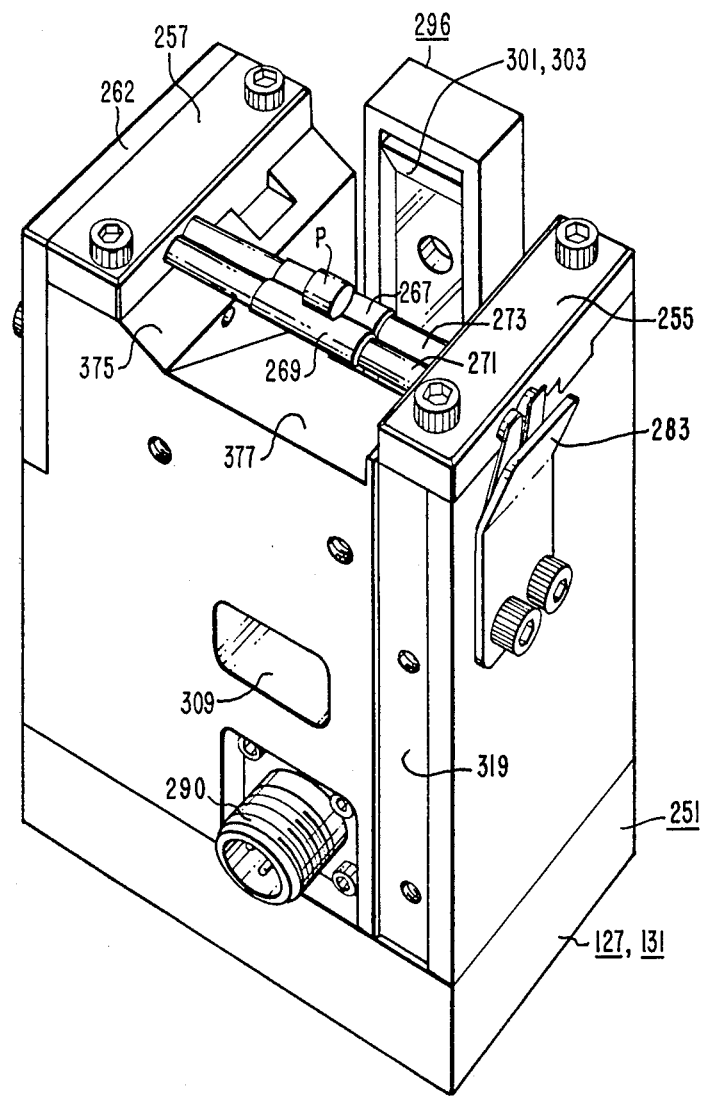
FIG. 12 is a copy of a photograph of the roller stand of the handling and gauging system shown in FIG. 2 which provides a seat for inspecton of pellets for diameter and length.

The box 251 has a deep opening from the top in the side away from the source and optical containers 139, 141 and 143, which is called here the rear, and a shallow opening from the top on the side towards the containers, which is called here the front. A block 255 is secured across one end of the box 251 between the front and rear sides. The other end of the box 251 has a shoulder. A block 257 is secured across this end between the front and rear. Each block 255 and 257 is provided with a pair of openings 259 and 261 (FIG. 44 only one opening for each shown). Corresponding openings 259-261 in the blocks are machined together and are coaxial. The openings 259 in block 257 are closed by a cover 262 which is flush with the shoulder. The blocks 255 and 257 are comprised of a metalloid such as tungsten carbide. The openings contain bearings 263 and 265 for the rollers 267 and 269. Between them the rollers 267 and 269 form a seat for a pellet P which is being inspected (FIG. 12).

Each block 255 and 257 has a tongue 258 (FIG. 48) which engages a slot in the contiguous end of the wall of the box 251. One side wall of each slot has a projection 260 intermediate its ends. The tongue is an interference slide fit in the slot between the projection 260 (FIG. 45) and the opposite wall of the slot. The width of the tongue is slightly greater than the distance between the inward end of the projection 260 and the opposite wall. The tongue wall 270 of each block 255, 257 is machined so that it is parallel to and at a constant distance from the axes of the bearing holes in which the shafts 271 and 273 of the rollers 267 and 269 rotate. The faces of the grooves opposite the projection 260 in which the sides of the tongues 258 are engaged are machined simultaneously so that they are coplanar. The surfaces 272 of the box 251 which are contiguous to the slots are also machined together coplanar and equidistant from the axes of the bearing holes. The mating surfaces of the blocks 255 and 257 are also machined so that they engage the corresponding surfaces of the box 251 precisely. This mode of joining the blocks 255 and 257 to the box 251 described above achieves this purpose and assures that the bearing holes in the blocks are precisely coaxial.

Each roller 267 and 269 is integral with its shaft 271 and 273. Since it is essential that the roller surface be precisely cylindrical and rotate precisely a unique procedure is followed in producing the roller-shaft units. Each shaft 271 and 273 is provided with conical bearing surfaces 275 and 277 (FIG. 44). In producing a roller and shaft unit the integral structure is first formed from a metalloid such as tungsten carbide. Conical ends are then turned on the shafts. The conical ends for each shaft are then lapped simultaneously so that their conical angles are equal and the cones are coaxial. The roller and shaft structure is then supported on the conical ends and the rollers 267, 269 are ground true. Each shaft is then provided with an integral gear 279 (FIG. 44) near the bearing surface 275 at one end.

At the end remote from the cover 262 a plunger 281 extends into the opening 261. This plunger 281 is comprised of a metalloid such as tungsten carbide. The plunger 281 is urged inwardly by a leaf spring 283 causing the bearings 265 to firmly engage the bearing surface 277 and the surface 275 to firmly engage the bearings 263. The bearings 261 and 263 are precision ball bearings composed of stainless steel. They, rather than the metalloid surfaces which they engage, become worn. They can readily be replaced at relatively low cost.

Cover plate 262 and block 257 are first secured to box 251. Box 251 is placed on its side with plate 262 downwardly. Four balls 263 are placed into each hole 259. Shafts 271 and 273 are inserted into holes 259. Block 255 is threaded onto the opposite ends of shafts 271 and 273. Then block 255 is engaged with box 251 as described above. Four balls 265 are inserted in each hole 261. Plungers 281 are installed and engaged by springs 283.

The rollers 267 and 269 are rotated by a synchronous motor 285 (FIGS. 44, 47) having quadrature field windings. The motor 285 is supported on a screw plunger 284 which is urged upwardly against the base of the motor by a spring 286. The head of the screw plunger 284 which engages the base of the motor 285 is spherical. This motor drives a worm 287 (FIGS 44, 47). The worm 287 drives a worm wheel 289. On the shaft 291 of the worm wheel 289 there is a gear 293 which drives a second gear 295. The latter gear 295 drives the rollers 267 and 269. It engages the gear 279 on the shafts 271 and 273 driving these rollers. The chain of gears 293, 295, 279 produce an increase in the rotational speed of the rollers 267 and 269 over the speed of the worm wheel 289. Power is supplied to motor 285 through terminal 290 (FIGS. 12, 46).

Figure 48:
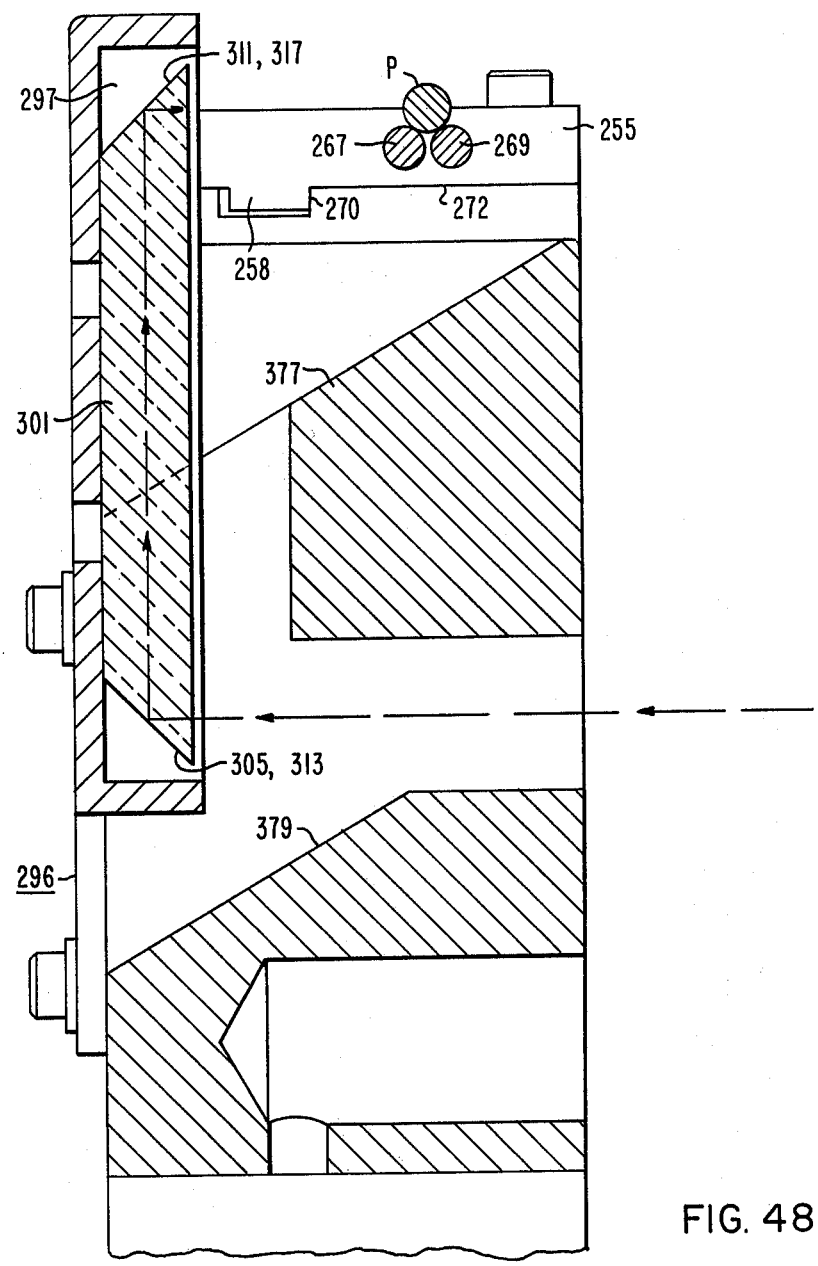
FIG. 48 is a view in partial section taken along line XLVIII—XLVIII of FIG. 44.
Figure 49:
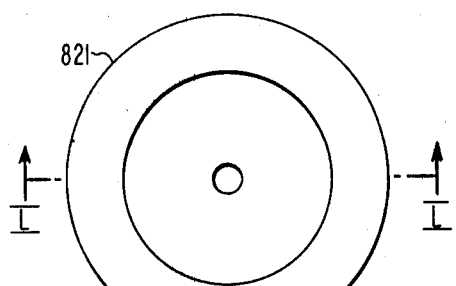
FIG. 49 is a plan view of a conical locating insert for receiving a locating button of the containers for source and optical system.
Figure 51:
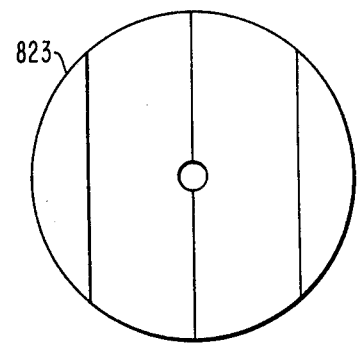
FIG. 51 is a plan view of a V-shaped locating insert for receiving a locating button.
Figure 50:
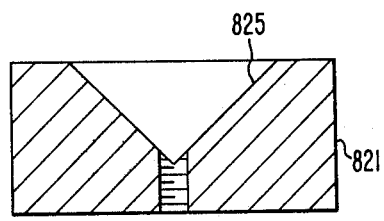
FIG. 50 is a view in section taken along line L—L of FIG. 49.
Figure 52:
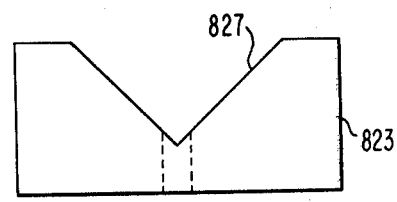
FIG. 52 is a view in side elevation of the insert.

For the diameter and length stations 127 and 131, a bracket 296 (FIGS. 45, 48) having a cavity 297 in the form of a rectangular parallelopiped is supported on the rear wall of the container below the deeper opening. The cavity 297 extends upwardly above the top of the opening. A dove prism 301 for station 127 and a dove prism 303 for station 131 are mounted within the cavity 297 with its totally reflecting surfaces facing towards the front (FIG. 12). The prism 301 is mounted so that its lower reflecting surface 305 receives the scanning horizontal beam 307 from the source and optical system 139 through the opening 309 and reflects it vertically upwardly (FIG. 48). The upper reflecting surface 311 of the prism 301 reflects the beam horizontally across the top of a pellet P on the rollers 267 and 269. The prism 303 is mounted so that its lower reflecting surface 313 receives the horizontal beam 315 from source and optical system 143 and reflects it vertically. The upper reflecting surface 317 reflects this beam as a horizontal sheet across the horizontal diametrical plane of the pellet P.

The basic box 251 has a groove 319 (FIG. 12). For the flaw station 129 the bracket or mounting 253 having a cooperative tongue member is supported in the groove 319 and secured therein (FIG. 47). In the lower part of its head 323, the bracket 319 has an adjustable mounting 325 for a plane mirror 237. This mirror is secured in the mounting 325 by tape. The mounting 325 is in the form of a disc and can be adjusted to set the angle of the mirror 327 to the horizontal. In the upper part of this head there is a slot 329. Within this slot a bracket 331 is slidable. At its top the bracket 331 carries an adjustable mounting 333 in the form of a disc. This mounting carries a plane mirror 335 secured therein by tape. The bracket 331 is secured in slot 329 by screws 337 which pass through slot 339 in the slot 329. The mirror 336 is adjustable vertically by adjusting the position of the screws 337 in the slots 339. The angle of the mirror 335 to the horizontal is adjustable by mounting 333. The mirror 327 is so set that this mirror reflects a horizontal scanning beam 341 having the contour of a thin vertical line from the source and optical system 141 to the surface of a pellet P on the seat formed between rollers 367 and 369 at the flaw station. The reflected beam scans the surface of the pellet P. Specular surface elements of the pellet P reflect the beam to the reflector 335. This reflector is so set that it reflects the scanning beam 343 horizontally to the source and optical system 141.

Figure 13:
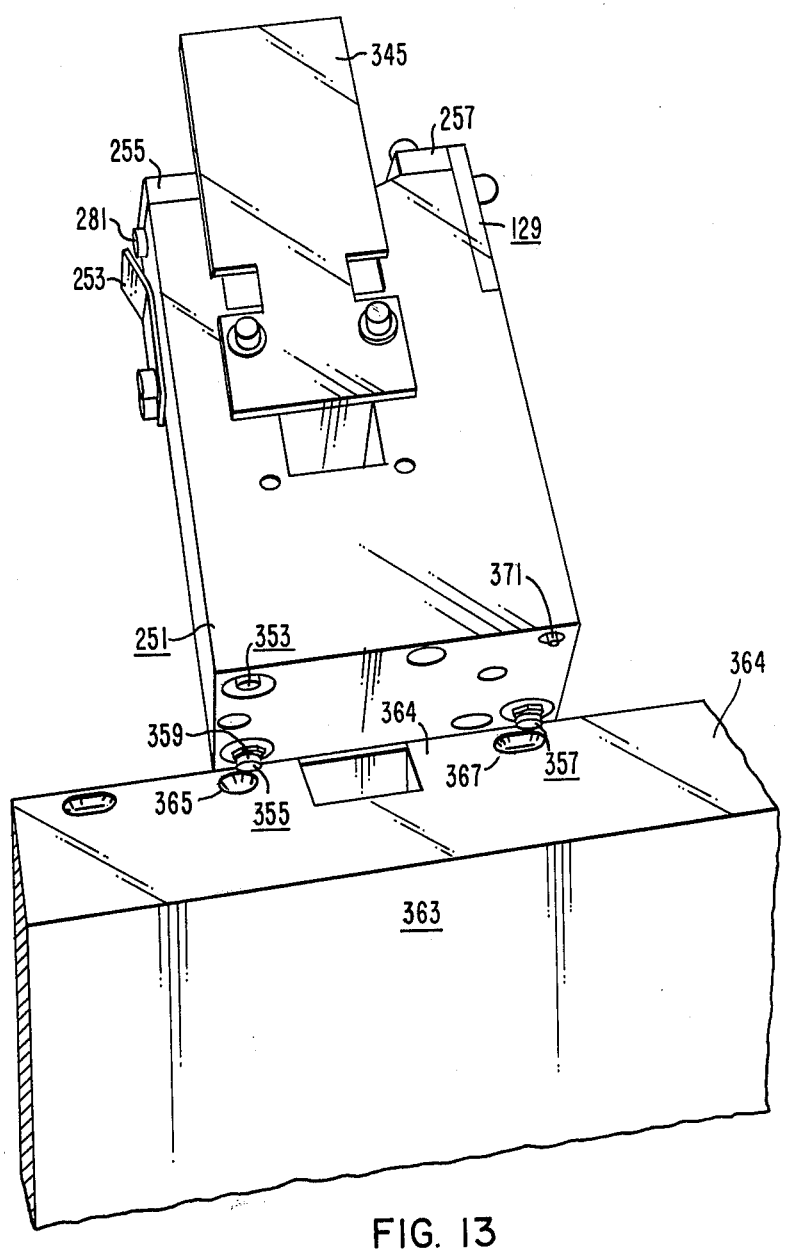
FIG. 13 is a copy of a photograph of the roller stand of this system providing a seat for inspection of pellets for flaws showing the base of the stand, its locating buttons, and the locating seats in and on the surface in which or on which the buttons are seated.

In lieu of the bracket 295 of the diameter and length stations 127 and 131, the basic box 251 at the flaw station 129 is provided with a plate 345 (FIG. 13). The plate 345 is secured to the rear wall of the box and extends completely across the deep opening of the box. The purpose of the plate 345 is to shield persons facing the apparatus from the laser beam projected towards the flaw station 129. The dove prisms 301 and 303 perform a similar function for the diameter and length stations 127 and 131.

For properly seating the roller stands each box is provided in its base 351 with a plurality of locating buttons 353, 355 and 357 (FIGS. 13, 46). The base 351 is rectangular and the buttons 353, 355 and 357 are disposed near three of the corners of the base 351. Each button is a screw having a spherical outer tip 359. Between the spherical tip 359 and the opposite end each button is provided with a hexagonal ring 361 so that it can be turned in a thread by a wrench. Each button 353, 355 and 357 is screwed into a threaded hole in the base 351 (FIG. 46) and secured with LOCTITE-222 sold by Loctite Corporation.

The support 363 on which the roller stands are disposed is provided with a precisely machined surface 364 for the roller stands. For each roller stand there is provided in this surface a precisely machined conical seat 365 and a precisely machined seat 367 having the cross-section of an angle. The conical seat 365 and the angular seat 367 have equal angles and equal altitudes. The seats 365 and 367 extend along the length of the base 351 near the front of the box 251 with the vertex of the angular seat 367 along the line between the axes of the conical seat 365 and the vertex of the angular seat which is parallel to the length dimension of the base 351. The spherical ends 359 of the locating buttons 355 and 357 are seated in the seats 365 and 367. The third button 353 provides a third leg for the support. The buttons 353, 355 and 357 are screwed into their corresponding holes in the base 351 of each roller stands to positions such that seats between the respective pairs of rollers 267 and 269 are horizontal. The buttons are properly set after the LOCTITE-222 is inserted; adjustment of the buttons does not break the LOCTITE fit. The roller stands are free standing but they are precisely positioned.

To equalize the load on the three buttons, a screw plunger 371 is provided near the remaining corner of the base 351. The head 373 of the screw 371 is spherical and is urged outwardly so that it resiliently engages the support surface 364.

Figure 41:
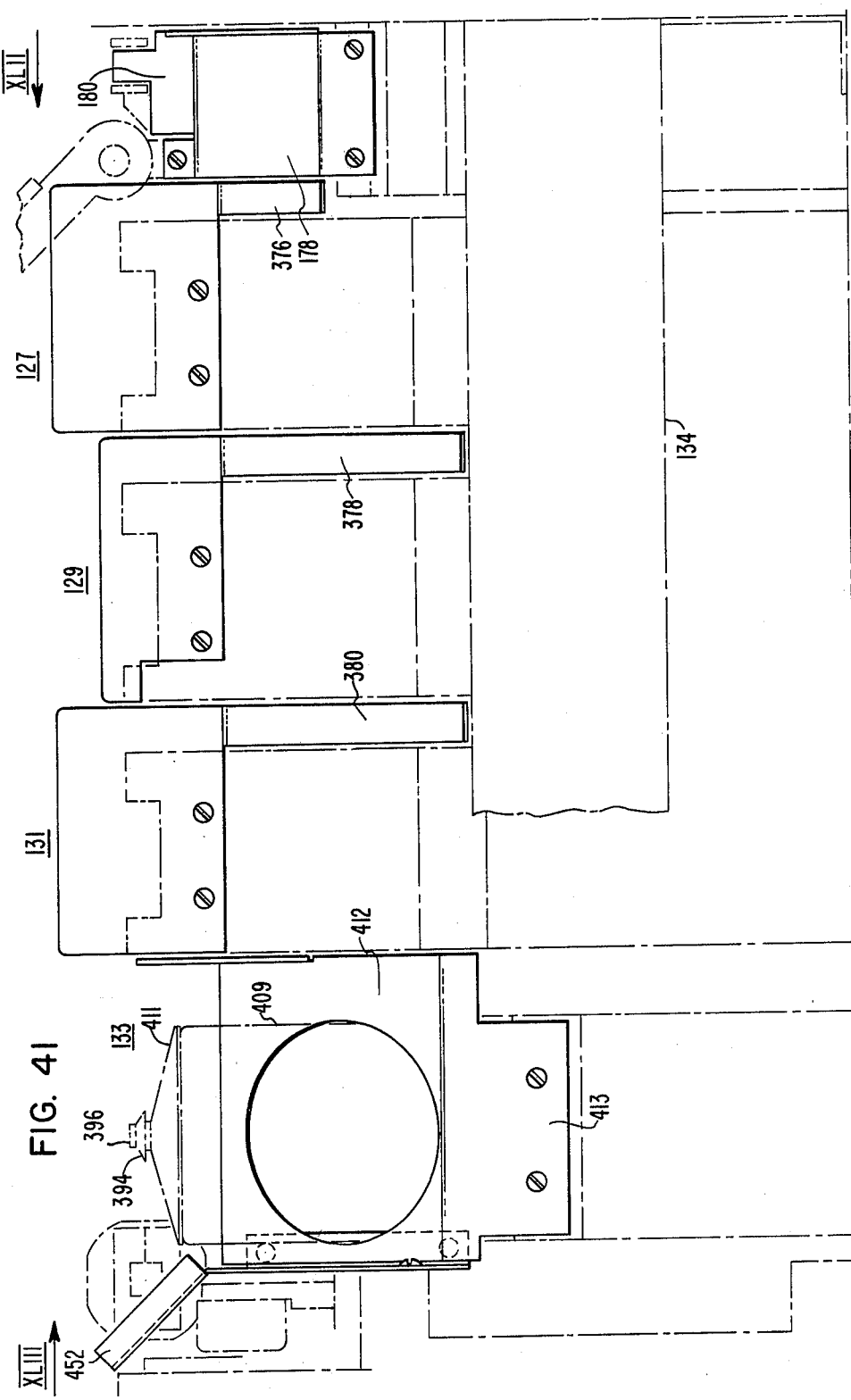
FIG. 41 is a view in side elevation generally in outline of the handling and gauging system showing the deflectors for stray pellets.
Figure 42:
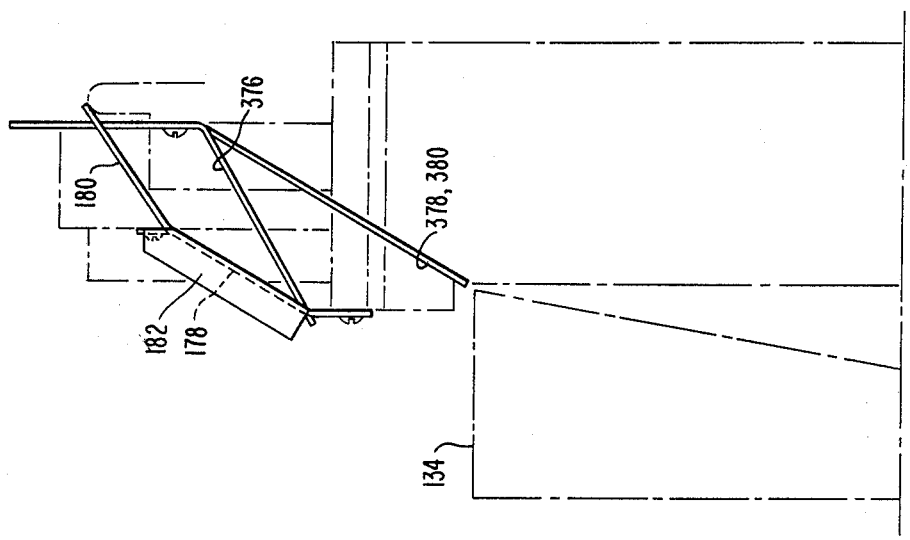
FIG. 42 is a view in end elevation in the direction of arrow XLII of FIG. 41.

Internally each box 251 is provided with surfaces 375, 377 and 379 (FIG. 48) for deflecting stray pellets P into the catch tray 134. Roller stands 127, 129 and 131 also have deflecting surfaces 376, 378 and 380 laterally to guide pellets P which fall laterally into catch tray 134 (FIGS. 41, 42).

The weighing station 133 has a weighing stand including a weighing scale 381 (FIGS. 2, 9, 9A, 41). The scale 381 is typically Model 222-004 supplied by Scientech, Inc. of 4549 Arapahoe Avenue, Boulder, Colo. 80303, modified in minor respects. The electrical and mechanical properties and the operation of the scale 381 are described in a manual of operating instruction and other literature available from Scientech and need not be elaborated upon here. (For circuit diagrams see Scientech drawings B202 000-532 and C 2479.)

The scale 381 includes a base 383 (FIG. 9) on which a permanent magnet 385 is mounted. Above the magnet 385 a C-frame 387 is mounted. A leaf spring 389 is secured to the top of frame 387. Another like leaf spring (not shown) is secured to the bottom of the frame 387. The weighing scale 381 includes a unit comprising the socket 391 for receiving the pan 396 (FIG. 9A) and an armature rod 393. A sleeve (not shown) extends from the bottom of the pan receiving socket 391 and frictionally engages the top of the armature rod 393. A frame 395 (FIG. 9A) is secured to the bottom of the rod 393. The frame 395 carries an annular coil 397. The coil 397 is interposed between the central pole (N) and peripheral poles (S) of the opposite polarity of the magnet 385. The receiving socket 391 and rod 393 are suspended from the leaf spring 389 and the second identical spring (not shown) secured to the bottom of the C-frame 387 with the socket 391 extending above the top of the C-frame. A small apron 394 (FIG. 41) in the form of a frustum of a cone is connected at its small radius end to the periphery of the pan 396 under the pan 396.

A pair of plates 401 and 403 (FIG. 9A) are suspended from the top of C-frame 387. The plates 401 and 403 are composed of insulating material (glass, for example) but are coated with foil (not shown). A grounded shield 404 extends around both plates. Capacitors are thus formed between each plate and the shield. The rod 393 carries a third plate 405 interposed between the plates 401 and 403. Opposite polarity alternating potentials (typically 10 KC) are impressed in the capacitor formed between each plate and the shield. A printed circuit board 407 is suspended from the C-frame 387. The capacitors formed with plates 401 and 403 are appropriately connected to the printed circuit. Movement of the rod 393 under a pellet P in the pan 396 varies the capacities of the capacitors in accordance with the displacement produced by the pellet. The relationship between the alternating voltages is thus varied. The output error signal resulting from this variation is impressed on the coil 397 so as to change the force of the magnet and to reduce the error signal and return the capacitors to the null balance position. The reading on the scale is derivable from the current in the coil 397. Initially the scale 381 is set so that for the empty scale the error signal is zero. When a pellet P is deposited on the scale the output signal acts to reset the pan-receiving socket 391 to its zero position and the error indication is derived from the output of the scale 381.

Figure 43:
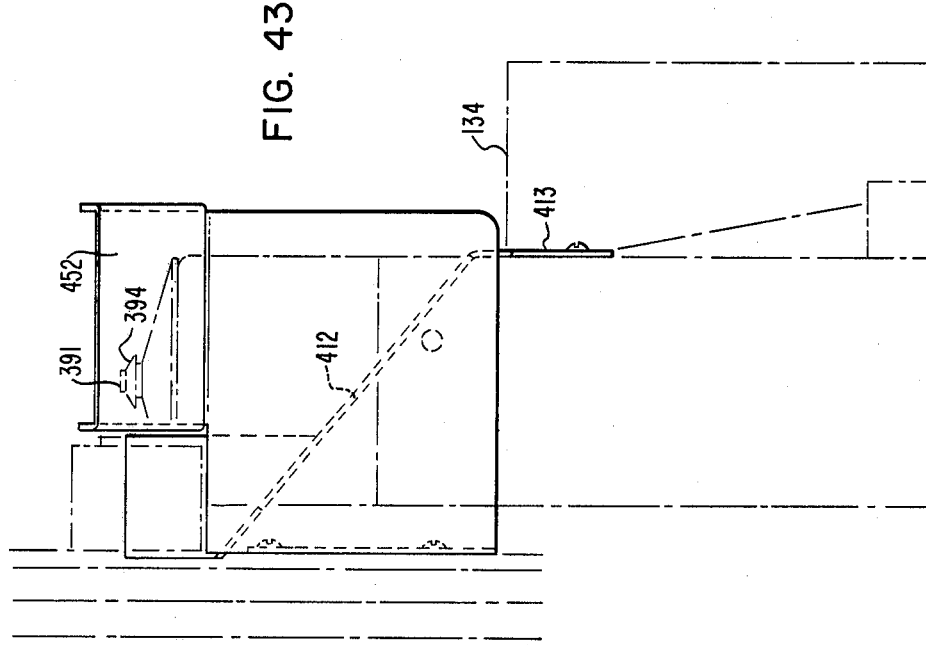
FIG. 43 is a view in end elevation in the direction of arrow XLIII of FIG. 41.

The scale 381 has a cylindrical housing 409 (FIGS. 2, 41). A second larger apron 411 in the form of a frustum of a cone is secured at its base to the cylindrical housing 409 and extends at its upper end to a position under the apron 394. The aprons 394 and 411 serve to deflect stray pellets and dust from pellets into the catch tray 134. There is also a sloping surface 412 around the cylinder 409 to guide pellets into tray 134 (FIGS. 2, 43).

The weighing stand 133 is provided with a base 413 (FIGS. 41, 43) similar to the bases 351 of the roller stands 127, 129 and 131, including locating buttons (not shown) such as buttons 355, 357 and 359 (FIG. 46) and a plunger (not shown) such as plunger 373 (FIG. 44). The surface on which the weighing stand is disposed has a conical seat (not shown) and an angular seat (not shown) similar to the seats 365 and 367.

The sorting station 137 includes a body 421 (FIGS. 4, 30, 33) in the form of a plate. The body 421 has slots or channels 423, 425, 427 in one of its surfaces. This surface is provided with a cover 429 which has a cutout 431 at the top. The face of plate 421 opposite the cover is provided with a corresponding cutout 433. The channels 423, 425, 427 each terminates in generally rectangular openings 435, 437, 439 respectively. Chutes 441, 443, 445 (FIGS. 2, 3, 19, 20) respectively communicate with each opening 435, 437, 439. The chutes 441, 443, 445 are positioned to deposit pellets P in the boats 153, 151, 149 respectively (FIG. 2). Pellets which pass inspection are deposited in boat 153. Pellets which can be reprocessed are deposited in boats 149. For example, such a pellet may be satisfactory except that its length or diameter is too large. Defective pellets which cannot be reprocessed are deposited in boat 151. The body 421 is secured to a base 447 (FIGS. 19, 30, 31) to whose ends cylindrical locating buttons 449 are secured. When the plate 421 is placed on the support of the mechanical handling and gauging system, the buttons 449 are appropriately seated along slots (not shown) in the surface of the support.

Figure 3:
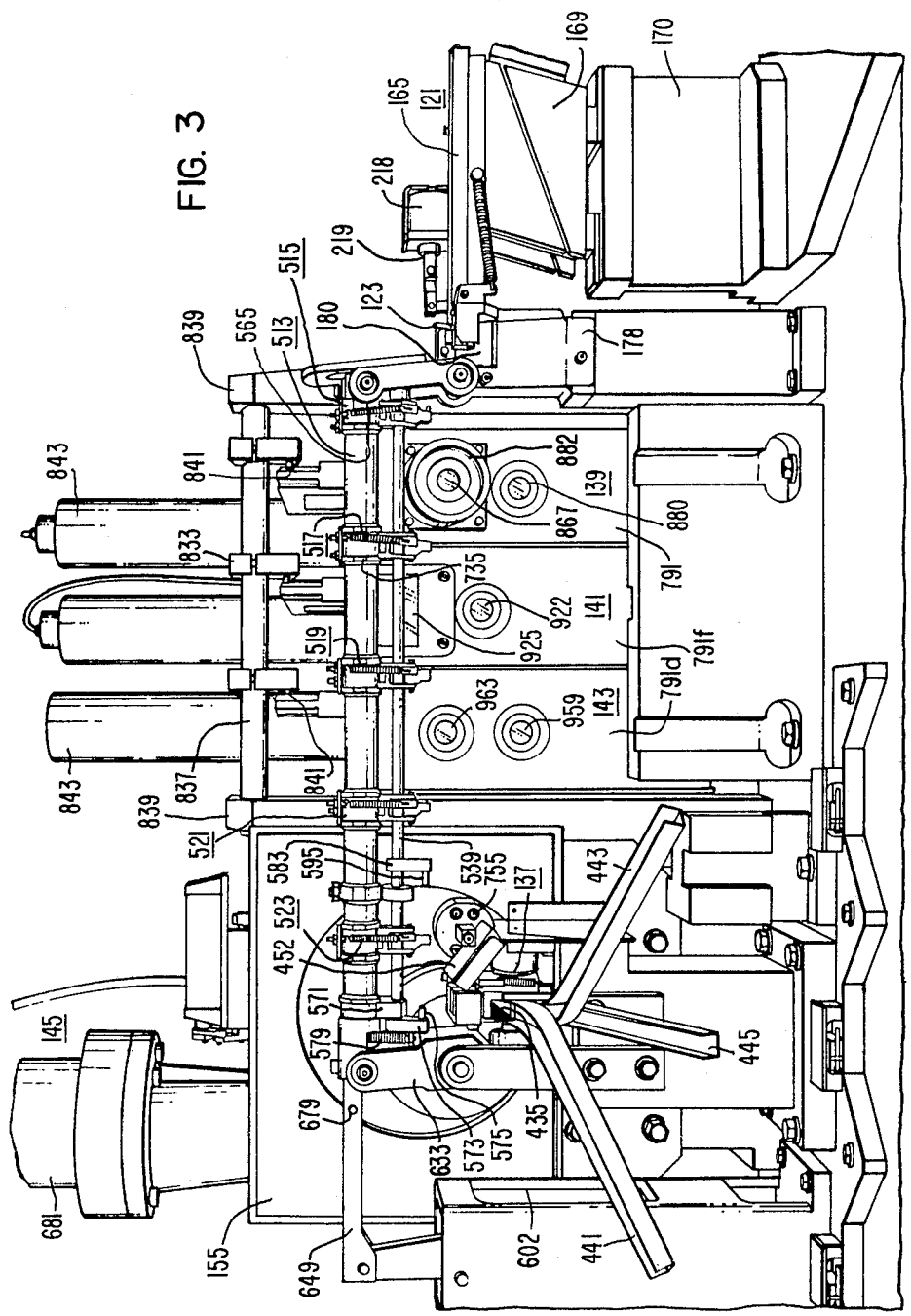
FIG. 3 is a copy of a photograph of the same system, with parts removed, showing predominately the pellet transfer assembly, the housing of the sources and optical systems and the pellet sorting troughs.

A bracket 450 is secured across the top edge of the body 421. The bracket 450 has an opening 451 which normally communicates with channel 425 and through it with chute 443 for pellets which pass inspection. Adjacent the opening 451 there is a sloping guide 452 for directing stray pellets to the catch tray 134 (FIGS. 3, 42, 43). The bracket 450 has a longitudinal opening 453 (FIG. 32) through which the light from source 197 impinges on photodiodes 193 and 195 which are connected in series. A pellet dropped through opening 451 interrupt the light beam to one or the other of the photodiodes.

Deflector plates 455 and 457 (FIGS. 30, 34, 34A) are provided for deflecting defective pellets depending on their defects into channels 423 or 427 and chutes 441 or 445. From the top of each deflector plate 455 and 457 a deflector 459 and 461 projects. The cross-section of each deflector 459 and 461 is a right triangle. The deflection of a pellet P is effected by interposing the hypotenuse of the deflector 459 or 461 between the opening 451, into which the pellet is injected, and channel 423 or 427. Each deflector plate 455 and 457 has a central opening 463 (FIG. 34) into which a hub 465 (FIG. 31) is pressed. Each deflector plate 455 and 457 also has an off-center opening 467 into which a stepped or shouldered pin 469 is pressed. Each deflector plate is actuable by a solenoid 471 and 473 respectively. Each solenoid is mounted on a mounting block 475 and 477 respectively secured to base 447. Each solenoid 471 and 473 has a shaft 479 which is rotatable in one direction when the solenoid is energized and in the opposite direction when the solenoid is deenergized. Shaft 479 is secured to the corresponding hub 465 by set screws 481. Shaft 479 of each solenoid 471 and 473 also carries a disc 483 which is rotatable with the shaft. Each pin 469 is secured to each disc 483 near the periphery. Pin 469 serves to set the angular position of its associated deflector plate 455 or 457.

The solenoid 473, its associated deflector plate 457 and their associated parts are mounted with the deflector plate 457 outside of the cover 429. The solenoid 471, its associated deflector plate 455 and their associated parts are mounted oppositely outside of the back of the body 421. Normally deflector plate 455 is held in its extreme clockwise position, with reference to FIG. 30, by a spring 485 which extends between an anchor 487 on the back of body 421 and a pin 489 near a corner of the deflector plate 455. The deflector plate 457 is normally held in the extreme counterclockwise position, with reference to FIG. 30, by a spring which extends from an anchor 491 on cover 429 and a pin 493 in the corner of the deflector plate. In these positions of deflector plates 455 and 457, opening 451 is in communication with channel 425. When solenoid 471 is energized, deflector plate 455 is rotated counterclockwise to interpose deflector 459 over the opening to channel 425 and to connect opening 451 to channel 423. When solenoid 473 is energized, deflector plate 457 is rotated clockwise to interpose deflector 461 over the opening to channel 485 and to connect opening 451 to channel 427.

Figure 31:
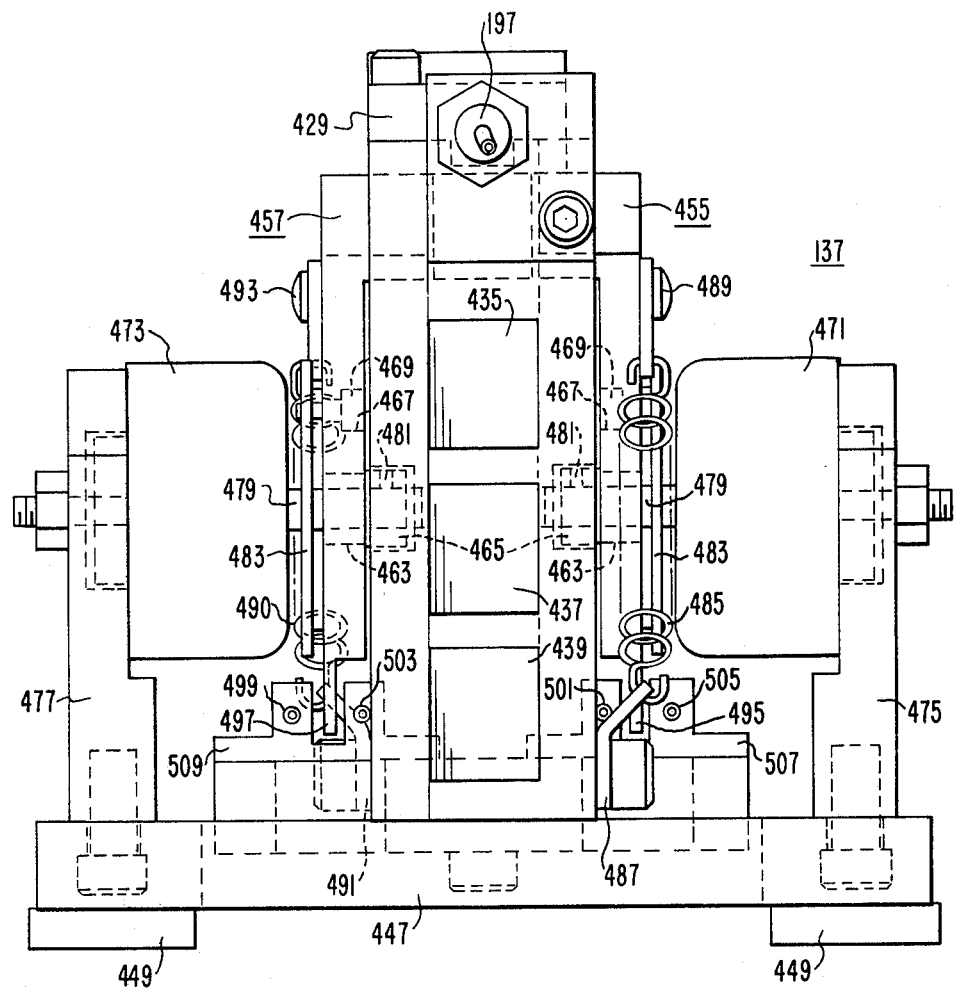
FIG. 31 is a view in end elevation in the direction of the arrow XXXI of FIG. 30.
Figure 32:
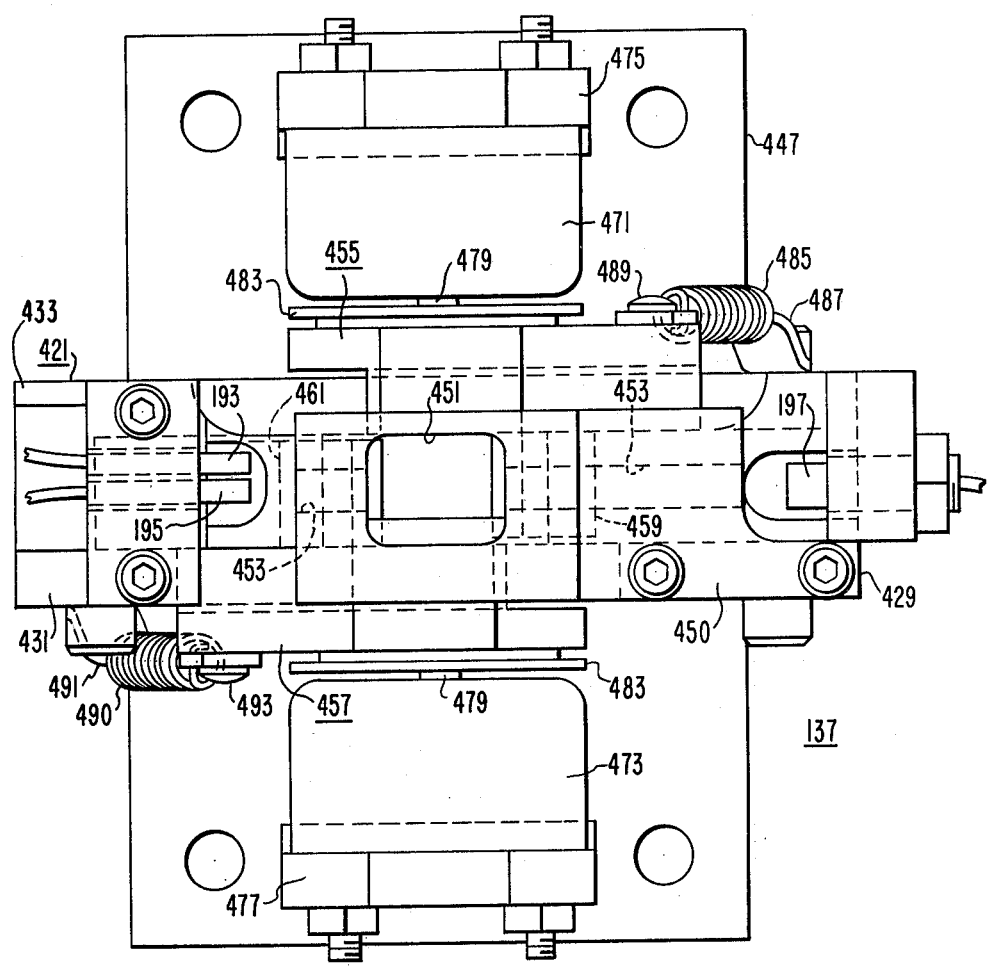
FIG. 32 is a plan view in the direction of the arrow XXXII of FIG. 30.
Figure 36:
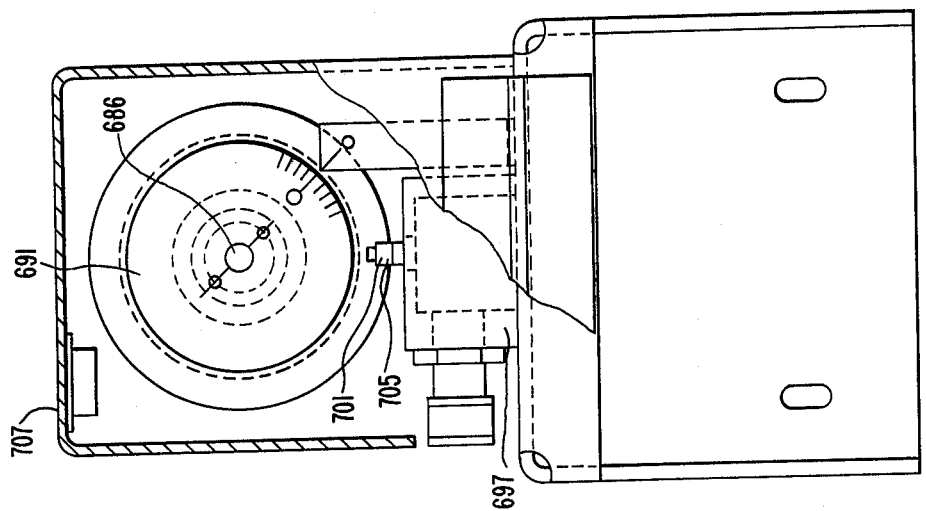
FIG. 36 is a view in section along line XXXVI—XXXVI of FIG. 35 with the lower part broken away.

Cams 495 and 497 extend from the bottom of each deflector plate 455 and 457 respectively. When a deflector plate is rotated to a position in which it deflects a pellet to channel 423 or 427, the corresponding cam 495 or 497 interposed between a light source 499 or 501 and photodiode 503 or 505 to indicate the changed channeling of the pellet. Each pair of light source 499 or 501 and diode 503 or 505 are mounted in projections of brackets 507 and 509 secured to base 447 (FIG. 31).

The pellet transfer mechanism 135 (FIGS. 2 through 7, 22 through 26) is a gripper assembly. This assembly includes a reciprocable beam 513 from which grippers 515, 517, 519, 521, and 523 are suspended. Gripper 521 picks up a pellet P at the pick-up station 125 and deposits it at the diameter inspection station 127; gripper 517 picks up the pellet at the diameter inspection station 127 and deposits it at the flaw inspection station; gripper 519 picks up the pellet at the flaw inspection station 129 and deposits it at the length inspection station 131; gripper 521 picks up the pellet at the length inspection station and deposits it at the weight station 133 and gripper 523 picks up a pellet at the weight station and deposits it at the sorter station 137. The distances between the longitudinal center lines of successive grippers 515 through 523 are equal to the distance over which each gripper is moved by the reciprocation of beam 513 in either direction. The distances between the centers of the pellets at successive stations 125 through 137 when they are seated on the seat 175 at the pick-up station 125, seats 167, 169 at stations 127, 129 and 131, seat 396 at the weight inspection station 133, and at the center of opening 451 at station 137 are also equal to the distance over which the beams 513 reciprocates.

Figure 4:
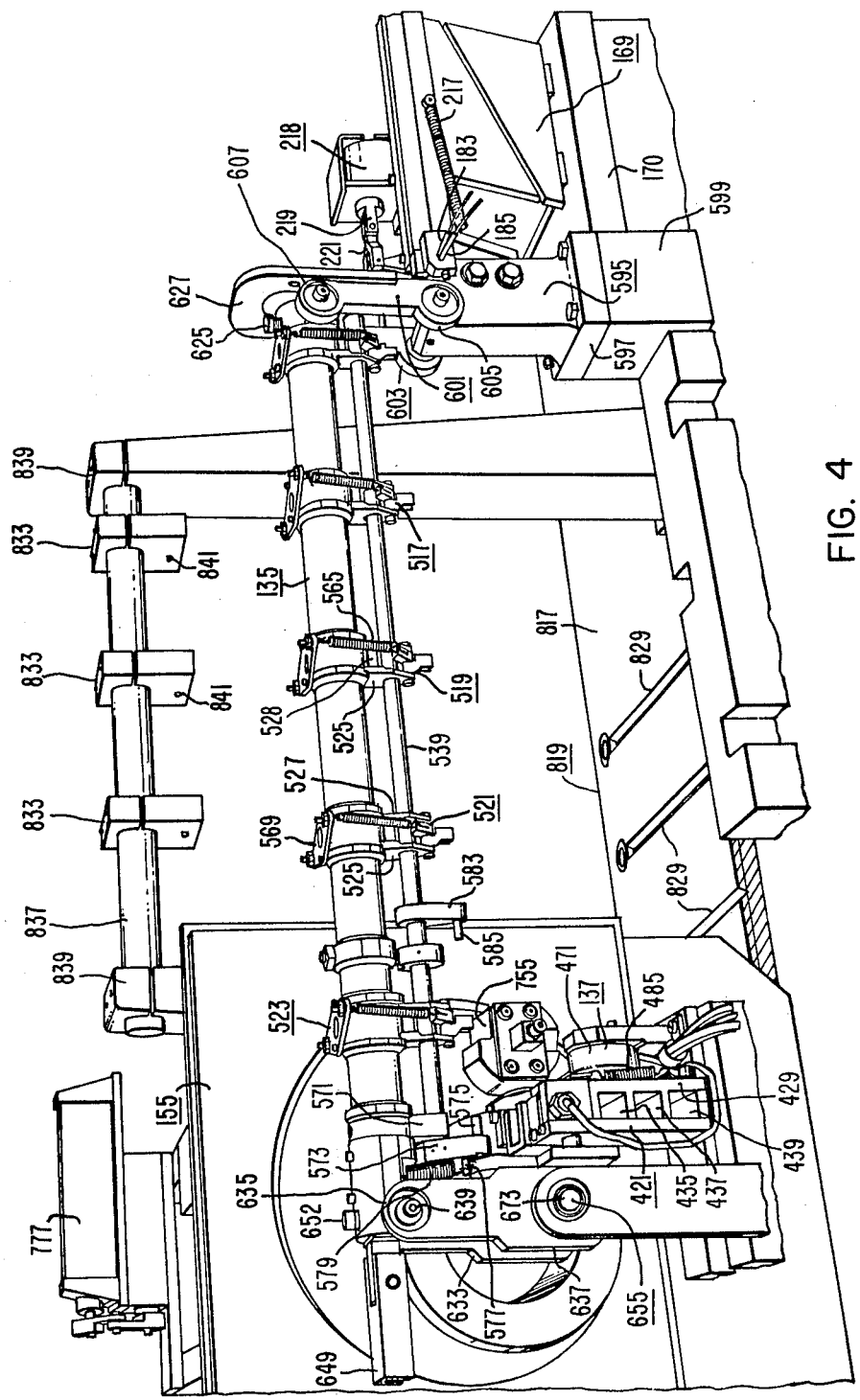
FIG. 4 is a copy of a photograph of the same system, with more parts removed, showing predominantely the pellet transfer assembly or mechanism.
Figure 5:
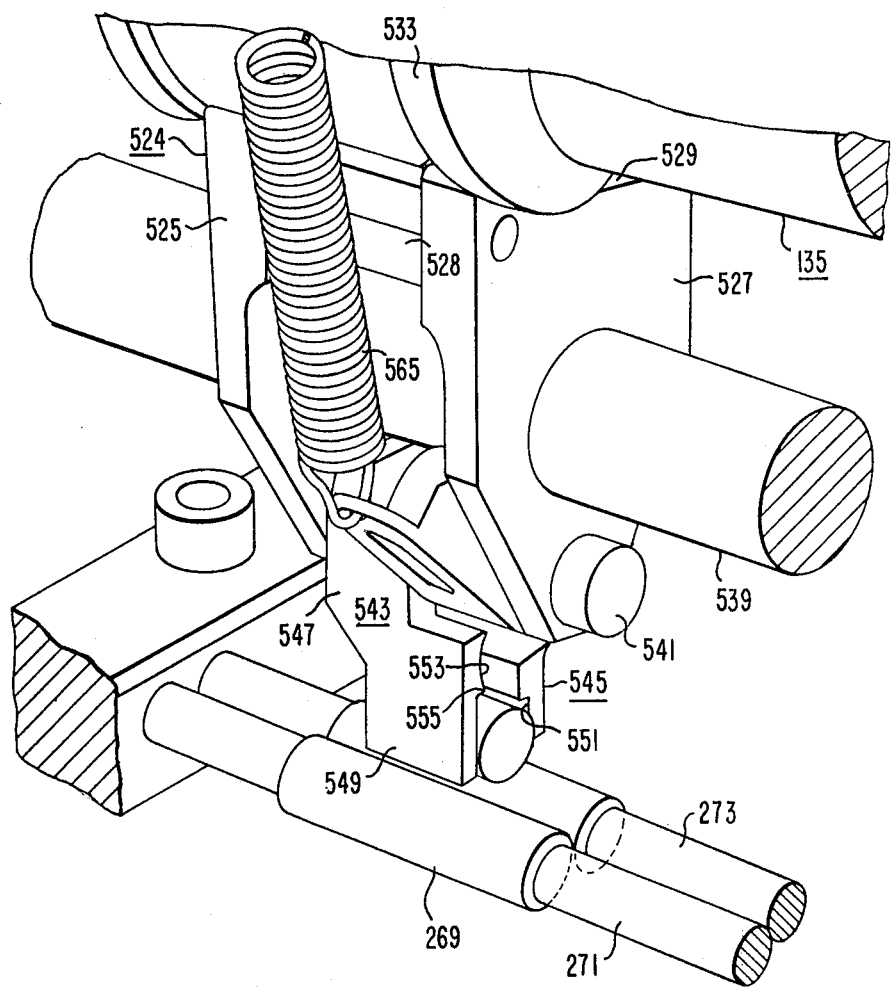
FIG. 5 is a copy of a photograph of a fragmental part of the system shown in FIG. 2 enlarged, showing a gripper in the act of picking up a pellet from its roller seat on a roller stand.
Figure 24:
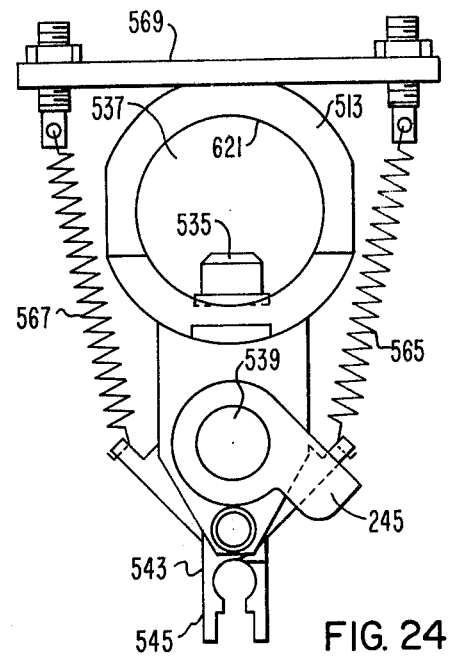
FIG. 24 is a view in end elevation of this assembly in the direction of the arrow XXIV of FIG. 22.

Each gripper 515 through 523 includes a clevis 524 comprising oppositely disposed supporting plates 525 and 527 joined at the top by a cross-member 528. The top edge 529 of each leg 525 and 527 and the cross-member 528 are curved (FIGS. 4, 5, 22). The beam 513 is hollow and has openings (not shown) at the top in the regions of the grippers. Grooves 531 (FIG. 7) are machined in the outer surface of the beam 513. The upper curved edges 529 of the plates 525 and 527 for the grippers 515 through 523 engage the beam in the groove. Laterally, these legs 525 and 527 abut the inner surfaces of the flanges 533 bounding the grooves 531. The clevis 524 is secured to the beam by a bolt 535 which is inserted and secured through holes 537 in the top of the beam and engages in a threaded hole 538 in the cross-member 528 (FIGS. 24, 25).

Each leg 525 and 527 is wide at the top and tapers below the cross-member to a narrow region at the bottom. The legs have holes predominately in the wider region and are mounted on the beam 513 with these holes coaxial. A cam shaft 539 extends through these holes. The legs 525 and 527 of the grippers 515 through 523 serve as bearings for the cam shaft 539. Near their narrow tips the legs 525 and 527 have coaxial openings in which a pivot pin 541 is supported.

Figure 6:
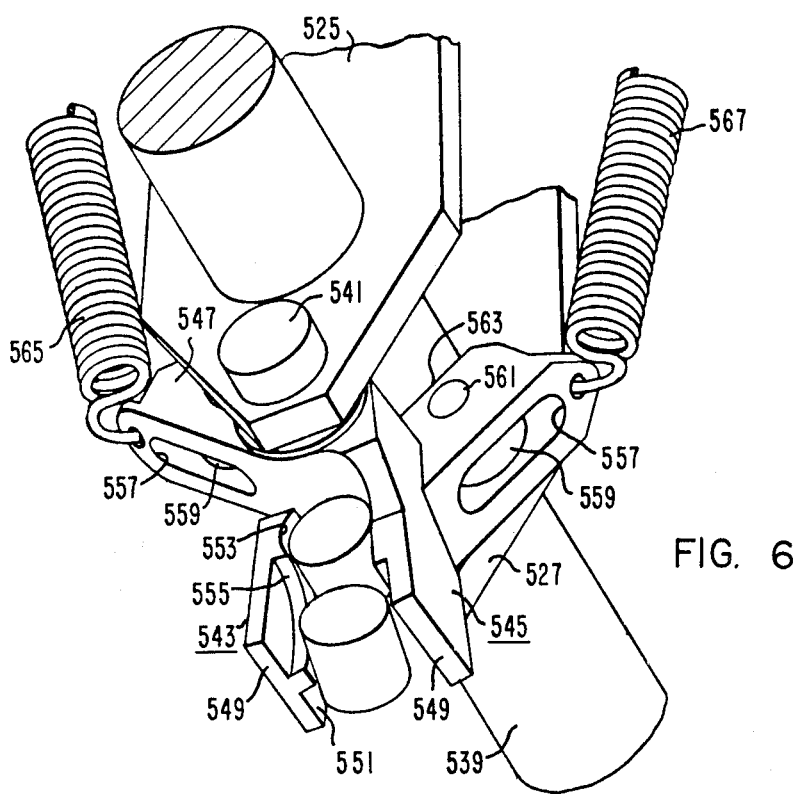
FIG. 6 is a copy of a photograph similar to FIG. 5 but showing how a gripper, in whose throat a pellet has been undesirably trapped, is prevented from picking up another pellet.
Figure 5A:
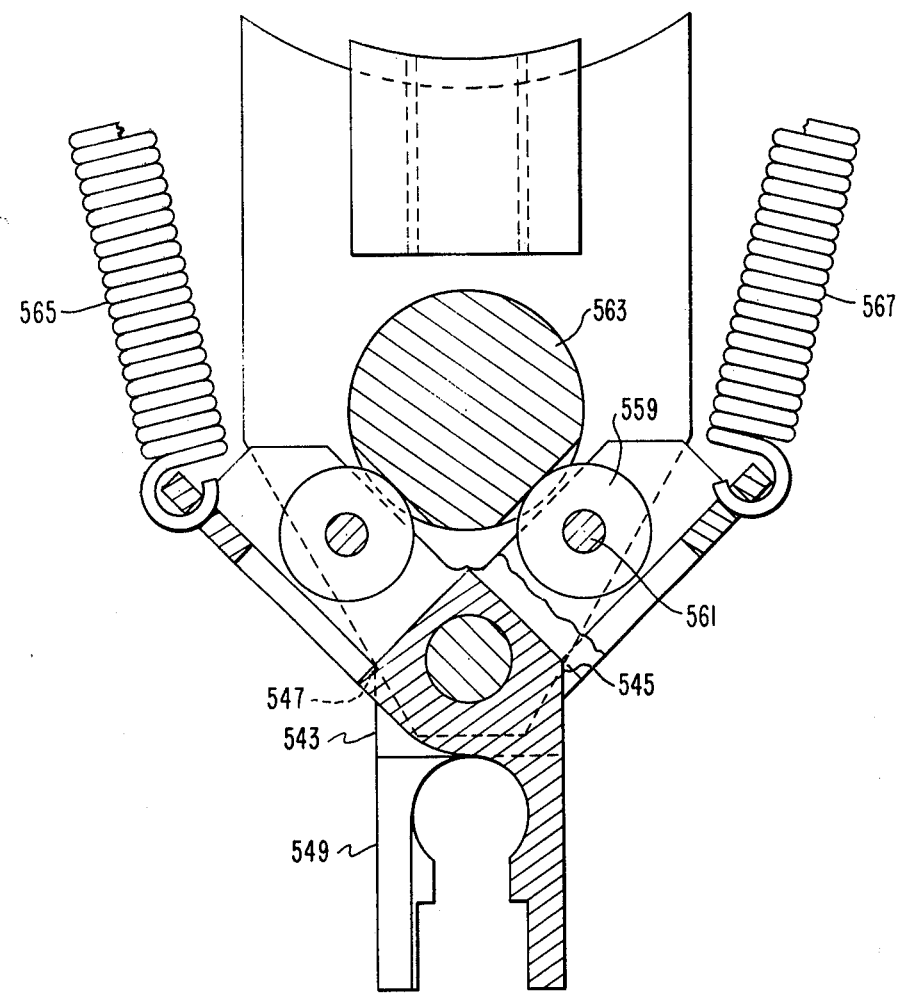
FIG. 5A is a fragmental diagrammatic view illustrating the operation of the gripper cam and cam followers.
Figure 7:
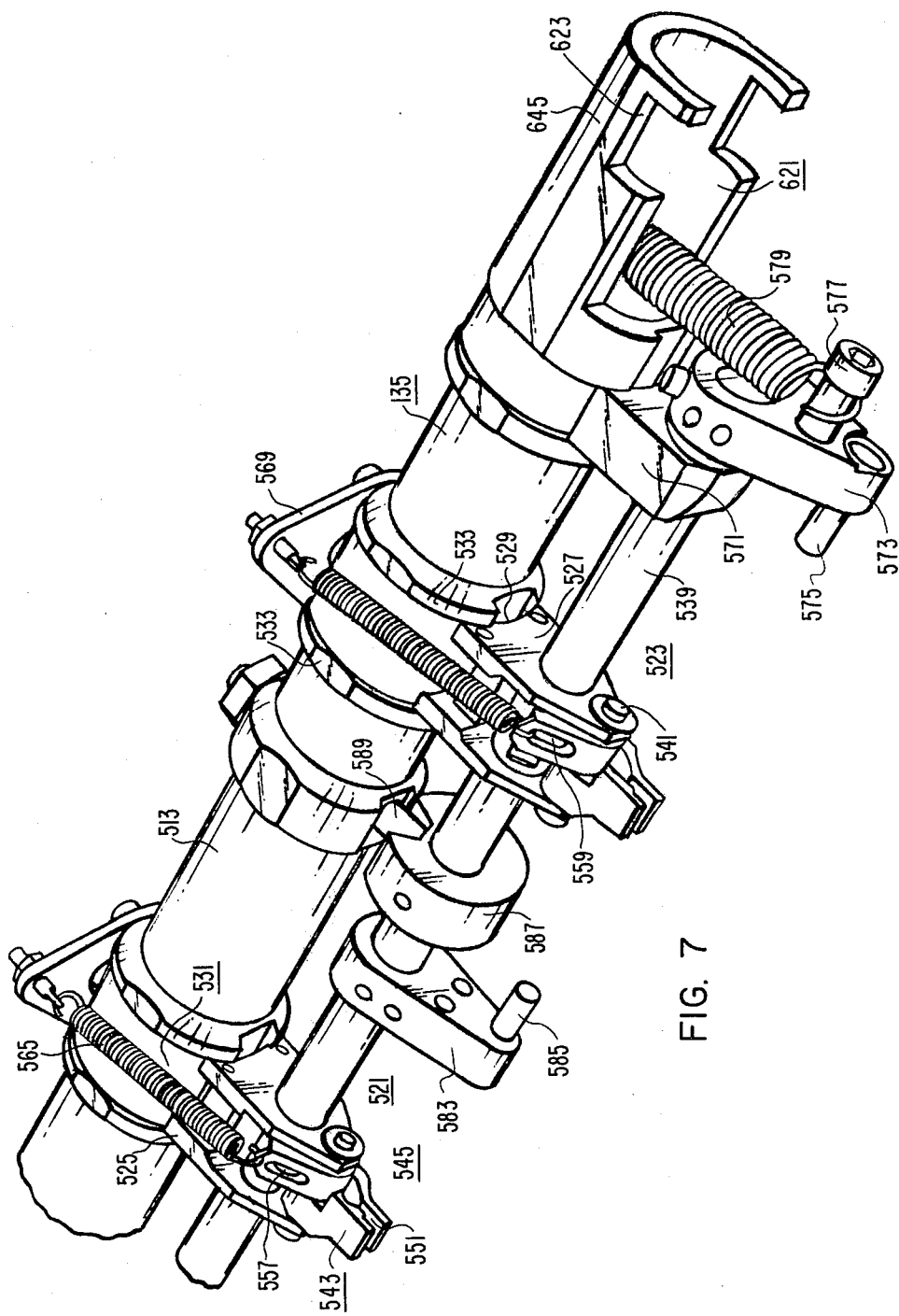
FIG. 7 is a copy of a fragmental part of the same system shown in FIG. 2, enlarged, showing the left-hand end with reference to FIG. 2, of the transfer assembly, and particularly the mechanism on the assembly which is actuable to set the grippers in pick-up and deposit positions.
Figure 9A:
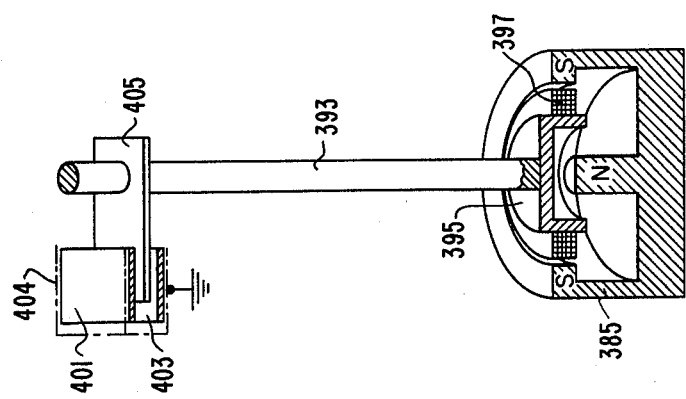
FIGS. 9 and 9A are views in perspective and generally diagrammatic showing the operation of the weighing mechanism used in the practice of this invention.
Figure 9:
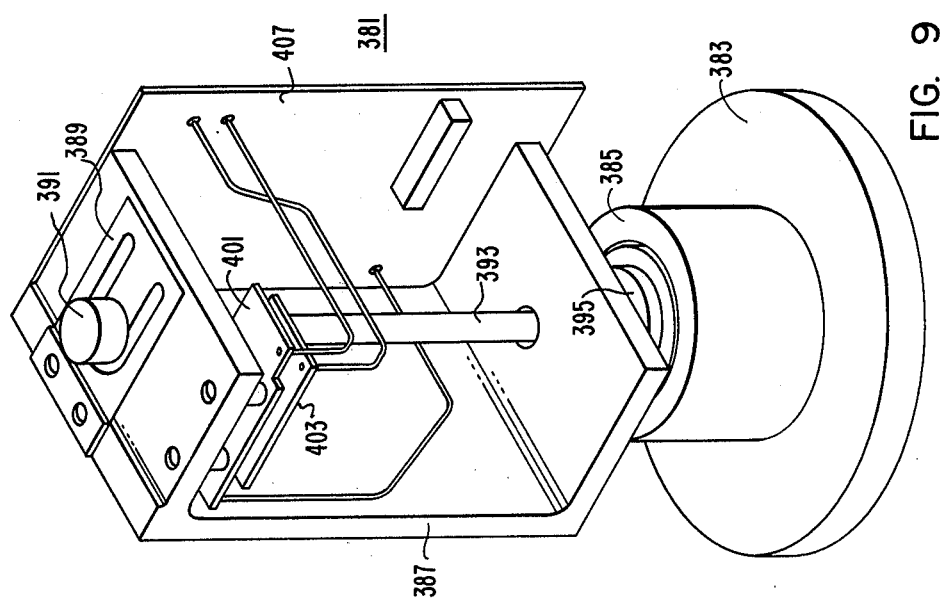

Each gripper has oppositely acting jaws 543 and 545 (FIG. 6). Each jaw 543 and 545 is of generally the form of a slipper but with the leg portion 547 offset with respect to the foot portion 549. The foot portion 549 has a flat face 551 at its outer end and terminates in an arcuate portion 553 internally. There is a projection 555 between the flat portion (FIGS. 6, 25) and the arcuate portion 553. The leg portion 547 has a slot 557 near its outer end. The jaws 543 and 545 are mounted on the pivot pins 541 crossing at the leg portions 547 near their junctions with the foot portions 549 and with the foot portions 547 oppositely disposed. Within the slot 557 in the leg portion 547, a cam roller or cam follower 559 is rotatably supported on a pin 561 extending laterally through the walls of the slot (FIG. 6). The cam followers 559 are normally in engagement with a cam 563 mounted on the cam shaft 539 and is rotatable with the cam shaft (FIGS. 5A, 6). The jaws 543 and 545 of each gripper 513 through 523 are urged closed by springs 565 and 567 which extend between the holes in the outer leg portions 547 of the jaws and generally diamond-shaped spring plates 569 secured to the top of the beam above the grooves 531 (FIG. 7).

The cam shaft 539 extends beyond gripper 523 (downstream) which picks up pellets P at the weight station 133 and deposits them in the sorting station (FIGS. 4, 22). This extension of the shaft 539 is provided with a bearing 571 with a curved edge engaging the groove 531 in beam 513. Just beyond the bearing 571 a lever 573 is pinned on the cam shaft 539 so that the cam shaft is rotatable by rotation of the lever 573. This lever carries a roll pin 575 near its outer end. The pin 575 is pressed into the lever 573. A bolt 577 is secured in lever 573 between the roll pin 575 and the cam shaft 539. A spring 579 is secured to the bolt 577 and a flattened surface 581 of beam 513. The spring 579 has a dead center position between opposite circumferential positions of the lever 573 and operates like a toggle. Between the grippers 523 and 521, a second lever 583, similar to lever 573, is pinned on the cam shaft 539 (FIGS. 4, 7, 22). The cam shaft 539 is also rotatable with the lever 583. Like lever 573, lever 583 carries a pin 585 near its outer end. Pins 585 and 575 extend oppositely from levers 583 and 579. The lever 583 is displaced circumferentially outwardly, with reference to FIG. 7. The displacement is such that when lever 583 is rotated counterclockwise as seen from the right-hand end of FIG. 7 (inwardly) it assumes the circumferential position of lever 573 at the start of the rotation and when lever 573 is rotated clockwise as seen from the right-hand end of FIG. 7 (outwardly) it assumes the circumferential position of lever 583 at the start of the rotation. For each rotation, spring 579 passes through dead center and operates as a toggle to lock the lever 573 or 583 and the cam shaft 539 in the final position. For rotation of the cam shaft 539 by lever 573, the cam 563 operates to close all jaws 543 and 545, and for rotation of the cam shaft by lever 583 the cam 563 operates to open the jaws 543 and 545. Between gripper 523 and lever 583 the cam shaft 539 carries a stop disc 587 which cooperates with a stop pin 589 (FIG. 7) on beam 513 to limit the circumferential movement of the cam shaft. Cam shaft 539 extends through plate 525 of gripper 515 (upstream end of beam 513), i.e. on the end extending towards the pellet feeder 121, and carries a cam 245 on this end. This cam 245 engages arm 227 of the escapement 123 and pivots the gate downwardly when the crank shaft 539 is rotated and the gripper 515 picks up a pellet at the pellet pick-up station 125.

In operation the jaws 543 and 545 are so set as to engage the pellet about half-way from their outer ends as shown in FIG. 5. If a gripper should attempt to deposit a pellet into a seat already occupied by a pellet, the second pellet is displaced into the gripper throat as shown in FIG. 6. This disables the gripper from picking the second pellet and precludes damage to the system. The attendant removes the pellet in the throat of the gripper manually.

Figure 28:
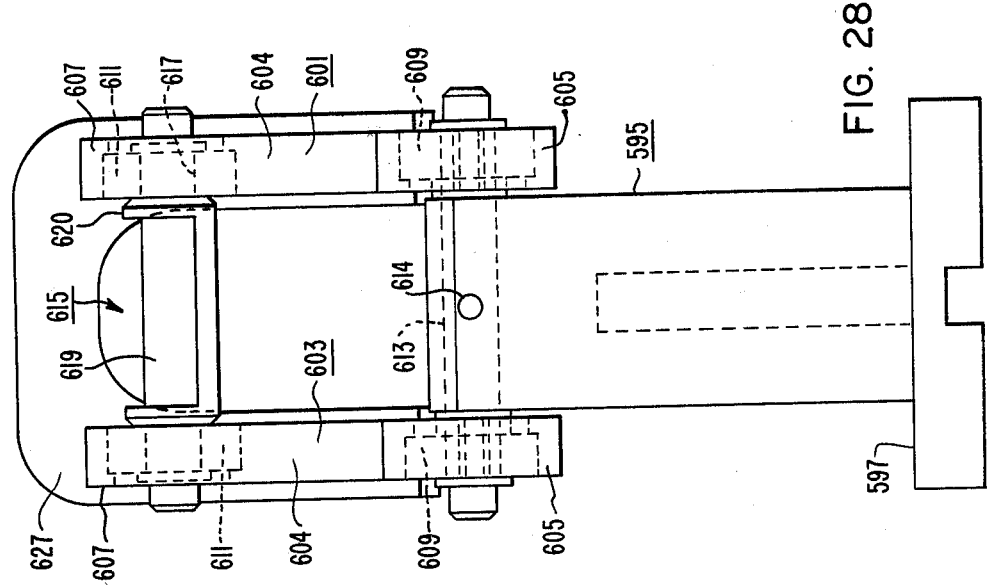
FIG. 28 is a view in end elevation in the direction of the arrow XXVIII of FIG. 27.

At the upstream end of the transfer mechanism 135 the beam 513 is pivotally supported on a support 595 (FIGS. 4, 8, 27, 28). Further upstream this support carries the pellet pick-up station 123 and the escapement mechanism 125. The support 595 is integral with a pedestal 597 which is keyed to a supporting column 599. The pivoting of the transfer mechanism 135 on the upstream end is effected by supporting arms or linkages 601 and 603. Each linkage is in the form of a distorted dumbbell consisting of a central straight portion 604 terminating in circular ends 605 and 607. The circular ends have transverse circular cavities in which they receive ball bearings 609 and 611 (FIG. 28). At the lower end the linkages 601 and 603 are supported on a shaft or pin 613 which passes through a hole in the support 595 and is secured by a set screw 614. The pin 613 is near its ends secured to the fixed races (not shown in detail) of the bearings 609; the ends 605 are secured to the rotatable races (not shown in detail). At the top a shaft or pin 615 is of circular cross-section at the ends 617 and of square cross-section in the center 619. The ends 617 are secured to the inner fixed races (not shown in detail) of the bearings 611; the ends 605 of the linkages 601 and 603 are secured to the rotatable races (not shown in detail). At the top there is also provided a spacer 620 (FIG. 28) for setting the distance between the linkages 601 and 603. The spacer 620 is of generally U-section with perforations through which the ends 617 of the pin 615 pass. Each arm abuts a linkage 601 or 603 on one face and the shoulder formed between the sections 617 and 619 of the pin 615 on the opposite side. The beam 513 has a hook-shaped end 621 upstream. This end has coextensive C-shaped slots as seen in side elevation from opposite sides (FIG. 22). The webs 623 of C on each side are straight and are joined by an arcuate section. The end 621 of the beam 513 is hooked over the center 619 of the pin 615 and secured to it by a set screw 625 (FIG. 4). A U-shaped stiffening member 627 is secured to them along their lengths (FIG. 28).

Figure 4B:
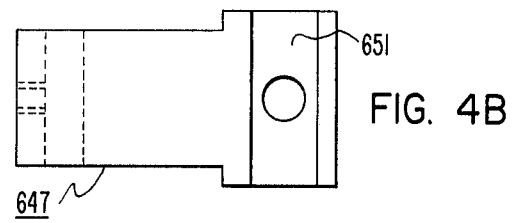
FIG. 4B is a top view of this linkage taken in the direction of the arrow IV-B of FIG. 4A.
Figure 4A:
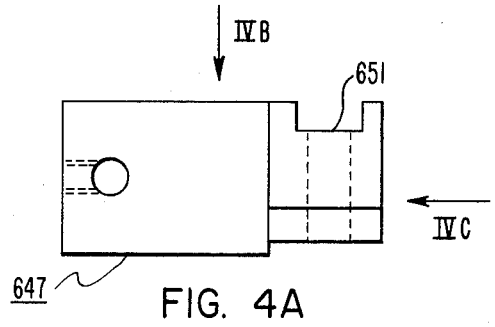
FIG. 4A is a view in side elevation of the linkage which connects a bar that supports a counterweight to the pellet transfer mechanism of the same system.
Figure 4C:
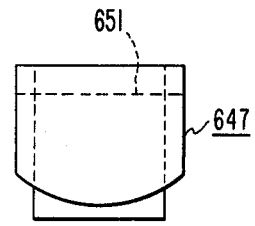
FIG. 4C is an end view of the linkage taken in the direction of the arrow IV-C of FIG. 4A.
Figure 24A:
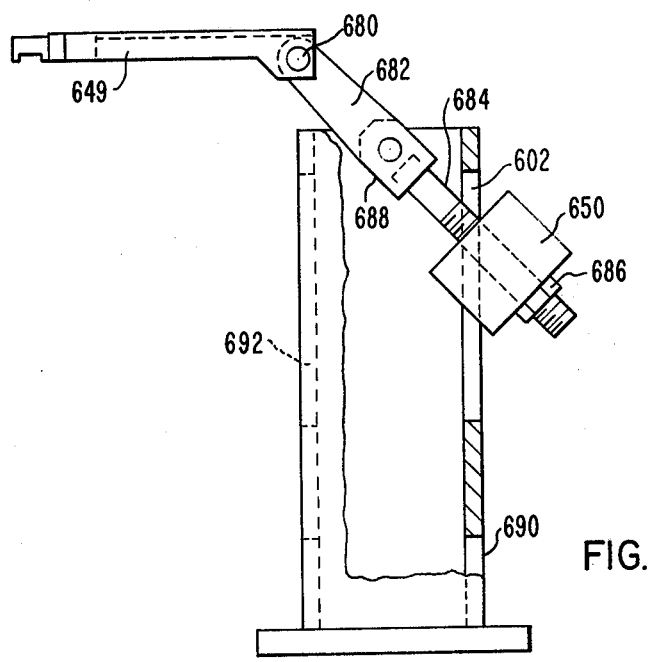
FIG. 24A is a view in side elevation showing the counterweight and its support.

At the downstream end the transfer mechanism is pivotally driven through linkages 631 and 633 (FIGS. 2, 3, 15A, 15B, 19, 21). Each linkage 631 and 633 is rounded at the upper end 635 and below the center widens with a tapered shoulder terminating in a semi-hexagon at the other end 637. Concentric with the rounded upper end 635 each linkage has an opening into which the fixed outer race of a ball bearing 639 (FIG. 4) is pressed. The movable inner races of the ball bearings are connected to the cylindrical ends of a shaft or pin 641. The part 643 of the pin between the linkages 631 and 633 is rectangular on top and rounded at the bottom. At its downstream end 645 the beam 513 has the same coextensive C-shaped slots, as seen, in side elevation, as at the upstream end 621 (FIGS. 7, 22). The downstream end 645 of the beam 513 is adapted to be connected to the flat top of the part 643 of the pin 641. However, a linkage 647 (FIGS. 4A, 4B, 4C), which supports a bar 649 that pivotally carries a counterweight 650 (FIG. 24A) is interposed between the inner surface of the beam 513 and the top 643. This linkage 647 is rounded (FIG. 4C) so as to seat against the inner surface of beam 513. It has a slot 651 so that it seats on the part 643 of pin 641. The linkage 647 is seated on the beam 513 and then the beam and linkage are placed on the part 643 of the pin 641 with the end 645 of the beam hooked over part 643. The three parts are secured together by a bolt 652, (FIG. 4) which passes through the top of the beam 513 and a hole 643 in the linkage 647 and engages the part 643.

Figure 15:
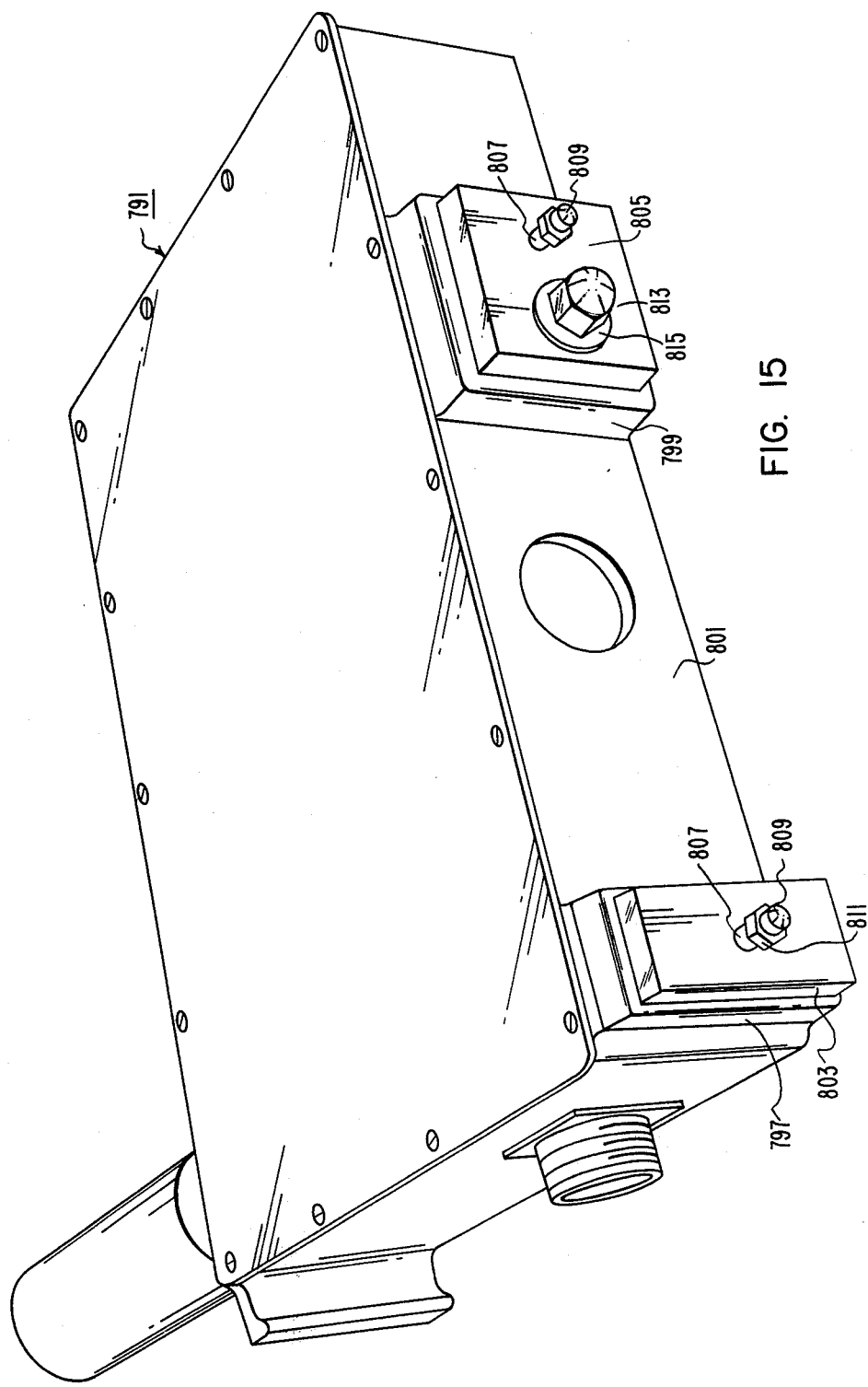
FIG. 15 is a copy of a photograph of a housing for a source and optical system of the handling and gauging system showing the base of the housing with its locating buttons.
Figure 15A:
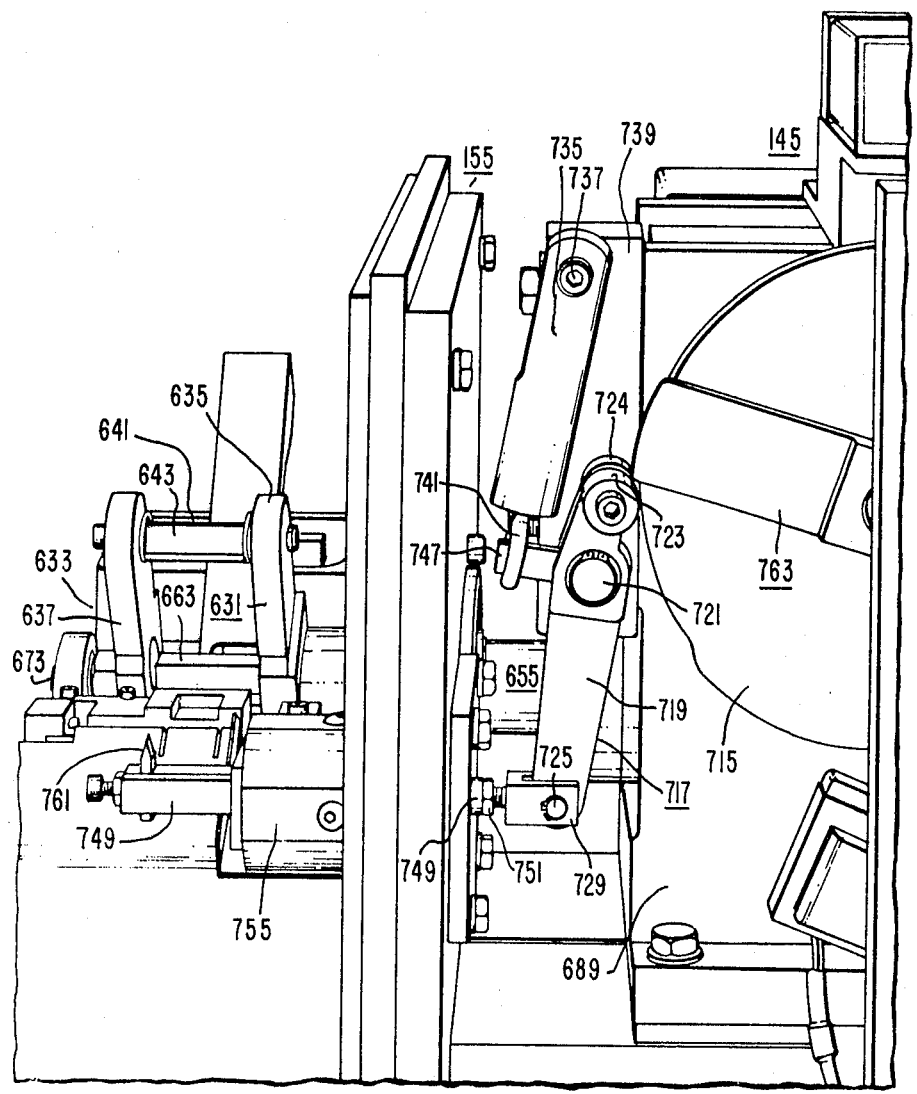
FIG. 15A is a copy of a photograph, enlarged, of a fragmental part of the system showing the push rod which causes the grippers to close and open and the mechanism for operating this push rod with this push rod and mechanism in gripper actuating setting.
Figure 15:
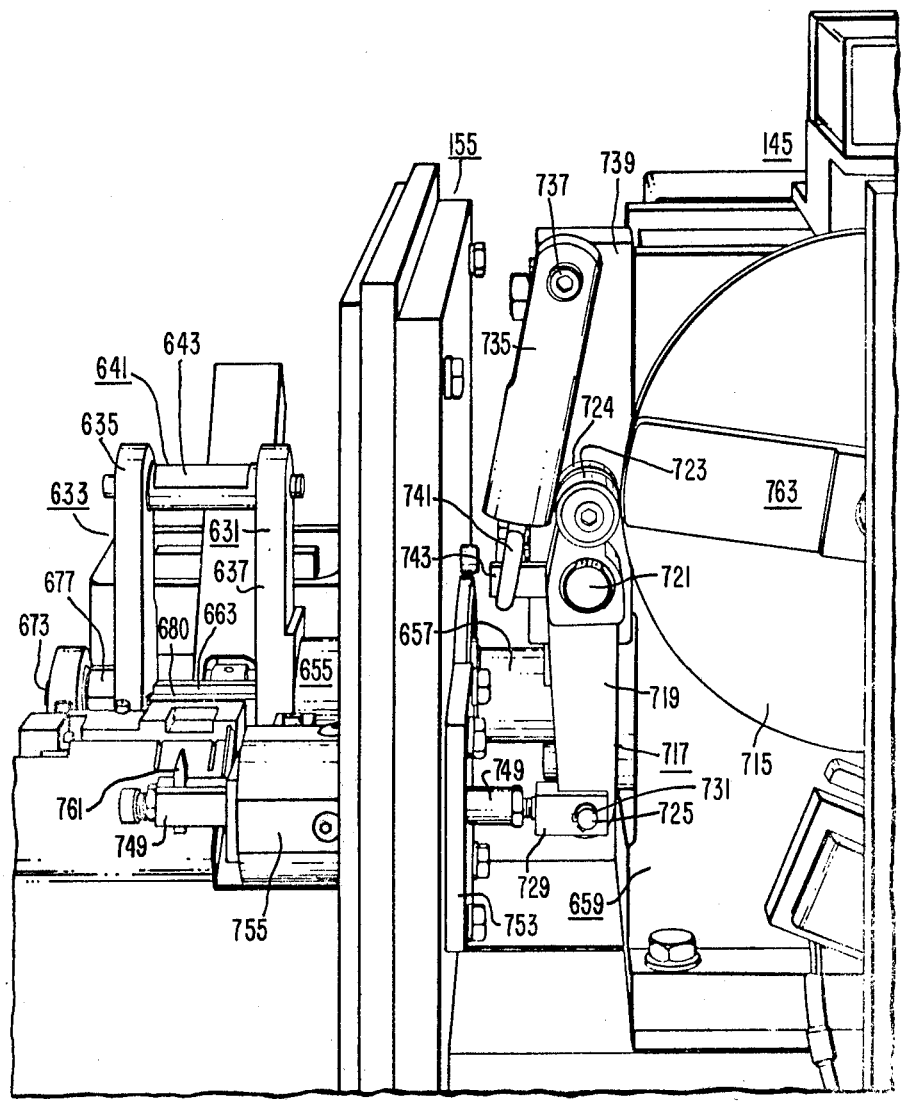

The beam 513 and its grippers 515 through 523 are driven by a shaft 655 which is oscillated back and forth over an adequate angle to move each gripper between its associated upstream station and the succeeding associated downstream station. The shaft 655 includes a cylindrical portion 657 of substantial diameter, typically 1.5 inches, extending from the transmission 659 of the drive 145. From the cylindrical portion 657 of the shaft 655 a portion of substantially smaller diameter than the cylindrical portion extends (FIGS. 4, 15A, 15B). This portion has opposite flattened surfaces 663 between its ends.

Figure 21:
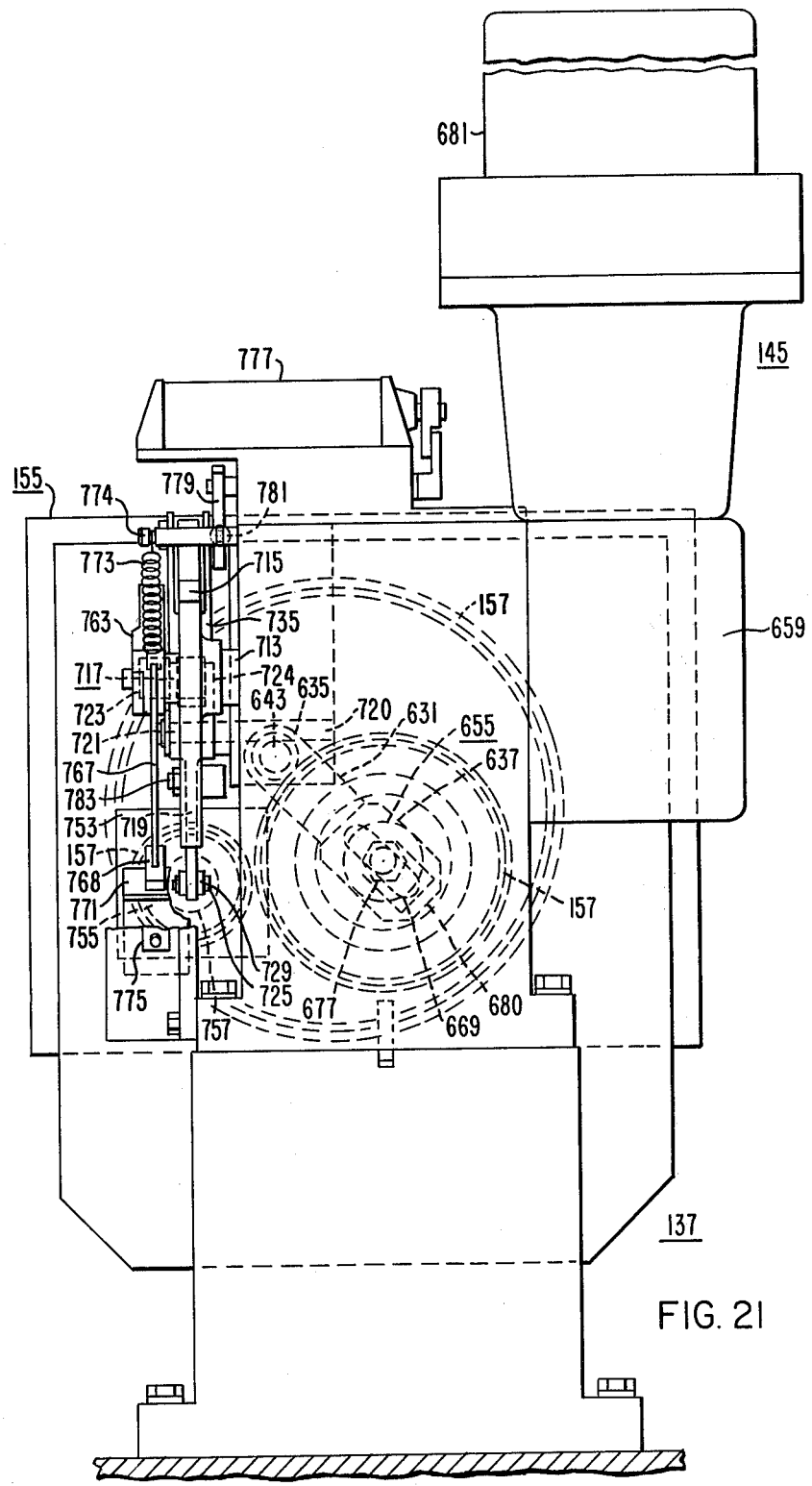
FIG. 21 is a view in end elevation of the assembly in the direction of the arrow XXI of FIG. 19.
Figure 23:
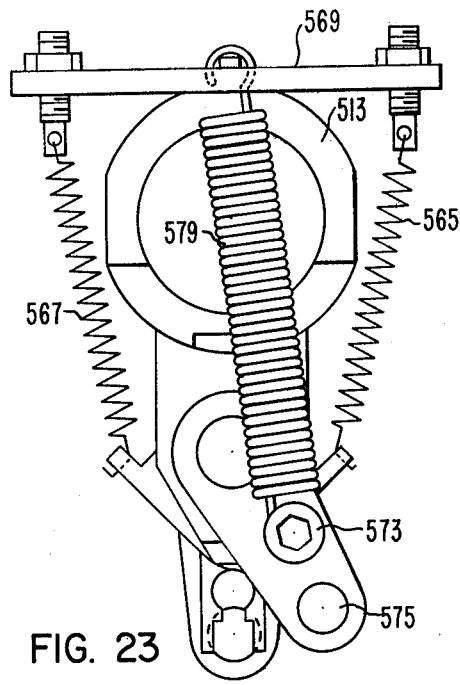
FIG. 23 is a view in end elevation of this assembly in the direction of the arrow XXIII of FIG. 22.

At the lower end each linkage 631 and 633 has a slot 669 (FIG. 21). The slot 669 in linkage 631 terminates outwardly in a narrow cylindrical cavity which receives the end shoulder 671 (FIG. 20) of the cylindrical portion 657 of the shaft 655. The lower end 637 of linkage 631 is somewhat thicker than the lower end of linkage 633 to accommodate the cavity (FIG. 21). The flattened portion 663 of the shaft 655 passes through the slots 669 in both linkages 631 and 633 and is close sliding fit in these slots. Typically the thickness of the flattened portion 663 is between 0.499 and 0.500 inch and the width of the slot is between 0.501 and 0.502 inch. Intermediate the end 673 of the shaft 655 and the flattened portion 663 there is a threaded section. The end 673 is supported in a ball bearing 674 on support 673. The shaft 655 is secured to the linkages 631 and 633 by a nut 677 which engages the threaded portion. Between the linkages there is a spacer 680 of U cross-section (FIGS. 20, 21). The arms of the spacer extend upwardly embracing the flattened portion 663 of the shaft 655. The linkages 631 and 633 are driven positively through the flattened portion 663 of the shaft and reciprocate the transfer mechanism 135 between pick-up and deposit positions.

The linkage 647 extends downstream from the downstream end of the beam 513. At its extending end this linkage engages a slot in the bar 649 and is held by a pin 679 (FIGS. 2, 3, 4). The bar 649 (FIG. 24A) at its other end has a clevis 680 which is pivotally connected to a U-shaped bar 682. A threaded bar 684 receives the counterweight 650 which is held by a nut 686. The bar 684 extends into the U-shaped bar 682. Bars 682 and 684 are pivotally supported on a pin 688 which is supported in bearings on a stanchion 690. The stanchion 690 has an opening 602 to permit the counterweight to swing in and out. The counterweight 650 swings with the transfer mechanism 135 as the mechanism is reciprocated and suppresses pulsations or vibrations in the movement of the mechanism.

The drive 145 (FIG. 16) includes a motor (not shown) in an elongated container 681. The motor is connected to the transmission 659 (not shown), which is predominately in a container provided with cooling fins, through a worm and worm wheel (not shown).

Figure 16:
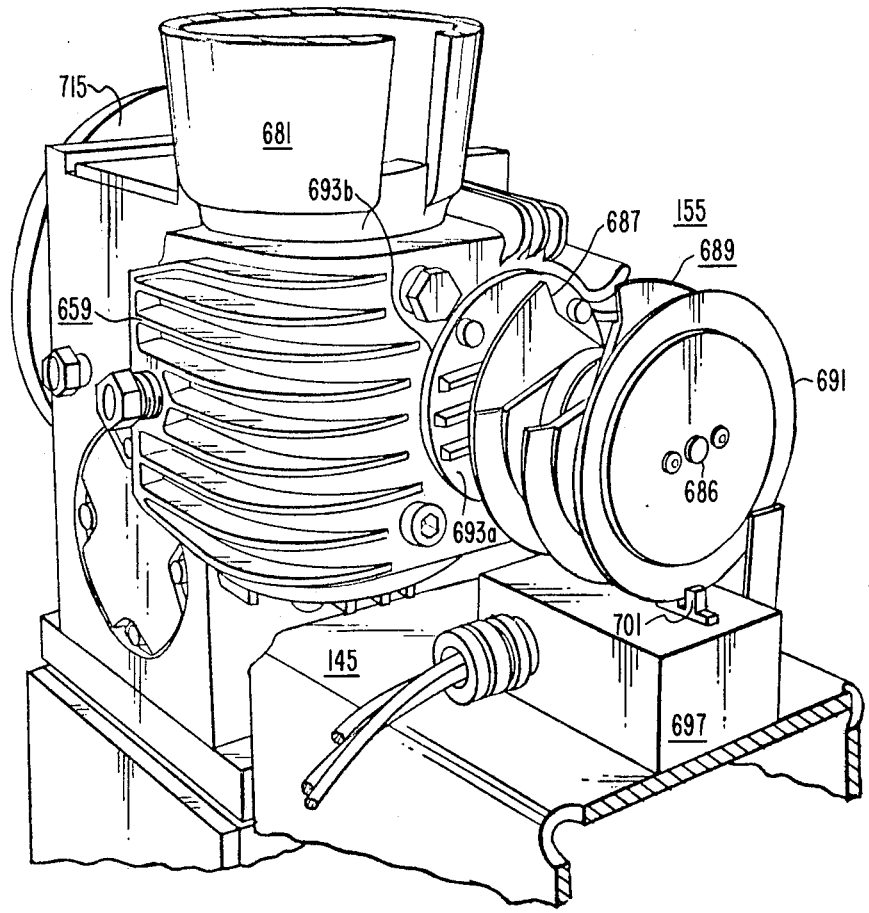
FIG. 16 is a photograph of a fragmental part of the system showing generally the drive for the system and specifically the cams which control the start and synchronization of operation of the system.
Figure 35:
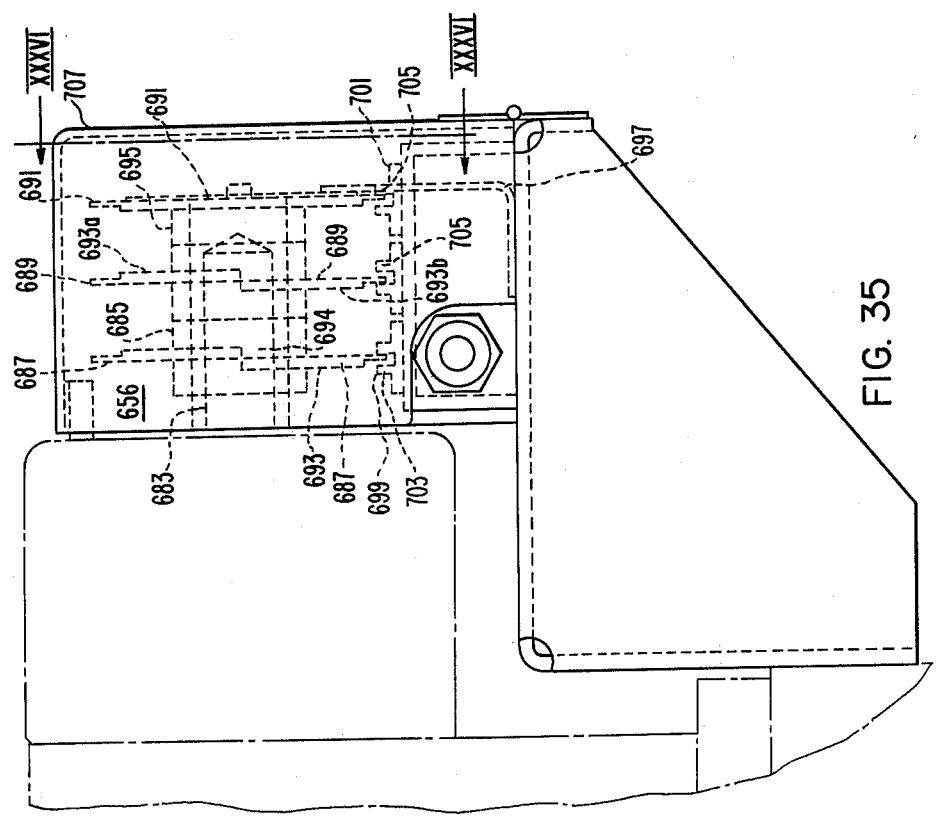
FIG. 35 is a view in side elevation of a starting and synchronizing cam unit of the handling and gauging system.

The motor and transmission are designed by reliance on conventional practices to perform the functions demanded of them. Typically, the drive 145 may be procured from Commercial Cam Division, Emerson Electric, 400 North Ashland Avenue, Chicago, Ill. 60622. It is identified by the trademark CAMCO. The drive 145 has oscillatory output shafts 655 and another output shaft at right angles to shaft 655 which extends through opposite sides of the motor. The extension 656 on one side includes a central member 683 on which a sleeve 685 is mounted (FIG. 35). The sleeve 685 is secured to the member 683 by a cross roll pin (not shown) and by a set screw (not shown). The sleeve 685 has an outer tip 686. A plurality of cam 687, 689, 691 are mounted on sleeve 685 (FIGS. 16, 35).

Each cam 687 and 689 is made up by abutting a pair of cam discs 693 (FIGS. 37, 38). Each cam disc 693 has a hub 694 at one end. The cam discs for cam 689 are identified by 693a and 693b in FIG. 16. Cams 687 and 689 each have an open segment. The length and angular position of the start and end of each segment can be predetermined by appropriately setting the angular positions of the discs 693. Cam 691 consists of a single disc (FIG. 39) with a central hub 695. The cams 687, 689, 691 are mounted on sleeve 685 and secured by set screws (not shown) through the hubs 694 and 695.

Below the cams 687, 689, and 691 there is a mounting block 697 which includes pairs of projections 699 and 701 (FIGS. 35, 38) each defining a gap opposite the periphery of its associated cam. In one projection of each pair there is a light source 703, typically a light emitting diode. In the other of each pair there is a photodiode 705. The mounting block 697 and the cams and other related parts are in a container 707. For cams 687 and 689 the light from each source 703 impinges on each photodiode 705 when the open segment passes through the gap and is interrupted during the remaining angle of rotation of the cam. For cam 691 the corresponding photodiode 705 is exposed to the light from source 703 only during the short interval that the slot 69 is in the gap. Cam 687 initiates the processing of the pellets P by the mechanical system 101. The exposure of the corresponding photodiode 705 to light when the open segment of cam 687 is in the gap produces a measurement enable pulse. On the initiation of this pulse the processing is started. The open segment of cam 689 is set back a small angle in the direction of rotation of the cams 687 and 689 and produces a pulse which starts shortly after the pulse for 687 is started. This pulse causes solenoid 218 (FIG. 8) to be energized opening arm 207 of clamping gate 201. The opening of arm 207 releases one pellet P into seat 175 of pick-up station 125. Solenoid 218 remains energized to release one pellet to the escapement. Prior to the pick-up of the released pellet, the solenoid is deenergized so the arm 207 clamps the succeeding pellets and holds back the pellet stream. The exposure to light of photodiode 705 corresponding to cam 691 enables the mechanical system to stop with the grippers in a desired position if the processing of pellets is stopped without turning off the power to the mechanical system 101.

On the opposite extension 713 of the shaft at right angles to shaft 655, a cam 715 is mounted (FIGS. 15A, 15B, 19, 20, 21). The shaft 713 is rotatable on ball bearings 714. The cam 715 is keyed to the movable race of the ball bearing by key 716. The cam 715 controls the opening and closing of the gripper jaws 545 and 547. Since cams 687 and 689 and 715 are on extensions 685 and 713 of a common shaft, the processing of the pellets P is coordinated with the opening and closing of the grippers. A cam follower 717 is actuated by the cam 715. The cam follower includes a lever 719 which is pivotal on a pivot pin 720 on a needle bearing 721. At its upper end the lever carries cam rollers 723 and 724. At its lower end the lever 719 carries a pin 725 which is rotatable in sleeve bearings 727 in a clevis 729 (FIGS. 15A, 21). The bearings 727 are secured in the clevis 729 by a retaining ring 731. The cam roller 724 is urged into engagement with the cam 715 by a spring 733 in a housing 735 pivoted on a screw 737 in a pivot support 739 on the transmission 659. The spring 733 floats freely in the housing 735. An eye bolt 741 extends through the spring 733 and at the top is engaged by a nut 743 which rests on a washer 745. The nut 743 serves to compress the spring 733. At the bottom the eye of the eye bolt 741 engages a stub bar 747 connected to the lever 719. Under the action of the spring 733, the eye bolt urges the lever 719 to pivot in a clockwise direction so that the cam roller 724 is urged into firm engagement with the cam 715 as shown in FIG. 15A.

When the roller 724 is in engagement with the cam 715, the cam as it rotates rocks the end of the lever 719 and clevis 729 backwardly and forwardly. The stem of the clevis 729 is screwed into the end of a push rod 749 and is firmly held by a nut 751. The push rod 749 is cylindrical except at a remote end where it is of square cross-section (FIGS. 15A and 15B). The push rod 749 moves with the clevis 729 and in its movement is supported on a bearing on plate 753 and on bearing 755 (FIG. 20). Plate 753 is bolted to the containment plate 155 and sealed by O-ring 157 (FIGS. 19, 21). The push rod 749 is connected to a bellows 757 which seals the region inside of the containment from the region outside. At the end of the push rod 749 outside of the containment 147, the end surface of the bellows 757 is joined by gas-tight typically brazed seals radially inwardly to the push rod radially outward to a shoulder of plate 753. At the end inside the containment the bellows 757 is connected to a reentrant stem 759 within bearing 755 (FIG. 19).

Near its ends within the containment the push rod 749 carries an actuator bar 761 (FIGS. 15A, 15B). This bar 761 is secured in the push rod 749 in a position generally perpendicular to the direction of movement of the push rod.

The actuator bar 761 projects upwardly between the levers 573 and 583 (FIGS. 7, 22). In the extreme upstream position of the transfer mechanism 135, the actuator bar is disposed adjacent and perpendicular to the pin 575 of lever 573. The cam 715 is so set that the push rod 749 and actuator bar 761 move laterally to the pin 575 only after the transfer mechanism 135 reaches this extreme upstream position. At that point the lever 719 is rocked counterclockwise moving the actuator bar inwardly towards the inside of the container 147. The lever 573 and cam shaft 539 are turned clockwise as seen from the upstream end of the transfer mechanism and the gripper jaws 543 and 545 are closed and grasp a pellet if one is present. This is the position of the transfer mechanism 135 shown in FIG. 7 except that no pellet is shown. After the transfer mechanism reaches the extreme downstream position, the actuating bar 761 is disposed adjacent and perpendicular to the pin 585 of lever 583. At this point the jaws 543 and 545 are still closed grasping a pellet P. The lever 719 is now rocked clockwise so that the push rod moves from the inside of the containment 147 outwardly turning the lever 583 and cam shaft 539 counterclockwise as seen from the upstream end of the transfer mechanism 135. The jaws 543 and 545 are opened to deposit a pellet P. The jaws 543 and 545 are closed and opened as described above after all the grippers 515 to 523 come to rest at their associated pick-up or deposit stations as the case may be.

It is desired that the grippers 515 through 523 shall not close or open if a pellet is not properly disposed in the seat 175 of the pick-up station 175, during each weighing operation which occurs at intervals of 2 seconds typically, and if a pellet has been found defective in weight and it is necessary to inspect each succeeding pellet for weight. To interrupt the closing and opening of the grippers 515 through 523, a lockout cam 763 is provided (FIGS. 15A, 15B, 19, 20, 21). This lockout cam has a hub 765 which is mounted rotatably about bearing 714 (FIG. 19). At its inner end the cam 763 is pivotally connected to a link 767 which is pivotally connected through a clevis 768 to the armature 769 of a solenoid 771. The other end of the link 767 is connected to a spring 773 which is anchored to a pin 774 in a corner of the outer plate of the transmission 659. The outer end of lockout cam 7 which is the cam surface 776 is adjacent the cam roller 723 of the follower 717. Normally the solenoid 771 is energized urging the lock-out cam 763 in a clockwise direction so that it is out of contact with cam roller 723. Cam roller 724 is in contact with cam 715 as in FIG. 15A. When solenoid 771 is deenergized, armature 769 moves outwardly causing lock-out cam 763 to rock counterclockwise. The cam surface 776 engages roller 723 disengaging roller 724 from the surface of cam 715 as shown in FIG. 15B and precluding operation of the push rod 749 and the subsequent closing of the grippers. A stop 775 is provided for the armature 769. The energization and deenergization of the solenoid 771 is controlled by the control system 103.

A counter 777 is provided on the top of the transmission 659. The actuating arm 779 of the counter 777 is biased by a spring 781. The cam 715 carries a pin 783 projecting from its underside which engages the actuating arm 779 on each rotation of the cam 715 producing a count. The counter counts this number of rotations of the cam.

The source and optical systems 139, 141, 143 for the diameter, flaw and length inspections each includes a container 791 (FIGS. 3, 15, 53 through 56A) for the optical system. Each container 791 (FIGS. 15, 15-56A) is in the form of a suitcase from which a handle 793 extends. A locating plate 795 extends from the handle on one side. Bosses 797 and 799 extend from the base 801 of each container 791. Plates 803 and 805 respectively are secured to each boss. A threaded insert 807 is provided in each plate 803 and 805. A locating button 809 having a spherical head is screwed into each insert 807. The height of the spherical bead of buttons 809 is adjustable. The button is adjusted to bring the bead to an appropriate height by the hexagonal portion 811 of the head and locked with an anaerobic cement, typically LOCTITE-222. A hex knob 813 (FIGS. 15, 53) is screwed into the plate 805 with the knob engaging a washer 815. The locating buttons 809 and the locating plate 795 serve to set the container 791 so that the horizontal axes of its optical system are parallel with the surface 817 of the table 819 (FIGS. 2, 4, 14) on which the containers 791 are disposed and the imaging lenses image this inspecting beams at the appropriate heights of or are appropriately directed to the pellets P, on the rollers 267 and 269 of the roller stands 251.

Figure 14:
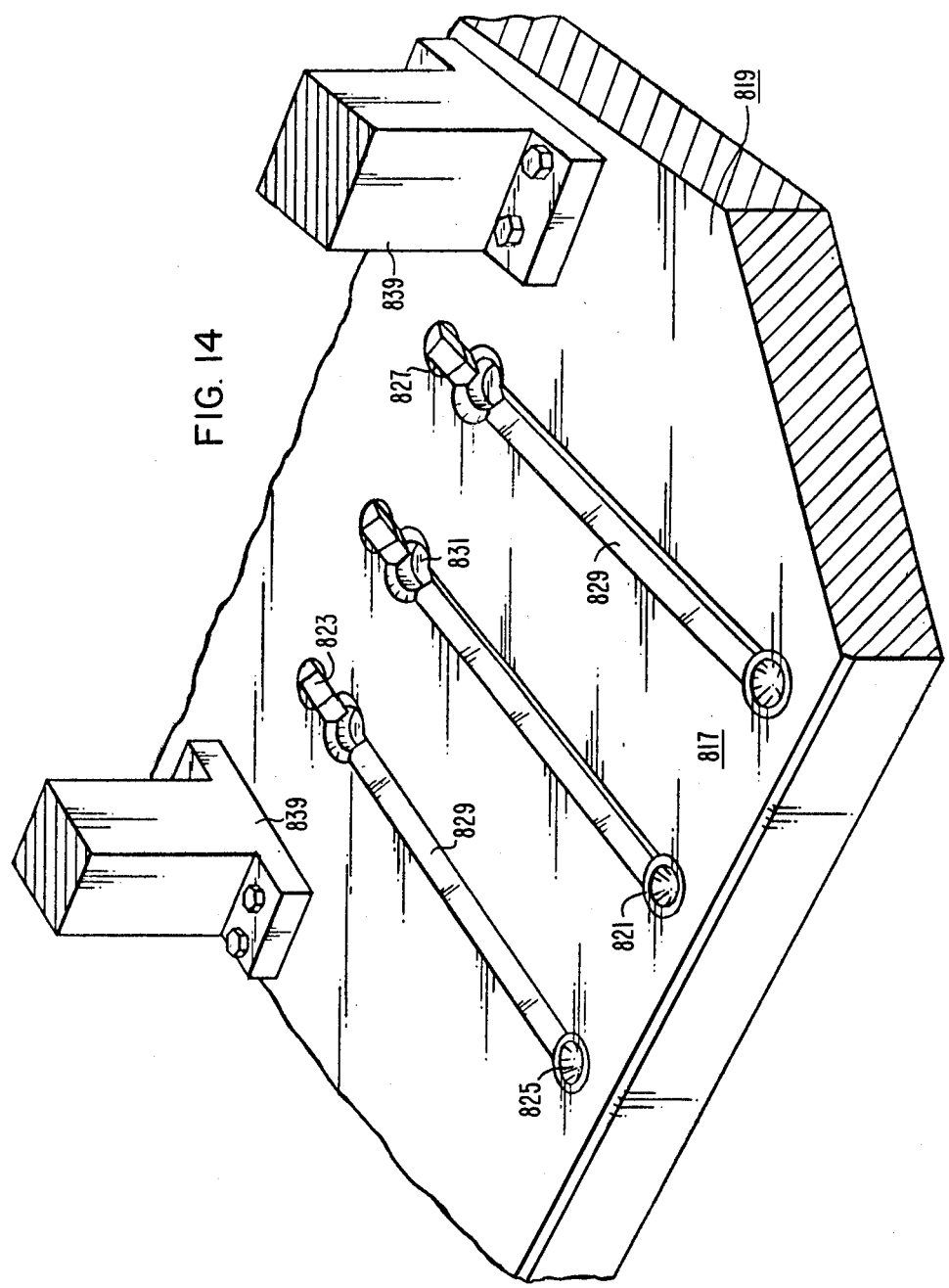
FIG. 14 is a copy of a photograph of the support of the system shown in FIG. 2 showing the locating seats for the housing for the source and optical systems.

To achieve this purpose separate hardened inserts 821 and 823 (FIGS. 14, 49 through 52) for each container 791 are provided in the surface 817. Each insert 821 has a true conical surface 825 and each insert 823 has a true surface 827 of angular section. The altitudes and the angles of the surfaces 825 and 827 are equal. Typically the angles are 90°. The buttons 809 for each container 791 are seated in a surfaces 825 and 827. The conical surfaces 825 are disposed nearest the roller stands 251 and the angular surfaces most remote from these roller stands. A groove 829 (FIG. 14) of angular section extends between each pair of inserts 821 and 823. The groove in each case terminates in a hole 831 formed to receive the knob 813. The containers 791 are relatively heavy. In being positioned each container is slid along the surface 817 with the knob 813 in a groove 829 until the locating buttons 809 seat on the surfaces 825 and 827, engaging these surfaces, and the knob 813 drops freely into oversized hole 831. The locating buttons 809 and surfaces 825 and 827 determine the position of each container 791 in two dimensions; i.e. the line between the buttons 809 and the position on this line. To position the containers in the third dimension, namely a plane containing the line and substantially perpendicular to the surface 817, pairs of vertical blocks 833 are provided (FIGS. 2, 4). The blocks 833 are suspended from a horizontal bar 837 mounted between stanchions 839 (FIG. 14). Each block 833 carries a set screw 841. The centers of gravity of the containers 791 are set so that the containers are urged towards the set screw. The set screws 841 are adjusted so that the containers are substantially vertical and the optical axes of the vertical lenses are substantially horizontal. The containers 791 once set are free standing; i.e., they are not secured to the base or any other part.

Figure 57:
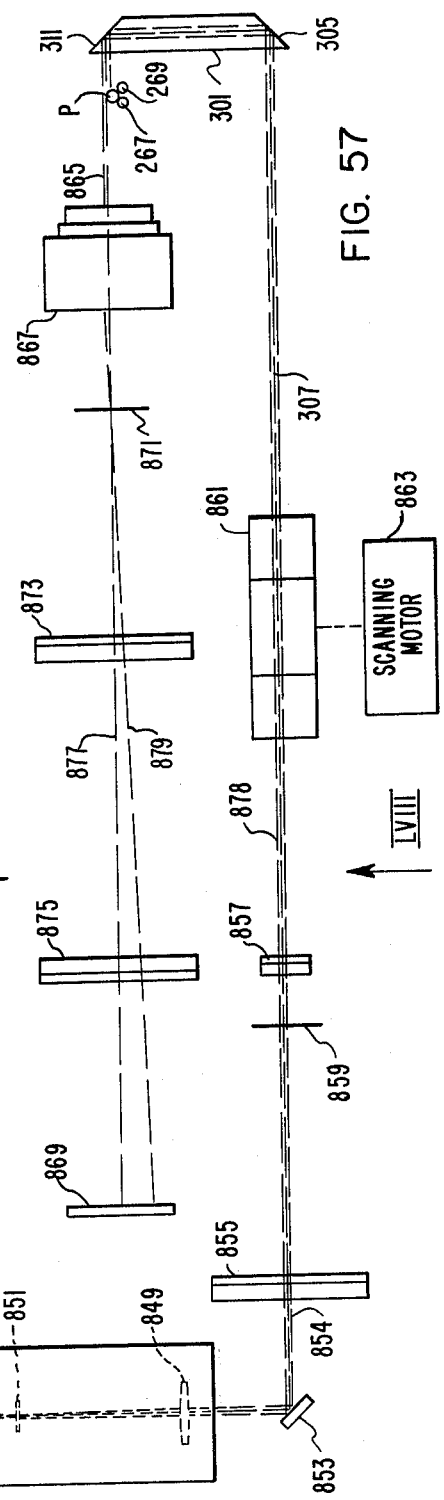
FIG. 57 is a diagrammatic view in side elevation of the optical system for measuring the diameter of pellets.

The light source (not shown) is a continuous-wave laser, typically the LT Series 1000:1 linearly polarized helium-neon $TEM_{00}$ mode plasma tubes bought from CW Radiation, Inc. of 101 Zeta Drive, Pittsburgh, Pa. 15238. CW Radiation is a subsidiary of AEROTECH, INC. This laser and its operation is described in literature of CW Radiation and in its instruction manual. The laser is mounted in a tube 843 which extends from an end of the container 791 remote from the containment 147 (FIGS. 2, 3). The laser beam 845 is projected vertically downwardly through the tube 843 and is centered in the tube (FIGS. 57, 60, 63).

As part of the production process pellets may be centerless ground. A common problem with centerless grinding is that it may erroneously generate a tri-lobe shape. Measured by standard two-point micrometer procedure, such a shape can appear circular. To meet this problem diameter inspection is effected by a three point method (FIGS. 53 through 59). It is assumed that the transverse cross-section of the pellet is a circle determinable by three points. The pellet is deposited by gripper 515 on a pair of precision, fixed-location rolls 267 and 269 at station 127. The three points are the top of the cylindrical surface of the pellet at each point throughout its length and the corresponding points of tangency of the pellet and the rolls. The height of the upper cylindrical surface of the pellet above its seat on the rolls is determined throughout the length of the pellet. For computation of the true diameter from this data, measurements of a mock-up pellet of known diameter are stored in computers 105 or 107 (FIG. 1). The measurement on each pellet is made after the pellet is deposited and while the grippers 515 through 523 are returning to their respective upstream stations.

The beam 845 (FIGS. 53, 57) is a polarized collimated beam. This beam is passed through successive spherical lenses 847 and 849 which in effect constitute an enlarging telescope. Lens 847 forcuses the beam 845 at a point between lenses 847 and 849. At this point a pin-hole filter 851 of thin metal sheet is interposed. The pin-hole is typically about 35 microns in diameter. Scattered rays not parallel to the beam 843 are suppressed by filter 851. Lens 849 recollimates the light. The lenses 847 and 849 and filter 851 are mounted in a lens housing 850 supported from the laser mount 852 (FIG. 53). The resulting collimated beam which emerges from lens 849 is magnified to about 6 diameters larger than the incident beam. From the emerging beam, which is vertical, horizontal beam 854 is derived by reflection by plane mirror 853. Mirror 853 is mounted on a slidably adjustable swivel support 856 (FIG. 53). The beam 854 passes through cylindrical lenses 855 and 857 and baffle 859 which has a vertical slot. These optical components are mounted in an adjustable bracket 860. Lenses 855 and 857 operate as a reverse telescope to narrow the beam 854 horizontally producing a beam 848 whose transverse cross-section is a vertical line. The slot of baffle 859 has a width of about 1/16 inch. Its purpose is to suppress stray reflections within the apparatus. The beam which emerges from lens 857 is passed through octagonal scanning prism 861. Scanning prism 861 is rotated about its vertical axis by motor 863 and produces the scanning beam 307.

The motor 863 and speed-reducing gearing through which its shaft 850 is driven are mounted on an annular bracket 856 of generally L cross-section (FIG. 53). Cooling air is supplied to the motor 863 through a coupler 858 and tubing 860. Power is supplied to the motor 863 and control signals are derived through a connector 864. The prism 861 is mounted on a cup-shaped pedestal 866 having a slotted skirt 868. The pedestal has a stem which is connected to shaft 850. The shaft 850 drives the pedestal 870 and prism 861. Typically the prism is driven at a speed of about 75 revolutions per minute. The motor 863 is synchronous and it is synchronized with the motor 285 in the diameter inspection stand 251 which drives the rolls 267 and 269. Like the motor 285, motor 863 has quadrature windings (not shown); both motors are supplied from a common source. The prism 861 and pedestal 866 have a cover 870 having openings 872 through which beam 854 passes. The motor 863 is enclosed in a vent cylinder 874 terminating in an opening 876 in container 791. The motor is cooled by circulation of air through cylinder 874.

The scanning beam 307 (FIG. 57) constitutes a thin vertical line which sweeps horizontally but which remains parallel to the beam 878 incident on prism 861. The scanning beam 307 now passes through a window 880 (FIG. 53) in container 791 and through dove prism 301 mounted on the roller stand 251 in the diameter station 127. The surfaces 305 and 311 of dove prism 301 fold the beam so that it is displaced vertically above beam 307 and is reversed. This reversed beam is passed with its lower edge over the top of pellet P. The beam is in the form of a vertical line in the vertical plane which passes through and includes the longitudinal centerline of the pellet. The beam scans the top of the pellet P producing a series of successive samples of short lengths of the pellet throughout its length. The resulting beam 865 is now passed through spherical lens 867 in a lens mount 882 on container 791. This lens 867 magnifies the image of the beam extending from the top of the pellet P typically by about 6 times and produces a sharp focus of the beam on the plane of a diode array 869. In addition to magnification, a purpose of lens 867 is to image onto the photo-diode array, rays diffracted at the pellet. Since the light impinging on the top of pellet P is nearly collimated it passes through a small spot at the focal point of lens 867. At this spot, a pin-hole baffle 871 is interposed. This pin-hole typically has a diameter of 1/16 inch. This baffle suppresses room light. The beam is now passed through cylindrical lenses 873 and 875 which are mounted in adjustable brackets 884 in container 391. These lenses 873 and 875 operate together to converge the beam horizontally to a narrow line on the photodiode array 869. With respect to the vertical optic axis of this combination of lenses 873 and 875, the pin-hole in baffle 871 and the diode array 809 are conjugate foci.

In FIG. 57 the upper line 877 corresponds to the ray of the beam 865 from the pellet P which is tangent to the top of the pellet. The lower line 879 which diverges from the baffle 871 corresponds to the upper bondary ray 881 of the beam 865. The rays 877 and 879 define the image which appears on the diode array. This is the illuminated area. The cross-section of the beam at the pellet is reversed by lens 867. For a large diameter pellet the beam 877 impinges on the photodiode at a lower point than for a smaller diameter pellet because for a larger diameter pellet the shadow of the pellet interposed in the beam is larger. For a larger pellet a smaller length of the photodiode is illuminated than for a smaller diameter pellet. The diameter at each point is thus determined electronically.

It is necessary that for each diameter elevational measurement, the relative position of the beam 865 along the pellet be known. To achieve this purpose the skirt 868 of the scanner 861 has the slotted skirt 868 (FIGS. 53, 54, 56) which is rotatable with the scanner. Typically there are eight slots 885 in the skirt 868, one for each face of the prism. There is also a ninth slot 887 to identify a reference face 889 of the scanner. The diameter inspection optical system also includes a light source 891 (FIG. 54) and a photodiode 893 between which the slots pass. The pulses produced by the slots serve to synchronize a phase-locked loop oscillator (not shown). There are 128 oscillator pulses per scanner face or 1024 oscillator pulses per scanner rotation. Each pulse serves to trigger a scan of the diode array 869 producing a diameter measurement. Each measurement is thus associated with a beam position on the pellet. Only about 40 scan elements per face correspond to the scan across the length of the pellet. The remainder of the 128 pulses correspond to the sweep on each side of the pellet P.

The flaw inspection serves to determine the presence and location of defective surface areas of the cylindrical surface of a pellet P. The surface of the pellet may be regarded as enveloped by an imaginary rectilinear grid. Each elemental rectangle of this imaginary grid is examined and there is assigned to each rectangle a sound-surface-present or sound-surface-absent digital designation. This data is processed in computer 105 and a numerical value is derived which is called a surface quality index. Pellets are accepted or rejected based on this index.

Figure 11:
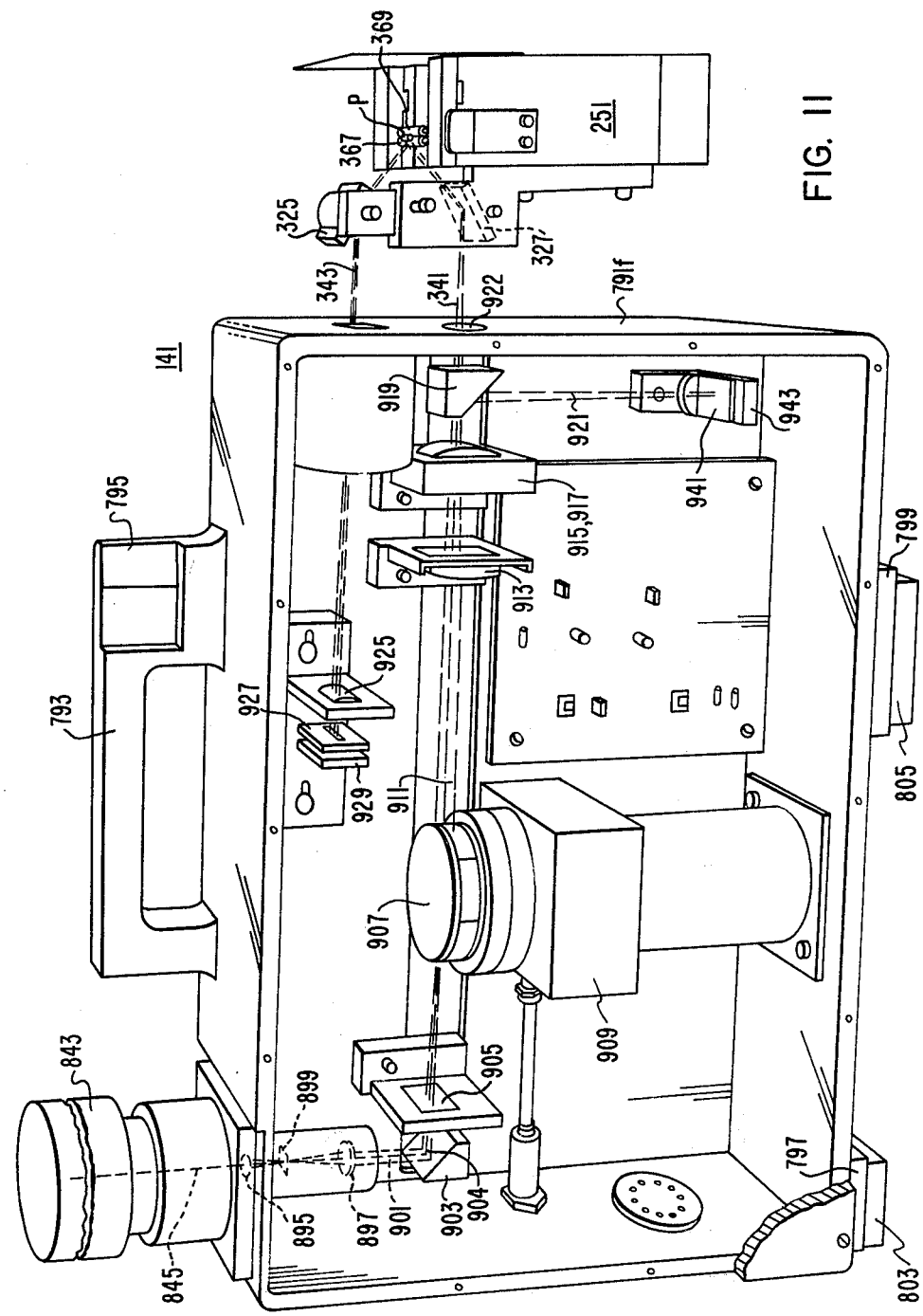
FIG. 11 is a copy of a photograph of the flaw detection optical system of the mechanical handling and gauging system shown in FIG. 2

The flaw inspection optical system (FIGS. 63, 64, 65), except for the mirrors 327 and 329, is mounted in a container 791$f$ (FIG. 11) generally similar to the container for the diameter inspection optical system. The laser beam 845 which is collimated and polarized is projected through a telescope including lenses 895 and 897. Interposed between lenses 895 and 897 is a pin-hole filter 899 having a pin-hole 35 microns in diameter. Lens 895 focuses the light on the pin-hole; lens 897 collimates the light. The beam 901 which emerges is magnified by six diameters with reference to the beam 845. This beam is reflected by plane mirror 903 so that a horizontal beam 904 is produced. Beam 904 is incident on cylindrical lens 905 which converges the beam horizontally into a thin vertical line at plane Q (FIG. 64). The converged beam from lens 905 is incident on scanning prism 907 which is rotated at a high speed, typically 7000 RPM, by motor 909. The beam which emerges from cylindrical lens 905 is focused at Q a short distance beyond scanner 907. Scanner 907 produces a scanning beam 911 whose cross-section is a thin vertical line. Beam 911 sweeps horizontally while remaining parallel to the optic axis of lens 905. Beam 911 passes through cylindrical lens 913 whose optic axis is horizontal. Lens 913 converges beam 911 vertically to a sharp point. This point, i.e., the conjugate focal point of lens 913 is on the surface of pellet P. The beam from lens 913 is incident on cylindrical lenses 915 and 917 which operate as a single lens. The beam which emerges from lenses 915 and 917 is converged horizontally and also focused on the surface of pellet P. Lenses 915 and 917 cooperate to produce a sharper line on pellet P than would be produced by lens 905 or a plurality of lenses in this area.

The minimum spot area (or line width for a cylindrical lens) producible from a collimated beam by a lens is diffraction limited; the larger the angle of convergence, the smaller this spot area. The focal length of lens 905 could have been selected to focus the beam directly on the pellet. But under such circumstances the spot line width would have been greater than desired. The cooperation of lenses 905, 915 and 917 makes it possible to maintain the angles of convergence and divergence to and from the lenses large enough to insure a small width as desired at the pellet surface. By providing convergence in the vertical optical axis after prism 907 by means of lens 913 the system is rendered immune to precession errors introduced in the mounting of prism 907.

The beam emerging from lenses 915 and 917 is incident on a beam splitter 919 disposed at an angle of about 45° to the axis of the beam. Part of the incident beam passes through the beam splitter and emerges as beam 341. The other part of the beam is reflected vertically (actually downwardly-FIG. 11) as beam 921.

Beam 341 passes through a window 922 in container 791$f$; is reflected by mirror 327 on the roller stand 251 at the flaw inspection station and is focused as a fine sharp point on the pellet P. As the scanner 907 rotates, this line scans the pellet P. Mirror 325 reflects the light from the spot as horizontal beam 343 through another lens 925 which serves as a window in container 791$f$. Lens 925 focuses the spot from the pellet on a baffle 927 having a narrow horizontal slit. The light passing through the slit is incident on a photodiode 929. The slit is baffle 927 and photodiode 929 are so set with reference to beam 343, that light undergoing reflection at the surface of the pellet P passes through the slit onto the photodiode 929. Light derived from a flaw in the surface of pellet P is focussed as an image away from the slit and is intercepted by the wall of the baffle 927. In addition the surface of the flaw being less mirror-like than the unflawed surface diffuses the light. In either event there is for a flaw a substantial decrease in the photon energy impinging on the photodiode which is an indication that the surface under the spot at the pellet surface is not unflawed.

The rollers 267 and 269 on which the pellet is seated is driven by the synchronous motor at a substantially lower speed than the scanner 907. Typically the pellet rotates at about 629 RPM. The pellet length is then scanned anew for each small incremental movement of the pellet circumference. The imaginary rectangles of the imaginary screen which envelops the pellet are of small area, typically 0.006 inch square.

The scanning motor 909 is driven from a voltage-controlled oscillator (VCO) 931 (FIG. 13A). Typically the VCO 931 has a center frequency of 12,840 Hertz. The motor 909 is suppliied from VCO 931 through a divider 933, which typically divides by 32, and a low-pass filtering power amplifier 934 to preclude frequencies appreciably higher than 401.25 Hz. The motor 901 operates at a speed typically at 8025 RPM. The roll motor 285 in the flow detection stand 251 at station 129 is supplied from a commercial 60 Hertz source. The output of VCO 931 is also supplied through a second divider 935 to a phase-difference detector 937. The dividing factor of divider 935 is such that the signal flowing to the phase detector 937 is a 60 Hertz signal. The output of the phase detector 937 supplies synchronizing voltage to VCO 931 through a low-pass filter 939. Thus prism motor 909 and roller motor 285 are synchronized since both are supplied basically from the same commercial 60 Hertz service.

Figure 66:
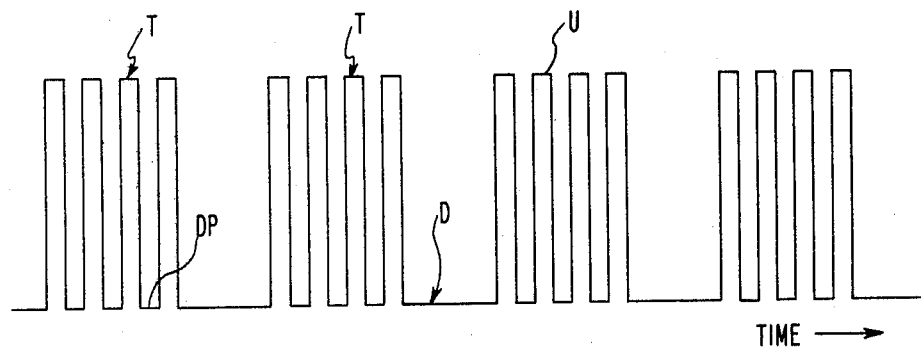
FIG. 66 is a graph showing how the position of the scanning line along the pellet in flaw detection is determined.
Figure 55:
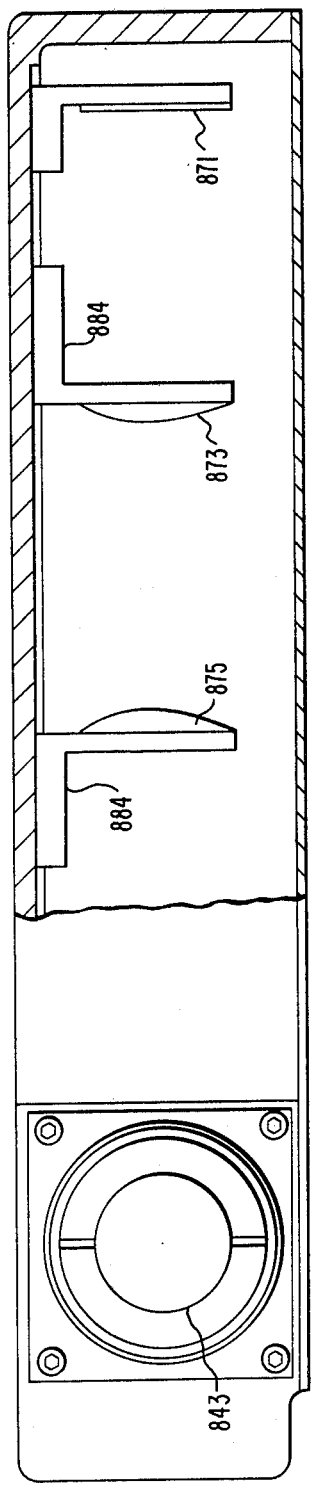
FIG. 55 is a view in section taken along line LV—LV of FIG. 53.
Figure 54:
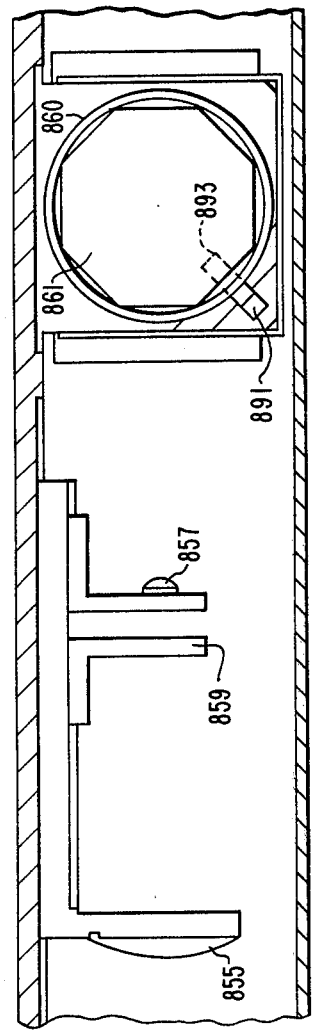
FIG. 54 is a fragmental view in section taken along line LIV—LIV of FIG. 53.
Figure 59:
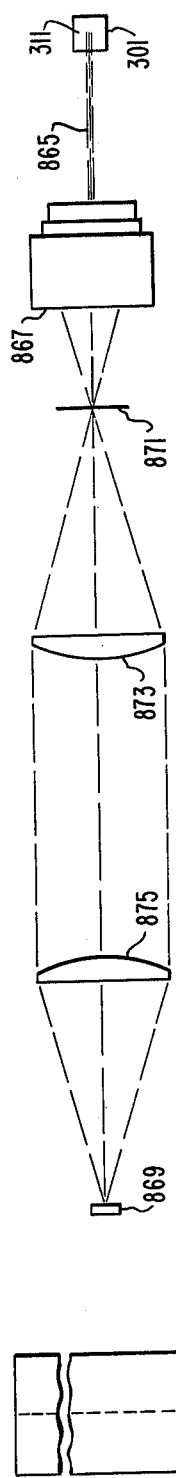
FIG. 59 is a diagrammatic top view in the direction of arrow LIX of FIG. 57.

The vertical beam 921 (FIG. 11) serves to provide information of the relative position on the imaginary grid of the light spot on the pellet P. Since the beams 341 and beam 921 are derived from a common beam focused by lenses 913, 915, 917, the conjugate focal point of beam 921 as it sweeps is at each instant the same distance from the optical center of the beam splitter 919 as the light spot on the surface of the pellet as it sweeps across the surface. A Ronchi ruling 941 is placed at the conjugate focal point of beam 921. Ruling 941 is a grating on which lines are ruled. A photodiode 943 is mounted behind the Ronchi ruling 941. The light emerging from the ruling 941 causes the photodiode 943 to produce successive trains T of current pulses U as shown in FIG. 66. The dimension of the Ronchi ruling 941 perpendicular to the lines is larger than the longest pellet to be subject to inspection to allow for scanning over the ends of the pellet (as well as for pellet positioning tolerances). This dimension is shorter than the length of the scan so that there is a short period of darkness between scans. This darkness interval is identified by D in FIG. 66.

Each train T corresponds to a scan of the length of pellet P and each pulse U in a train corresponds to a position along the length of the imaginary screen which is being scanned. With the pulses derived from photodiode 943 the position of each elemental region of the pellet P scanned can be determined electronically.

Electronic circuitry can determine the position of the beam within a scan by counting the light pulses U since the last pause D. The circuitry detects the end of a scan by detecting that the period of darkness D between trains T is prolonged beyond that corresponding to the duration DP between pulses. Every light pulse corresponds to a discrete address in the imaginary cylindrical grid which envelops a pellet P and rotates with it. At the peak of every pulse U the electronic circuitry examines the output from photodiode 929 (FIG. 63) to evaluate the reflection from the spot at the corresponding address. The absence or presence of a sound surface is thus determined.

For length inspection the length of the pellet is defined as the distance along the pellet axis between planes held flush with the ends of the pellet. The ends may not be plane circles perpendicular to the axis.

The optical system (FIGS. 60, 61, 62), except for dove prism 303, is mounted in a container 791d (FIG. 3) generally similar to containers 791 and 791f. The vertical collimated and polarized beam 845 from the laser (not shown) is incident on plane mirror 951 which converts the beam into horizontal beam 953. The beam 953 passes through the $\frac{1}{2}$ Littrow prisms 955a through 955f arranged as shown in FIG. 61. The prisms 955 expand the incident beam in the horizontal plane as shown in FIG. 61. The light should be polarized with its electric vector E perpendicular to the direction of propogation (FIG. 61) and should be incident on each of the prisms a through f at Brewster's angle $\beta$. If these conditions are met there is no reflection at the incident surfaces (the hypotenuses) of the prisms a through f. The beam 315 which emerges from prism f is a flat horizontal beam (FIG. 61). The beam 315 then passes through window 959 (FIG. 3) to dove prism 303 at the length inspection station 131. Dove prism 303 folds the beam like a periscope so that the beam is reversed. The beam from surface 313 of the dove prism is directed so that it cuts the pellet P along a diametrical plane including the axis. The pellet is shorter than the beam and light spills over the pellet ends. The resulting beam 961 includes the shadow of the pellet bounded by light bars at both ends. This beam 961 is passed through window 963 in container 791d and is incident on spherical lens 963. Lens 963 (FIG. 3) focuses the image of the pellet shadow with the light bars at its ends on linear photodiode array 965. Lens 963 converges the image to a point. At this point a pin-hole baffle 967 is interposed. The purpose of the baffle 967 is to prevent ambient light from incidence on the photodiode array.

Rollers 267 and 269 at the length inspection station 231 are driven by a synchronous motor and spin the pellet so that the length of its shadow is sampled over its circumference or over a substantial part of its circumference. Typically the pellet rotates one revolution in 100 milliseconds and 40 length samples are taken. The length is taken as the distance between the most inward penetration of the light of the pellet ends into the shadow.

Each of the photodiode arrays, 865 (FIG. 59) for diameter inspection, and 965 (FIG. 60) for length inspection typically has 1024 diodes. In operation each diode array 865, and 965 is scanned electronically during measurment. The scanning of each photodiode array is at the requisite rate to provide the required data. For example, the diameter array is typically scanned 128 times for each scan by a face of the scanning prism 861. Each photodiode array is provided with a separate RETICON (T.M.) H Series solidstate line scanner (not shown) bought from RETICON CORPORATION, 910 Benicia Avenue, Sunnyvale, Calif. 94086. The RETICON is described in a leaflet copyright RETICON and in its leaflet on RC-100B Series Circuit Boards Alignment Procedure-Drawing No. 045-0050, sheets 1 through 9. Each RETICON is interconnected with the control system 103 (FIG. 1).

In the practice of this invention, the grippers and the individual seats are aligned so that the pellet drops vertically downwardly when deposited and is deposited simultaneously on both rolls 267 and 269. The grippers should be set so that each conjugate gripper pair should pick up and deposit the pellets respectively at the same lateral position. Otherwise, one gripper jaw contacts a deposited pellet before the other and the pellet is cammed upwardly by its seat as it moves sideways.

The counterweight 650 (FIG. 24A) is set so that it is balanced by the gripper assembly to minimize vibration. For this purpose the assembly consisting of the gripper bar 513 and the counterweight with one link 601 and 603 and 631 and 633 each are disposed with the counterweight horizontal and the beam 513 vertical and the counterweight is adjusted so that the counterweight and beam are balanced about the counterweight pivot with shaft 682 horizontal.

The linkages 601 and 603 and 631 and 633 are adjusted so that left and right ends of the beam 513 are at the same level, typically within 0.002 inch, with the linkages vertical and with the linkages in the extreme upstream and downstream positions.

The push rod 749 and its components should be so adjusted that the throw of the cam lever 719 is centered in the throw of the actuator 761 for the cam shaft 539.

The roller stands 251 are each adjusted with the end of buttons 353, 355 and 357 so that the pellet P in the seat of rollers 267 and 269 is level parallel with the table top. The adjustment of the seat should be such that when a mock-up pellet is gripped by the jaws the pellet does not move laterally. The relationship of the grippers and the rollers should be such that when a pellet is released it engages both rolls simultaneously.

The roll stand 251 at the diameter inspection station 127 should be adjusted as described above. In addition the height of the seat of rollers 267, 269 should be so set that a mock-up pellet is gripped about half-way up the jaws 543 and 545. The diameter inspection roll stand 251 should be set so that the seat of rollers 267 and 269 is about 0.03 inch lower than the seat 175 at the pick-up station 125.

The height of the flow inspection roll stand should be set so that the seat of its rollers 267 and 269 is about 0.003 inch lower than the diameter inspection rollers; i.e. the pellet seat for flaw inspection is about 0.003 inch below the pellet seat for diameter inspection. The length inspection seat should be about 0.003 inch below the flaw inspection seat. The scale 381 in the weight station 133 should be adjusted with the aid of locating buttons as for the other stations. During the adjustment, the scale should be powered so that its pan 396 assumes the null position. The top of a mock-up pellet in the weighing pan 391 should be about 0.004 inch below the top of a pellet on the rollers 267 and 269 of the length inspection station 131. The seat at stations 127 through 133 is at progressively lower levels to avoid damage to a pellet or equipment by forceful contact between the pellet and the equipment. While the pellet is engaged by the gripper jaws above their ends, it extends below the jaws. The free fall of the pellet is minimized. This is necessary to enable the pellet to be seated in sufficient time to have an adequate spin-up time and also to minimize misplacement of the pellets.

In general the optical systems for diameter inspection, flaw inspection and length inspection should be aligned in the manner well known in the optical art to carry out the inspections. The containers 791, 791f and 791d (FIGS. 3, 11, 53) are provided with adequate facilities for adjusting the optical components. Parallelism of the optic axes with the surface 817 of the support 819 on which the containers 791, 791f and 791d (FIG. 3) are mounted is set by the adjustment of locating buttons 809 (FIGS. 15, 53). The heights of the optic axis of the rays emitted from the reflected back to the containers are also set by adjusting the locating buttons 809. These rays are rays 307 and 865 (FIG. 51) for the diameter inspection, rays 341 and 343 for flaw inspection, and rays 315 and 961 for length inspection. The buttons 795 and the set screws 841 (FIGS. 53, 3) can be set so that the containers 791, 791f and 791d are precisely vertical.

In operation the pellets P are successively transmitted by the pellet feeder 121 to seat 175 (FIG. 8) at pick-up station 125. There they are each picked up by gripper 515 and deposited on the rolls 267 and 269 at diameter station 127. Each pellet is then moved from station to station by the associated grippers 517 through 523 and ultimately deposited into the sorting mechanism 137 and transmitted to one of the boats 149, 151, 153.

It appears at this point desirable to explain briefly the cooperation of the photodiode 183 at the pellet pick-up station 125 and the photodiodes 193 and 195 at the sorting station 137 (FIG. 10).

A common shaft carries cam 687 at one end 686 (FIG. 16) and cam 715 (FIG. 19) at the opposite end. On each rotation of cam 715 through one revolution each of the grippers 515 through 523 are operated through one cycle to close while at a pick-up station and to open while at a deposit station. Cam 687, on each rotation, produces a pulse to enable the inspection operation. The cams 687 and 715 are so oriented on their common shaft that the timing action of cam 687 is appropriately coordinated with the operation of the grippers. Photodiode 183 (FIG. 10) is connected to a sensing circuit 981 and when enabled transmits a signal to a 5-bit shift register 983. Photodiodes 193 and 195 are connected in series to a sensing circuit 985 which when enabled by a clock pulse transmits a signal to a 1-bit register 987. Sensing circuit 981 is enabled by clock pulses resulting from the enabling pulse produced by cam 687 each time that a pellet is to be picked up in station 125. If photodiode 183 detects a properly positioned pellet on seat 175 (FIG. 8) a digit is inserted in the shift register 983 and any digits previously inserted in the register are advanced. For purpose of this explanation, it is assumed that the first pellet is properly positioned and a digit is inserted in shift register 983. On the start of the second cycle of the opening and closing of the grippers, the first pellet is shifted to the second station and its corresponding marker digit is shifted to the second position in shift register 983, on the start of the third to the third position, on the start of the fourth to the fourth position and on the start of the fifth to the fifth position. For the fifth operation of the pellet, the pellet is deposited in the sorting mechanism 137. It is assumed that the light to at least one of the photodiodes 193 or 195 is interrupted by the pellet at the sorting mechanism. The sensing circuit 985, when enabled, transmits a digit to the 1-bit register 987. The contents of the 1-bit register are compared by a comparison circuit 989 when enabled by a clock pulse delayed long enough for the digit to be entered into registers 983 and 987.

Let:

A = pellet present in the 5th bit of register 983.

B = pellet present in the 1-bit register 987.

The possible results at the output of circuit 989 are as follows:

$$A \cdot B = \overline{C}$$

$$\overline{A} \cdot \overline{B} = \overline{C}$$

$$\overline{A} \cdot B = C$$

$$A \cdot \overline{B} = C$$

$\overline{A}$ or $\overline{B}$ = pellet not present.

The desired response for proper operation is $\overline{C}$. This means either that both diode 183 and diodes 193 and 195 detected a pellet or that they did not detect a pellet. If the output is C, a pellet was detected by one of diodes 183 or 193 and 195 but not by the other at the appropriately corresponding gripper cycle and this indicates that the apparatus is not operating properly.

While a preferred embodiment of this invention has been disclosed herein, many modifications thereof are feasible. This invention is not to be restricted except insofar as is necessitated by the spirit of the prior art.

We claim:

1. Apparatus for inspecting fuel pellets for a nuclear reactor including a plurality of inspection stations and means, cooperative with each of said stations, to inspect each of said pellets for a different property of said pellet, means mounting said stations in an array to receive and inspect each said pellet in succession, each said station inspecting said pellet in its turn for its associated property, means, connected to said stations, for feeding said pellets into the first station of said array, said pellet-feeding means having a pellet pick-up location where a pellet is moved to said first station; sorting means, connected to said stations, for receiving a pellet from the last station of said array and sorting said pellet in accordance with its properties, gripper means cooperative with said feeding means, said stations, and said sorting means, for gripping each said pellet in its turn and advancing said pellet from respective pick-up positions to respective deposit positions, namely from said pellet pick-up location, in a pick-up position to, said first station of said array, in a deposit position, from each station of said array, in pick-up positions, to a just succeeding station of said array, in deposit positions, and from the last station of said array, in a pick-up position, to said sorting means in a deposit position; the said gripper means including a separate gripper for advancing each said pellet from said pellet pick-up location to said first station of said array, a plurality of separate grippers each for advancing each said pellet from a station of said array to the succeeding station of said array, and a separate gripper for advancing each said pellet from the last station of said array to said sorting means, means connected to said gripper means, for actuating said separate grippers to move back and forth together between respective pick-up position and said respective deposit positions with which each said separate gripper is associated, and means for actuating each said separate gripper to engage a pellet at its pick-up position and to deposit said pellet at its deposit position.

2. Apparatus for inspecting fuel pellets for a nuclear reactor including a plurality of inspection stations and means, cooperative with each of said stations, to inspect each of said pellets for a different property of said pellet, means mounting said stations in an array to receive and inspect each said pellet in succession, each said station inspecting said pellet in its turn for its associated property, means, connected to said stations, for feeding said pellets into the first station of said array, said pellet-feeding means having a pellet pick-up location where a pellet is moved to said first station; said feeding means also including:

(a) a feeder bowl for receiving said pellets;

(b) a linear conveyor interposed between said bowl and the first of said array of stations;

(c) first means for vibrating said bowl to advance said pellets to said linear conveyor, and (d) second means for vibrating said linear feeder to advance said pellets to said pellet pick-up location, sorting means, connected to said stations, for receiving a pellet from the last station of said array and sorting said pellet in accordance with its properties, gripper means cooperative with said feeding means, said stations, and said sorting means, for gripping each said pellet in its turn and advancing said pellet from respective pick-up positions to respective deposit positions, namely from said pellet pick-up location, in a pick-up position to, said first station of said array, in a deposit position, from each station of said array, in pick-up positions, to a just succeeding station of said array, in deposit positions, and from the last station of said array, in a pick-up position, to said sorting means in a deposit position; and means connected to said gripper means, for actuating said gripper means to advance each pellet in its turn from said pellet pick-up location to said first station, from each station to the next succeeding station, and from the last station to said sorting means.

3. The apparatus of claim 1 wherein the actuating means includes a beam to which the separate grippers are connected and also includes means for reciprocating said beam to reciprocate said grippers between pick-up positions and deposit positions.

4. The apparatus of claim 2 including escapement means interposed between the linear conveyor and the first station for positioning a leading pellet, advanced by the conveyor to the pellet pick-up location, to be picked up by said gripper means, for preventing the pellet stream following said leading conveyor from advancing once said leading pellet has been so positioned, and permitting said pellet stream to advance after said leading pellet has been picked up by said gripper means.

5. The apparatus of claim 4 wherein each pellet in its turn is moved into the pellet pick-up location by the pellet-feeding means, the said apparatus including:

(a) a gate for maintaining the pellet in said location preparatory to its being picked up, and (b) means, responsive to the actuation of the gripper means to pick up a pellet, for displacing said gate to permit said pellet to be picked up.

6. The apparatus of claim 4 wherein each pellet in its turn is moved into the pellet pick-up location by the feeding means, the said apparatus including:

(a) a first gate interposed in the stream of pellets permitting the positioning of only one pellet at a time in the pellet pick-up location, (b) a second gate for maintaining each pellet in its turn in the pellet pick-up location, (c) means, responsive to the actuation of the gripper means to pick up a pellet, for displacing said second gate to permit the pick-up of the pellet in the pellet pick-up location, and (d) means, responsive to the completion of each pick-up operation by said gripper means at said pellet pick-up location for displacing said first gate to permit a leading pellet to move into the pellet pick-up location.

7. Apparatus for inspecting fuel pellets for a nuclear reactor including a plurality of inspection stations, means, cooperative with each said stations, to inspect each of said pellets for a different property of said pellet, means for mounting said stations in an array to receive and inspect in succession each said pellet, means connected to said stations, for feeding said pellets into the first station of said array, said pellet-feeding means having a pellet pick-up location, to receive each said pellet in succession, whence each of said pellets is moved into said first station, sorting means, connected to said station, for receiving said pellets from said last station of said array and sorting a received pellet in accordance with its said properties, gripper means, cooperative with said feeding means, said stations and said sorting means, for feeding each said pellet in succession from said pellet pick-up location to said first station, from each of said stations to the immediately succeeding station and from said last station to said sorting means, a gate for maintaining each of said pellets in said pellet pick-up location preparatory to its being picked up, and means, responsive to the actuation of said gripper means to pick up a pellet, for displacing said gate to permit a pellet to be picked up.

8. The apparatus of claim 7 wherein the feeding means includes a linear conveyor for feeding the pellets to the pellet pick-up location in a stream of single pellets.

9. The apparatus of claim 8 including another gate interposed in the stream of pellets permitting the positioning of only one pellet at a time in the pellet pick-up location, and means responsive to the completion of each pick-up operation by said gripper means at the pellet pick-up location to displace said other gate to permit the leading pellet of said stream to pass into said pellet pick-up location.

10. Apparatus for inspecting fuel pellets for a nuclear reactor including a plurality of inspection stations and means, cooperative with each of said stations, to inspect each of said pellets for a different property of said pellet, means mounting said stations in an array to receive and inspect each said pellet in succession, each said station inspecting said pellet in its turn for its associated property, means, connected to said stations, for feeding said pellets into the first station of said array, said pellet-feeding means having a pellet pick-up location where a pellet is moved to said first station; sorting means, connected to said stations, for receiving a pellet from the last station of said array and sorting said pellet in accordance with its properties, gripper means cooperative with said feeding means, said stations, and said sorting means, for gripping each said pellet in its turn and advancing said pellet from respective pick-up positions to respective deposit positions, namely from said pellet pick-up location, in a pick-up position to, said first station of said array, in a deposit position, from each station of said array, in pick-up positions, to a just succeeding station of said array, in deposit positions, and from the last station of said array, in a pick-up position, to said sorting means in a deposit position, and means, connected to said gripper means, for actuating said gripper means to advance each pellet in its turn from said feeding means to said first station, from each station to the next succeeding station and from the last station to said sorting means, each of said stations including a seat wherein each of said pellets is to be picked up and deposited by said gripper means, the seat of each of said succeeding stations being at a lower level by a small but effective magnitude than the seat of the just preceding station to avoid damaging impact on said pellets as they are being deposited on said seats of said succeeding stations.

11. Apparatus for inspecting fuel pellets for a nuclear reactor, including inspecting means for inspecting said pellets, pellet-delivery means for delivering said pellets in a stream of individual pellets to said inspecting means, pellet transfer means for transferring said pellets one-by-one from said delivery means to said inspecting means, said delivering means having a pellet pick-up location whence each pellet is transferred by said pellet transfer means, means in said pellet pick-up location for positioning each leading pellet on said stream for transfer by said pellet transfer means to said inspecting means, and means, responsive to the positioning of each said leading pellet in proper position to be transferred, for actuating said pellet transfer means to pass through a pick-up operation on which it picks up and transfers said leading pellet from said location to said inspecting means.

12. The apparatus of claim 11 wherein the positioning-responsive means includes a photo-optical detector cooperative with each leading pellet in its turn to prevent said positioning-responsive means from picking up the leading pellet if it is present in the pellet pick-up location but is not properly positioned.

13. The apparatus of claim 11 including means permitting the transfer of only one leading pellet of said stream at a time to the pellet pick-up location and for preventing the advance of pellet of the stream following each leading pellet into said location, the said permitting and preventing means including means, responsive to the passage of said pellet transfer means through a complete pellet pick-up operation at said location, for permitting the transfer of a pellet of said stream into said location.

14. The apparatus of claim 11 including a photo-optical detector cooperative with the stream of pellets for sensing the presence of a pellet of said stream near the pellet pick-up location.

15. The apparatus of claim 11 including sorting means cooperative with the pellet transfer means to receive pellets from said pellet transfer means and sort said pellets in accordance with their properties, the said apparatus also including first sensing means, cooperative with each leading pellet when it is positioned to be transferred, for conditioning said leading pellet to be transferred if it is in position to be transferred, and second sensing means, cooperative with said sorting means and said first sensing means, to detect if a pellet whose position is sensed by said first sensing means is transferred to said sorting means.

16. Apparatus for inspecting pellets for a nuclear reactor including a starting station, a plurality of pellet inspection stations, and a sorting station mounted in an array means, cooperative with each of said inspection stations, for inspecting each of said pellets in its turn for a different property, feeding means connected to said stations for feeding said pellets one-by-one to said starting station, a plurality of pellet grippers, a beam for suspending said grippers in gripper array over said stations, means connected to said beam, for reciprocating said beam to move each gripper respectively between a leading station and a just succeeding station, namely the first gripper of said array between said starting station and said first inspection station, the second gripper between said first and said second inspection stations, etc., each of said grippers having gripper jaws, and a cam means associated with each said gripper when actuated for moving said gripper jaws of said associated gripper between pellet pick-up positions and pellet deposit positions, a cam shaft common to said cam means reciprocable with said beam, and means, cooperative with said cam shaft, for actuating said cam means respectively associated with each said grippers to move said gripper jaws to pellet pick-up positions at said leading stations and to pellet deposit positions at said just succeeding station.

17. The apparatus of claim 16 including means for selectively disabling said cam means actuating means while said beam is being reciprocated.

18. The apparatus of claim 16 including means cooperative with the starting station, to detect if a pellet is undesirably improperly positioned to be picked up in said starting station, and means responsive to said detecting means for disabling said cam means actuating means on the detection by said detecting means of a cam so improperly positioned.

19. The apparatus of claim 16 wherein at least one of the pellet inspection stations requires a longer time to inspect than others of said pellet inspection stations, the said apparatus including means cooperative with said at-least-one station for selecting for inspection certain of the pellets, less than all, for inspection at said station, and means for disabling the cam means actuating means during the inspection of each of said certain of said pellets.

20. The apparatus of claim 19 including means, responsive to the certain pellet selecting means on the detection of a pellet of the certain of the pellets, classified as defective by the inspection, for resetting the gripper-suspending beam so that it reciprocates at a reduced rate corresponding to the rate at which said certain of said pellets are inspected, whereby each of the pellets advanced by the gripper means are inspected at the at-least-one station.

21. Apparatus for inspecting fuel pellets for a nuclear reactor including a plurality of inspection stations and means cooperative with each of said stations, for inspecting a pellet at each of said stations for a different property, pellet transfer means for transferring each of said pellets one-at-a-time to each station in its turn for inspection at said station, and an optical system associated with certain of said stations including means for subjecting each of said pellets while at said station to optical inspection, each of said optical inspection stations having a roller stand including rollers defining a seat on which each of the pellets is subjected to inspection and also including a supporting base, and means connected to said rollers, for rotating said rollers, thereby to resolve each of said pellets, the said apparatus including a support on whose surface each of said roller stands is supported, the said supporting base of said roller stand having a pair of spherical locating buttons spaced along said base and protruding therefrom, the said base also including another locating button, the said other button being spaced with reference to the buttons of said pair so that the three buttons are at the apeces of an hypothetical triangle, the said surface including first seat having a conical internal surface for receiving one of said buttons and a second seat having a surface of V cross-section for receiving another of said buttons, the vertex of the cone of said first seat and the apex of the V of said second seat being aligned, said roller stand being mounted on said surface of said support with one of said pair of locating buttons on said first seat and the second of said pair of locating buttons on said second seat, said internal surfaces of said seats having substantially equal altitudes and vertical angles so that when said roller stand is supported as aforesaid on said surface of said support, the axes of the rollers defining the pellet seat are substantially perpendicular to the vertical plane through the optic axes of said optical system and are also substantially horizontal, said roller stand being freely supported as aforesaid.

22. The apparatus of claim 21 wherein the base of the roller stand includes a spring-actuated plunger spaced from the locating buttons and protruding from said base to equalize the load on said locating buttons.

23. The apparatus of claim 22 wherein the base of the roller stand is in the form of a rectangle, and the locating buttons of the pair are disposed near the corners of the rectangle along one long side of the rectangle and the other button and plunger are disposed near the corners of the rectangle along its opposite long side.

24. For use in the inspection of fuel pellets for a nuclear reactor, a roller stand including rollers on said stand having a pair of juxtaposed shafts and juxtaposed rollers in said shafts defining between them a seat for subjecting each of said pellets rotatably to inspection, each of said shafts having conical bearing surfaces at its ends and having at one end a pinion inwardly of the bearing surface, the pinions on said shafts being juxtaposed, said roller stand also including bearings for each of said shafts in engagement with said bearing surfaces of the associated shaft for rotatably supporting said shaft and a spring-actuated plunger in engagement, with the bearings at one end of each of said shafts for urging said bearings into engagement with the bearing surfaces, said roller stand also including drive means in said stand, cooperative with said pinions, for rotating said shafts.

25. The roller stand of claim 4 wherein the rollers and the shafts are composed of a material of the tungsten carbide type.

26. Apparatus for inspecting fuel pellets for a nuclear reactor including an inspection station having a seat for subjecting each of said pellets in its turn to inspection, an optical system for projecting on each pellet seated in said seat an optical beam for inspecting said pellet, a container having certain of the optical components of said optical system mounted therein, the optical axes of the optical beams of said optical system within said container desirably to extend substantially horizontally, said container having a base, locating buttons extending from said base, a support for said container, said support having, within said base, a first seat for seating one of said buttons, and a second seat for seating another of said buttons, said first seat having an internal conical surface and said second seat having an internal surface of V cross-section, the vertex of said conical surface and the apex of said V being aligned, and being in a plane substantially parallel to said optical axis, and means for restraining the movement of said container when said buttons are seated in said seats, generally at right angles to said buttons, the conical surface and V cross-section surface having substantially equal vertical angles and altitude and the restraining means being so set that said optical axes extend substantially horizontally when said container is mounted with said buttons seated in said seats, said container being freely supported on said surface.

27. The apparatus of claim 26 wherein the surface of the support has a slot between the seats and the base has a guiding button slidable in said slot, to facilitate the seating of the locating buttons in said seat, said surface having a seat for the guiding button adjacent the seat of V cross-section.

28. The apparatus of claim 26 wherein the seats for the locating buttons are formed in separate blocks embedded in the surface of the support.

29. Apparatus for inspecting fuel pellets for a nuclear reactor including a roller stand, the said roller stand having rollers providing between them a seat for each of said pellets and first drive means for rotating said rollers, transfer means for depositing pellets one-by-one on said seat, each deposited pellet being rotated by the rotation of said rollers forming said seat, a light source, optical means, cooperative with said source, for projecting a light beam on each of said pellets in said seat, each of said optical means including a multiple-sided prism and a second drive for rotating said prism to cause said light beam to scan said pellet in said seat, said first and second drive means each including a synchronous motor for producing the rotation, and an alternating power supply, common to said motors, for energizing said motors, pellet sorting means, and means responsive to the resulting light emitted by each said pellets in said seat, for sorting said last-named pellet in accordance with its properties as manifested by the resulting emitted beam.

30. Apparatus for classifying a fuel pellet for a nuclear reactor in accordance with its length including a seat on which said pellet is subjected to inspection, a light-source means for producing a collimated beam of light, an optical system, the said optical system including:
(a) a plurality of half-Littrow prisms interposed in the path of said collimated beam for converting said beam into a collimated sheet of light,
(b) means for projecting said sheet of light along the length of said pellet so as to produce a shadow in said sheet substantially equal to the length of said pellet, light of said sheet extending beyond the ends of the pellet, and
(c) means for focusing said shadow on a photodiode array so that the length of said shadow is measured by said array, sorting means and means responsive to the response by said array, cooperative with said sorting means, for classifying said pellet in accordance with its length.

31. The apparatus of claim 30 wherein the collimated beam is plane-polarized and impinges on each of the half-Littrow prisms at the Brewster's angle with the plane of polarization in the plane defined by the beam and the perpendicular to the incident surface of each beam so that reflection from said prisms is minimized.

32. The apparatus of claim 30 including means connected to the sheet, for rotating the pellet during the measurement of the length of its shadow.

33. Apparatus for classifying a fuel pellet for a nuclear reactor in accordance with its diameter, including a seat for said pellet, means for producing a beam of light, first optical means converging said beam to a vertical line at the upper edge along the length of said pellet on said seat, means cooperative with said beam to cause said line to scan said pellet along its length, a photodiode array, second optical means for producing a magnified image corresponding to the line at the upper edge of said pellet on said array, sorting means, and means responsive to the output of said array, cooperative with said sorting means for classifying said pellet.

34. The apparatus of claim 33 including a pin-hole baffle interposed between the second optical means and the photodiode array, the said baffle being disposed so that the second optical means converges the light from the pellet at the pin-hole whereby ambient light rays are suppressed by the baffle.

35. The apparatus of claim 33 including third optical means for converging the image on the photodiode array produced by the second optical means substantially into a vertical line.

36. Apparatus for inspecting fuel pellets for a nuclear reactor comprising a plurality of stations disposed in an array, the said stations including in order in the array, a pellet pick-up station, a plurality of pellet inspection stations, and a pellet sorting station, gripper means including a plurality of separate grippers, having jaws capable of opening and closing each gripper being associated with a pair of successive of said stations, each said pair including a pellet pick-up station and a pellet deposit station, means connected to said gripper means, when actuated for reciprocating all of said grippers simultaneously and continuously between respective associated pellet pick-up stations and pellet deposit stations, and means connected to said grippers and selectively actuable in dependence upon the condition of pellets in said stations, for closing said jaws of each said gripper at its associated pellet pick-up station and for opening said jaws at its associated pellet deposit station.

37. The apparatus of claim 36 wherein the jaw closing and opening means for each gripper includes a cam and cam follower means connected to said jaws to actuate said jaws to close and open, the said apparatus also including a cam shaft common to the cams of said grippers and also including a push rod cooperative with said cam shaft, means for actuating said push rod to move said shaft and its cams between pellet-closing and pellet-opening positions, and means for selectively disabling said push rod from moving said cam shaft between pellet closing and pellet opening positions.

38. Apparatus for inspecting fuel pellets for a nuclear reactor comprising a plurality of pellet processing stations including a pellet pick-up station, pellet feeding means connected to said pick-up station, for feeding pellets in a continuously flowing stream to said pick-up station, pellet transfer means for transferring a pellet in said pick-up station to a succeeding station of said plurality, and means, cooperative with said pellet feeding means, and repeatedly actuable on the arrival of a succeeding pellet in position to be fed into said pick-up station for engaging said pellet to prevent the feeding of said succeeding pellet into said pick-up station so long as a preceding pellet is in said pick-up station and for disengaging said succeeding pellet after said preceding pellet is removed from said pick-up station by said pellet transferring means to permit said succeeding pellet to be moved into said pick-up station.

39. Apparatus for classifying nuclear fuel pellets for a nuclear reactor in accordance with their properties including in an array a pick-up station and a plurality of inspecting stations for inspecting said pellets for different properties, each of said stations having a seat in which said pellets are disposed to be picked up and to be inspected and having a support for said seat, means for advancing said pellets from station to station, and a container for receiving stray pellets and powder from pellets under inspection, said container being disposed adjacent said supports and the outer walls of said supports being sloped so that said stray pellets and said powder are deposited in said container.

* * * * *